United States Patent
Nishimura et al.

(10) Patent No.: US 9,832,755 B2
(45) Date of Patent: Nov. 28, 2017

(54) EXCHANGE, WIRELESS NETWORK CONTROL DEVICE, WIRELESS NETWORK DEVICE, AND WIRELESS COMMUNICATION NETWORK SYSTEM

(71) Applicant: NTT DOCOMO, INC., Chiyoda-ku, Tokyo (JP)

(72) Inventors: Masaki Nishimura, Tokyo (JP); Shinsuke Sawamukai, Tokyo (JP); Yuukichi Saito, Tokyo (JP); Kazufumi Yunoki, Tokyo (JP); Yoshihiko Omori, Tokyo (JP); Hisayuki Aso, Tokyo (JP); Keisuke Suzuki, Tokyo (JP); Keisuke Sasada, Tokyo (JP); Reika Higa, Tokyo (JP)

(73) Assignee: NTT DOCOMO, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/905,598

(22) PCT Filed: Jun. 12, 2014

(86) PCT No.: PCT/JP2014/003142
§ 371 (c)(1),
(2) Date: Jan. 15, 2016

(87) PCT Pub. No.: WO2015/008425
PCT Pub. Date: Jan. 22, 2015

(65) Prior Publication Data
US 2016/0174190 A1 Jun. 16, 2016

(30) Foreign Application Priority Data
Jul. 16, 2013 (JP) .................................. 2013-148030
Mar. 13, 2014 (JP) .................................. 2014-050680

(51) Int. Cl.
*H04W 68/06* (2009.01)
*H04W 28/06* (2009.01)
(Continued)

(52) U.S. Cl.
CPC ........... *H04W 68/06* (2013.01); *H04W 28/06* (2013.01); *H04W 68/08* (2013.01); *H04W 68/04* (2013.01); *H04W 92/12* (2013.01); *H04W 92/14* (2013.01)

(58) Field of Classification Search
CPC ..... H04W 28/06; H04W 68/00; H04W 68/06; H04W 92/12; H04W 92/14
See application file for complete search history.

(56) References Cited

U.S. PATENT DOCUMENTS 6,363,255 B1 3/2002 Kuwahara
2002/0187793 A1 12/2002 Papadimitriou et al.
(Continued)

FOREIGN PATENT DOCUMENTS

JP 11-69458 A 3/1999
JP 2000-134662 5/2000
(Continued)

OTHER PUBLICATIONS

PCT/JP2014/003142, PCT/IB/338 dated Jan. 28, 2016 (One (1) page).
(Continued)

*Primary Examiner* — Kashif Siddiqui
(74) *Attorney, Agent, or Firm* — Crowell & Moring LLP

(57) ABSTRACT

An RNC includes: a first call request reception unit configured to receive from an exchange a first call request to only an already located wireless cell; a presumably located wireless cell derivation unit configured to derive a presumably located wireless cell in which a target communication terminal device is presumably located; a first call making unit (Continued)

configured to make a call to the already located wireless cell and the presumably located wireless cell; a call response signal transmission unit configured to transmit a response signal to the call, to the exchange; a second call request reception unit configured to receive from the exchange a second call request to a wireless cell different from the already located wireless cell, in a case where the response signal to the first call request has not been transmitted; and a second call making unit configured to make the call to the different wireless cell.

10 Claims, 20 Drawing Sheets

(51) Int. Cl.
*H04W 68/08* (2009.01)
*H04W 92/12* (2009.01)
*H04W 92/14* (2009.01)
*H04W 68/04* (2009.01)

(56) References Cited

U.S. PATENT DOCUMENTS

2004/0248560 A1* 12/2004 Bedingfield, Sr. .. H04M 3/2218
455/412.2
2010/0296442 A1* 11/2010 Nagasawa ........... H04M 7/0057
370/328

FOREIGN PATENT DOCUMENTS

| JP | 2000-134662 A | 5/2000 |
|---|---|---|
| JP | 2004-193950 | 7/2004 |
| JP | 2004-193950 A | 7/2004 |
| JP | 2004-533780 | 11/2004 |
| JP | 2004-533780 A | 11/2004 |
| JP | 2010-166427 A | 7/2010 |

OTHER PUBLICATIONS

PCT/JP2014/003142, International Preliminary Report on Patentability (PCT/IB/373) dated Jan. 19, 2016, enclosing English Translation of Written Opinion of the International Searching Authority (PCT/ISA/237) (Six (6) pages).
PCT/JP2014/003142, International Search Report (PCT/ISA/210) dated Sep. 16, 2014, with partial English translation, enclosing Written Opinion of the International Searching Authority (PCT/ISA/237) (Eight (8) pages).
3GPP TR 23.888 V11.0.0 (Sep. 2012), $3^{rd}$ Generation Partnership Project; Technical Specification Group Services and System Aspects; System improvements for Machine-Type Communications (MTC) (Release 11), 165 pages, 2012.
3GPP TS 23.060 V12.4.0 (Mar. 2014), $3^{rd}$ Generation Partnership Project; Technical Specification Group Services and System Aspects; General Packet Radio Service (GPRS); Service description; Stage 2 (Release 12), 345 pages, 2014.
3GPP TS 23.401 V12.4.0 (Mar. 2014), $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12), 302 pages, 2014.
3GPP TS 25.413 V12.1.0 (Mar. 2014), $3^{rd}$ Generation Partnership Project; Technical Specification Group Radio Access Network; UTRAN Iu interface Radio Access Network Application Part (RANAP) signalling (Release 12), 443 pages, 2014.
3GPP TS 36.413 V12.1.0 (Mar. 2014), $3^{rd}$ Generation Partnership Project; Technical Specification Group Radio Access Network; Evolved Universal Terrestrial Radio Access Network (E-UTRAN); S1 Application Protocol (S1AP) (Release 12), 285 pages, 2014.
Japanese Office Action Issued in Japanese counterpart application No. 2014-050680 dated May 23, 2017, with partial English translation (Seven (7) pages).

* cited by examiner

FIG. 3

| SERVICE TYPE | WIRELESS CELL INFORMATION OF PAST COMMUNICATION | | | WIRELESS CELL INFORMATION OF IMMEDIATELY PREVIOUS COMMUNICATION |
|---|---|---|---|---|
| | HOLDING PERIOD T(sec) | MAXIMUM NUMBER N OF HELD WIRELESS CELLS (NUMBER) | WIRELESS CELL INFORMATION | |
| INCOMING CALL | Ta | Na | WIRELESS CELL#, WIRELESS CELL#, WIRELESS CELL#, .... | WIRELESS CELL# |
| EMAIL | Tb | Nb | WIRELESS CELL#, WIRELESS CELL#, WIRELESS CELL#, .... | WIRELESS CELL# |
| INCOMING M2M | Tx | Nx | WIRELESS CELL#, WIRELESS CELL#, WIRELESS CELL#, .... | WIRELESS CELL# |
| ... | ... | ... | ... | ... |

FIG. 5A

| SERVICE TYPE | WIRELESS CELL INFORMATION OF PAST COMMUNICATION | | |
|---|---|---|---|
| | HOLDING PERIOD T | | |
| | P1≦REMAINING PAGING CAPACITY≦P2 | P2<REMAINING PAGING CAPACITY≦P3 | ... | Pn-1<REMAINING PAGING CAPACITY≦Pn |
| INCOMING CALL | Ta1(sec) | Ta2(sec) | ... | Tan(sec) |
| EMAIL | Tb1(sec) | Tb2(sec) | ... | Tbn(sec) |
| INCOMING M2M | Tx1(sec) | Tx2(sec) | ... | Txn(sec) |
| ..... | ..... | ..... | ..... | ..... |

FIG. 5B

| SERVICE TYPE | WIRELESS CELL INFORMATION OF PAST COMMUNICATION | | | |
|---|---|---|---|---|
| | HOLDING PERIOD T | | | |
| | TIME OF DAY 1 | TIME OF DAY 2 | ... | TIME OF DAY n |
| INCOMING CALL | Ta1(sec) | Ta2(sec) | ... | Tan(sec) |
| EMAIL | Tb1(sec) | Tb2(sec) | ... | Tbn(sec) |
| INCOMING M2M | Tx1(sec) | Tx2(sec) | ... | Txn(sec) |
| ..... | ..... | ..... | ..... | ..... |

FIG. 20A

| BASE STATION IDENTIFICATION INFORMATION | CELL IDENTIFICATION INFORMATION (INCLUDED) | | | | | | |
|---|---|---|---|---|---|---|---|
| #1 | a0 | a1 | a2 | a3 | a4 | a5 | a6 |
|  | b0 | b1 | b2 | b3 | b4 | b5 | b6 |
|  | c0 | c1 | c2 | c3 | c4 | c5 | c6 |

| BASE STATION IDENTIFICATION INFORMATION | CELL IDENTIFICATION INFORMATION (INCLUDED) | | | | | | |
|---|---|---|---|---|---|---|---|
| #2 | d0 | d1 | d2 | d3 | d4 | d5 | d6 |
|  | e0 | e1 | e2 | e3 | e4 | e5 | e6 |
|  | f0 | f1 | f2 | f3 | f4 | f5 | f6 |
|  | g0 | g1 | g2 | g3 | g4 | g5 | g6 |
|  | h0 | h1 | h2 | h3 | h4 | h5 | h6 |

FIG. 20B

| OVERLAID CELL | |
|---|---|
| a1 | b1 |
| a2 | b2 |
| ... | ... |
| a6 | b6 |
| c1 | d1 |
| c2 | d2 |
| ... | ... |
| c6 | d6 |
| e1 | f1 |
| e2 | f2 |
| ... | ... |
| e6 | f6 |
| g1 | h1 |
| g2 | h2 |
| ... | ... |
| g6 | h6 |

EXCHANGE, WIRELESS NETWORK CONTROL DEVICE, WIRELESS NETWORK DEVICE, AND WIRELESS COMMUNICATION NETWORK SYSTEM

TECHNICAL FIELD

The present invention relates to an exchange, a wireless network control device, a wireless network device, and a wireless communication network system.

BACKGROUND ART

In making an incoming call to a wireless communication terminal device, a wireless communication network transmits a paging signal including terminal identification information of the wireless communication terminal device that is a target of the incoming call, to a location registration area in which the wireless communication terminal device that is the target of the incoming call is located. Having received the paging signal, the wireless communication terminal device of the terminal identification information included in the paging signal transmits an incoming call response signal to the wireless communication network. Having received the incoming call response signal, the wireless communication network performs an incoming call process for the wireless communication terminal device that has transmitted the incoming call response signal.

CITATION LIST

Patent Literature

PTL 1: JP H11-69458 A

SUMMARY OF INVENTION

Technical Problem

Plural wireless cells are included in the location registration area, and the paging signal is transmitted to all of the wireless cells in the location registration area. The paging signal is thus transmitted to the wireless cells in which the wireless communication terminal device is not in a standby mode, which causes an increase in paging amount. The wireless communication network in one technology therefore has a problem of a shortage of wireless resources and an increase in system load due to paging.

To reduce the paging amount, the location registration area is also narrowed in the wireless communication network in one technology. In this case, since the total number of the wireless cells in the location registration area is relatively small, the paging amount to be transmitted to the wireless cells is relatively small. The narrowing of the location registration area, however, increases the location registration process associated with the movement of the wireless communication terminal device. Such a location registration process causes an increase in the system load. For these reasons, the wireless communication network has a problem in that the system load cannot be reduced by the narrowing of the location registration area.

Patent Literature 1 describes a technique in which, upon an incoming paging call, a terminal group control unit 9 in an exchange reads the resource information of paging group terminals 6 and 7. When any one of the group terminals is in communication, the information thereof is deleted from paging group terminal information, to reduce the number of terminals for which a protocol control unit 13 identifies a call area to which signals are transmitted from location registration information and then transmit an incoming paging call signal only to a minimum number of call areas. The invention described in PTL 1, however, has a problem in that the resource information of the paging group terminals 6 and 7 needs to be read and such reading of the resource information increases the load.

The present invention has an object of providing an exchange, a wireless network control device, a wireless network device, and a wireless communication network system that can prevent a shortage of wireless resources and an increase in system load.

Solution to Problem

In order to achieve the above object, there is provided an exchange in one embodiment of the present invention, including: a first call request transmission unit configured to transmit a first call request, which is a call request to only an already located wireless cell and which includes terminal identification information of a target communication terminal device that is a target of a communication request, to a management node for managing a location registration area including a plurality of wireless cells having the already located wireless cell, the already located wireless cell being a wireless cell in which the target communication terminal device was located in a past predetermined period before a current time; a call response signal reception unit configured to receive a response signal to the first call request from the management node; and a second call request transmission unit configured to transmit to the management node a second call request, which is the call request to at least a wireless cell different from the already located wireless cell from among the plurality of wireless cells and which includes the terminal identification information, in a case where the call response signal reception unit has not received the response signal for a predetermined period after the first call request transmission unit transmits the first call request.

With such a configuration, it is possible to prevent a shortage of wireless resources and an increase in system load.

The above-described exchange may further include a presumably located wireless cell derivation unit configured to derive a presumably located wireless cell in which the target communication terminal device is presumably located based on the already located wireless cell.

With such a configuration, it is possible to make a call request to a wireless cell in which the mobile terminal device is presumably located.

The above-described exchange may further include a wireless cell relative positional relation storage unit configured to store a relative positional relation between the plurality of wireless cells included in the location registration area, wherein the presumably located wireless cell derivation unit may be configured to derive, as the presumably located wireless cell, at least any one of a wireless cell adjacent to the already located wireless cell, a wireless cell within a predetermined distance from the already located wireless cell, or a wireless cell overlaid with the already located wireless cell, based on the relative positional relation stored in the wireless cell relative positional relation storage unit.

With such a configuration, it is possible to make a call request to a wireless cell in which the mobile terminal device is presumably located.

In order to achieve the above object, there is provided an exchange in another embodiment of the present invention, including: an overlay information reception unit configured to receive overlay information transmitted from a management node for managing a location registration area including a plurality of wireless cells when the management node is connected, the overlay information being related to overlaying of the plurality of wireless cells; an overlay information storage unit configured to store the overlay information; a first call request transmission unit configured to transmit a first call request, which is a call request to at least any one of an already located wireless cell or a presumably located wireless cell and which includes terminal identification information of a target communication terminal device that is a target of a communication request, to the management node including the already located wireless cell, the already located wireless cell being a wireless cell in which the target communication terminal device was located in a past predetermined period before a current time, and the presumably located wireless cell being a wireless cell that is overlaid with the already located wireless cell, the target communication terminal device being presumably located therein, and being derived from the overlay information storage unit; a call response signal reception unit configured to receive a response signal to the first call request from the management node; and a second call request transmission unit configured to transmit to the management node a second call request, which is the call request to at least a wireless cell different from the already located wireless cell and the presumably located wireless cell from among the plurality of wireless cells and which includes the terminal identification information, in a case where the call response signal reception unit has not received the response signal for a predetermined period after the first call request transmission unit transmits the first call request.

With such a configuration, it is possible to prevent a shortage of wireless resources and an increase in system load.

In order to achieve the above object, there is provided a wireless network control device in another embodiment of the present invention, including: a first call request reception unit configured to receive from an upper node a first call request, which is a call request to only an already located wireless cell and which includes terminal identification information of a target communication terminal device that is a target of a communication request, the already located wireless cell being a wireless cell in which the target communication terminal device was located in a past predetermined period before a current time; a presumably located wireless cell derivation unit configured to derive a presumably located wireless cell in which the target communication terminal device is presumably located based on the already located wireless cell that is a target of the first call request received by the first call request reception unit; a first call making unit configured to make a call to the already located wireless cell and the presumably located wireless cell; a call response signal transmission unit configured to transmit a response signal to the call to the upper node; a second call request reception unit configured to receive from the upper node a second call request which is the call request to at least a wireless cell different from the already located wireless cell from among a plurality of wireless cells included in a location registration area having the already located wireless cell and which includes the terminal identification information, in a case where the call response signal transmission unit has not transmitted the response signal for a predetermined period after the first call request reception unit receives the first call request; and a second call making unit configured to make the call to the different wireless cell based on the second call request received by the second call request reception unit.

With such a configuration, it is possible to prevent a shortage of wireless resources and an increase in system load.

The above-described wireless network control device may further include a wireless cell relative positional relation storage unit configured to store a relative positional relation between the plurality of wireless cells included in the location registration area, wherein the presumably located wireless cell derivation unit may derive, as the presumably located wireless cell, at least any one of a wireless cell adjacent to the already located wireless cell, a wireless cell within a predetermined distance from the already located wireless cell, or a wireless cell overlaid with the already located wireless cell, based on the relative positional relation stored in the wireless cell relative positional relation storage unit.

With such a configuration, it is possible to make a call request to a wireless cell in which the mobile terminal device is presumably located.

In order to achieve the above object, there is provided a wireless network device in another embodiment of the present invention, including: an overlay information transmission unit configured to transmit overlay information to an upper node when the upper node is connected, the overlay information being related to overlaying of wireless cells included in the wireless network device; a first call request reception unit configured to receive from the upper node a first call request, which is a call request to at least any one of an already located wireless cell or a presumably located wireless cell and which includes terminal identification information of a target communication terminal device that is a target of a communication request, the already located wireless cell being a wireless cell in which the target communication terminal device was located in a past predetermined period before a current time, and the presumably located wireless cell being a wireless cell that is overlaid with the already located wireless cell and the target communication terminal device being presumably located therein; a first call making unit configured to make a call to the already located wireless cell and the presumably located wireless cell included in the first call request received by the first call request reception unit; a call response signal transmission unit configured to transmit a response signal to the call to the upper node; a second call request reception unit configured to receive from the upper node a second call request, which is the call request to at least a wireless cell different from the already located wireless cell and the presumably located wireless cell from among a plurality of wireless cells included in a location registration area having the already located wireless cell and which includes the terminal identification information, in a case where the call response signal transmission unit has not transmitted the response signal for a predetermined period after the first call request reception unit receives the first call request; and a second call making unit configured to make the call to the different wireless cell based on the second call request received by the second call request reception unit.

With such a configuration, it is possible to prevent a shortage of wireless resources and an increase in system load.

In order to achieve the above object, there is provided a wireless communication network system in another embodiment of the present invention, including: a wireless network control device; and an exchange configured to communicate with a communication terminal device via the wireless network control device, wherein the exchange includes: a first call request transmission unit configured to transmit a first call request, which is a call request to only an already located wireless cell and which includes terminal identification information of a target communication terminal device that is a target of a communication request, to the wireless network control device for managing a location registration area including a plurality of wireless cells having the already located wireless cell, the already located wireless cell being a wireless cell in which the target communication terminal device was located in a past predetermined period before a current time; a call response signal reception unit configured to receive a response signal to the first call request from the wireless network control device; and a second call request transmission unit configured to transmit to the wireless network control device a second call request, which is the call request to at least a wireless cell different from the already located wireless cell from among the plurality of wireless cells and which includes the terminal identification information, in a case where the call response signal reception unit has not received the response signal for a predetermined period after the first call request transmission unit transmits the first call request, and wherein the wireless network control device includes: a first call request reception unit configured to receive the first call request from the exchange; a presumably located wireless cell derivation unit configured to receive a presumably located wireless cell in which the target communication terminal device is presumably located based on the already located wireless cell that is a target of the first call request received by the first call request reception unit; a first call making unit configured to make a call to the already located wireless cell and the presumably located wireless cell; a call response signal transmission unit configured to transmit a response signal to the call, to the exchange; a second call request reception unit configured to receive the second call request from the exchange, in a case where the call response signal transmission unit has not transmitted the response signal for a predetermined period after the first call request reception unit receives the first call request; and a second call making unit configured to make the call to the different wireless cell based on the second call request received by the second call request reception unit.

With such a configuration, it is possible to prevent a shortage of wireless resources and an increase in system load.

In order to achieve the above object, there is provided a wireless communication network system in another embodiment of the present invention, including: a wireless network control device; and an exchange configured to communicate with a communication terminal device via the wireless network control device, wherein the exchange includes: a presumably located wireless cell derivation unit configured to derive a presumably located wireless cell in which a target communication terminal device that is a target of a communication request is presumably located, based on an already located wireless cell which is a wireless cell in which the target communication terminal device was located in a past predetermined period before a current time; a first call request transmission unit configured to transmit a first call request, which is a call request to only the already located wireless cell and the presumably located wireless cell derived by the presumably located wireless cell derivation unit and which includes terminal identification information of the target communication terminal device, to the wireless network control device for managing a location registration area including a plurality of wireless cells having the already located wireless cell; a call response signal reception unit configured to receive a response signal to the first call request from the wireless network control device; and a second call request transmission unit configured to transmit to a management node a second call request, which is the call request to at least a wireless cell different from the already located wireless cell from among the plurality of wireless cells and which includes the terminal identification information, in a case where the call response signal reception unit has not received the response signal for a predetermined period after the first call request transmission unit transmits the first call request, and wherein the wireless network control device includes: a first call request reception unit configured to receive the first call request from the exchange; a first call making unit configured to make a call to the already located wireless cell and the presumably located wireless cell included in the first call request received by the first call request reception unit; a call response signal transmission unit configured to transmit a response signal to the call, to the exchange; a second call request reception unit configured to receive the second call request from the exchange, in a case where the call response signal transmission unit has not transmitted the response signal for the predetermined period after the first call request reception unit receives the first call request; and a second call making unit configured to make the call to the different wireless cell based on the second call request received by the second call request reception unit.

With such a configuration, it is possible to prevent a shortage of wireless resources and an increase in system load.

In order to achieve the above object, there is provided a wireless communication network system in another embodiment of the present invention, including: a wireless network device; and an exchange configured to communicate with a communication terminal device via the wireless network device, wherein the exchange includes: an overlay information reception unit configured to receive overlay information transmitted from the wireless network device for managing a location registration area including a plurality of wireless cells when the wireless network device is connected, the overlay information being related to overlaying of the plurality of wireless cells; an overlay information storage unit configured to store the overlay information; a first call request transmission unit configured to transmit a first call request, which is a call request to at least any of an already located wireless cell and a presumably located wireless cell and which includes terminal identification information of a target communication terminal device that is a target of a communication request, to the wireless network device including the already located wireless cell, the already located wireless cell being a wireless cell in which the target communication terminal device was located in a past predetermined period before a current time, and the presumably located wireless cell being a wireless cell that is overlaid with the already located wireless cell, the target communication terminal device being presumably located therein, and being derived from the overlay information storage unit; a call response signal reception unit configured to receive a response signal to the first call request from the wireless network device; and a second call request transmission unit configured to transmit to the wireless network device a second call request, which is the call request to at least a wireless cell different from the already located wireless cell from among the plurality of wireless cells and which includes the terminal identification information, in a case where the call response signal reception unit has not received the response signal for a predetermined period after the first call request transmission unit transmits the first call request, and wherein the wireless network device includes: an overlay information transmission unit configured to transmit the overlay information of the wireless cells included in the wireless network device to the exchange, when the exchange is connected; a first call request reception unit configured to receive the first call request from the exchange; a first call making unit configured to make a call to the already located wireless cell and the presumably located wireless cell included in the first call request received by the first call request reception unit; a call response signal transmission unit configured to transmit a response signal to the call, to the exchange; a second call request reception unit configured to receive the second call request from the exchange, in a case where the call response signal transmission unit has not transmitted the response signal for the predetermined period after the first call request reception unit receives the first call request; and a second call making unit configured to make the call to the different wireless cell based on the second call request received by the second call request reception unit.

With such a configuration, it is possible to prevent a shortage of wireless resources and an increase in system load.

Advantageous Effects of Invention

According to the present invention, it is possible to prevent a shortage of the wireless resources and an increase in the system load.

BRIEF DESCRIPTION OF DRAWINGS

FIG. 3 is a view illustrating an example of the configuration of a wireless cell information holding unit 3e in the SGSN 3 as the exchange in the first embodiment of the present invention;

FIG. 5A and FIG. 5B are views illustrating examples of the configuration of a wireless cell holding period determination table 7h in the RNC 7 in the first embodiment of the present invention;

FIG. 20A and FIG. 20B are views illustrating examples of the configuration of an overlay information storage unit 63f in the MME 63 in the third embodiment of the present invention.

DESCRIPTION OF EMBODIMENTS

First Embodiment (Schematic Configuration of Wireless Communication Network System 1)

An exchange, a wireless network control device, and a wireless communication network including these devices in the first embodiment of the present invention will be described by using FIG. 1 to FIG. 12. The schematic configuration of the wireless communication network system in the present embodiment will be described firstly with reference to FIG. 1.

Figure 1:
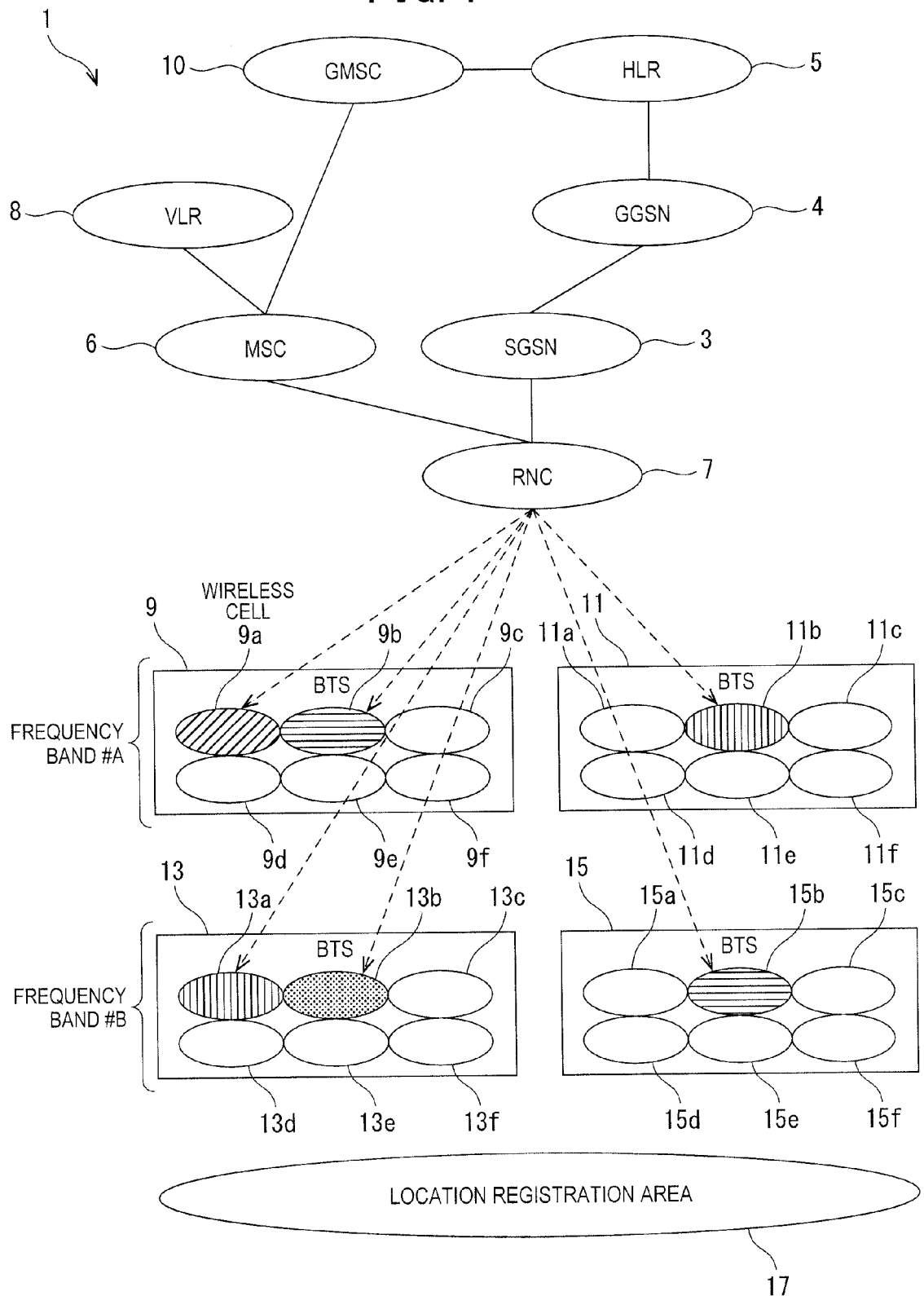
FIG. 1 is a block view illustrating a schematic configuration of a wireless communication network system 1 in the first embodiment of the present invention.

FIG. 1 is a block view illustrating the schematic configuration of a wireless communication network system 1 in the present embodiment. As illustrated in FIG. 1, the wireless communication network system 1 includes: a packet exchange (serving GPRS (general packet radio service) support node (SGSN)) 3; a packet exchange gateway (gateway GPRS (general packet radio service) support node (GGSN)) 4; a subscriber database (home location register (HLR)) 5; a circuit exchange (mobile services switching center (MSC)) 6; a visitor location register (VLR) 8; a circuit exchange gateway (gateway mobile services switching center (GMSC)) 10; a wireless network control device (radio network controller (RNC)) 7; and plural wireless base stations (base transceiver stations (BTSs)) 9, 11, 13, and 15 (hereafter the BTSs 9, 11, 13, and 15 are also referred to as "BTSs 9 to 15"). The SGSN 3, the GGSN 4, the HLR 5, the MSC 6, the VLR 8, and the GMSC 10 are included in a 3G (third generation mobile communication system) core network. The wireless communication network system 1 includes the 3G core network and the RNC 7, and forms a wireless communication system based on the 3GPP (Third Generation Partnership Project) standards. The SGSN 3 corresponds to the exchange in the present embodiment, and the RNC 7 corresponds to the wireless network control device in the present embodiment.

The HLR 5 is connected to the GGSN 4 and the GMSC 10. The HLR 5 stores, for example, the subscriber information and location information of each communication terminal device (e.g. mobile communication terminal device) not illustrated. The subscriber information is, for example, a user identifier or a mobile subscriber integrated services digital network number (MSISDN). The location information is the cell identifier of a BTS forming a wireless cell (present cell) in which the communication terminal device is located. In this example, the location information is the cell identifier of a wireless cell formed by each of the BTSs 9 to 15 included in a location registration area 17.

The SGSN 3 and the GGSN 4 are each a packet exchange domain node of the 3G core network. The GGSN 4 is connected to the HLR 5 and the SGSN 3. The GGSN 4 serves as a point of connection to another external packet network connected to the 3G core network. The GGSN 4 also has functions such as user authentication upon packet communication, connection control, and quality of service (QoS).

The SGSN 3 is connected to the GGSN 4 and the RNC 7. The SGSN 3 is an exchange, and includes each communication terminal device (not illustrated) and the RNC 7. The SGSN 3 is a device for packet exchange between a communication terminal device and another communication terminal device.

In addition to the above-mentioned functions, the SGSN 3 has a function of executing a first call request to only an already located wireless cell that is a wireless cell in which a target communication terminal device that is a target of a communication request was located in a past predetermined period before the current time, in order to prevent a shortage of wireless resources and an increase in system load. The configuration of the SGSN 3 for achieving this function will be described later.

The GMSC 10 is connected to the HLR 5 and the MSC 6. The GMSC 10 is a circuit exchange domain node of the 3G core network, and serves as a point of interconnection to other circuit exchange networks.

The MSC 6 is connected to the RNC 7, the GMSC 10, and the VLR 8. The MSC 6 is an exchange, and includes each communication terminal device (not illustrated) and the RNC 7. The MSC 6 is a device for circuit exchange between a communication terminal device and another communication terminal device.

The VLR 8 is a database for managing the subscriber information of each communication terminal device such as a telephone number and a terminal identification number. The VLR 8 functions as a database that substitutes for the HLR 5, by temporarily holding the subscriber information.

The RNC 7 is associated with the BTSs 9 to 15 and BTSs (not illustrated) provided in the wireless cells formed by the BTSs 9 to 15 (to be described in detail later), and performs a process relating to the wireless communication of the BTSs 9 to 15 and any communication terminal device located (residing) in the wireless cells formed by the BTSs. In detail, the RNC 7 performs, for example, a circuit connection process or a handover process during a call for the communication terminal device. The RNC 7 also stores the cell identification information of the BTSs corresponding to the RNC 7 (the BTSs 9 to 15 and the BTSs (not illustrated) provided in the wireless cells formed by the BTSs 9 to 15 in this example) and the terminal identification information (e.g. terminal identifier or MSISDN) of the communication terminal devices located in the wireless cells formed by the BTSs 9 to 15 and the like, in association with each other. The RNC is also referred to as a base station control device, a wireless control station, or the like.

In addition to the above-mentioned functions, the RNC 7 has a function of deriving, based on the already located wireless cell that is a target of the first call request received from the SGSN 3, a presumably located wireless cell in which the target communication terminal device is presumed to exist, and executing a call request (e.g. a paging request) to the already located wireless cell and the presumably located wireless cell, in order to prevent a shortage of wireless resources and an increase in system load. The configuration of the RNC 7 for achieving this function will be described later.

The BTS 9 forms a 3G wireless area (wireless cell) by transmitting cell identification information (e.g. a cell identifier or a cell ID) to a specific range. In this example, the BTS 9 forms a 3G wireless cell (the area shown by the rectangular box in the drawing), and six wireless cells 9a, 9b, 9c, 9d, 9e, and 9f (the wireless cells 9a, 9b, 9c, 9d, 9e, and 9f are hereafter also referred to as "wireless cells 9a to 9f") are formed in this wireless cell. The wireless cells 9a to 9f are each a wireless cell (e.g. a microcell) formed by a BTS (not illustrated) other than the BTS 9.

The BTS 11 forms a 3G wireless cell (the area shown by the rectangular box in the drawing), and six wireless cells 11a, 11b, 11c, 11d, 11e, and 11f (the wireless cells 11a, 11b, 11c, 11d, 11e, and 11f are hereafter also referred to as "wireless cells 11a to 11f") are formed in this wireless cell. The wireless cells 11a to 11f are each a wireless cell (e.g. a microcell) formed by a BTS (not illustrated) other than the BTS 11.

The BTS 13 forms a 3G wireless cell (the area shown by the rectangular box in the drawing), and six wireless cells 13a, 13b, 13c, 13d, 13e, and 13f (the wireless cells 13a, 13b, 13c, 13d, 13e, and 13f are hereafter also referred to as "wireless cells 13a to 13f") are formed in this wireless cell. The wireless cells 13a to 13f are each a wireless cell (e.g. a microcell) formed by a BTS (not illustrated) other than the BTS 13.

The BTS 15 forms a 3G wireless cell (the area shown by the rectangular box in the drawing), and six wireless cells 15a, 15b, 15c, 15d, 15e, and 15f (the wireless cells 15a, 15b, 15c, 15d, 15e, and 15f are hereafter also referred to as "wireless cells 15a to 15f") are formed in this wireless cell. The wireless cells 15a to 15f are each a wireless cell (e.g. a microcell) formed by a BTS (not illustrated) other than the BTS 15.

In the case where the communication terminal device (not illustrated) is located in the wireless cell formed by any of the BTSs 9 to 15, the BTS forming the wireless cell in which the communication terminal device is located from among the BTSs 9 to 15 can wirelessly communicate with the communication terminal device according to 3G. For example, in the case where the communication terminal device is located in the wireless cell formed by the BTS 9, the communication terminal device communicates with the RNC 7 and SGSN 3 located upstream of (at an upper level of) the BTS 9, via the BTS 9. Each of the BTSs 9 to 15 is assigned cell identification information. Accordingly, which one of the BTSs 9 to 15 includes the wireless cell can be determined from the cell identification information. Similarly, each of the BTSs forming the wireless cells 9a to 9f, 11a to 11f, 13a to 13f, and 15a to 15f is assigned cell identification information. Accordingly, which one of the BTSs includes a made one of the wireless cells 9a to 9f, 11a to 11f, 13a to 13f, and 15a to 15f can be determined from the cell identification information.

The BTSs 9 and 11 each transmit radio waves of frequency #A (#A is a predetermined value, for example, 800 MHz) to the wireless cell, and form the wireless cell of frequency band A. The BTSs 13 and 15 each transmit radio waves of frequency #B (#B is a predetermined value different from #A, for example, 2 GHz) to the wireless cell, and form the wireless cell of frequency band #B.

In the present embodiment, for example, the wireless cells 9a and 13a are overlaid with each other, the wireless cells 9b and 13b are overlaid with each other, the wireless cells 9c and 13c are overlaid with each other, the wireless cells 9d and 13d are overlaid with each other, the wireless cells 9e and 13e are overlaid with each other, and the wireless cells 9f and 13f are overlaid with each other.

Moreover, for example, the wireless cells 11a and 15a are overlaid with each other, the wireless cells 11b and 15b are overlaid with each other, the wireless cells 11c and 15c are overlaid with each other, the wireless cells 11d and 15d are overlaid with each other, the wireless cells 11e and 15e are overlaid with each other, and the wireless cells 11f and 15f are overlaid with each other.

The wireless cells formed by the BTSs 9 to 15 and the wireless cells 9a to 9f, 11a to 11f, 13a to 13f, and 15a to 15f are included in the location registration area 17. The RNC 7 manages the BTSs 9 to 15 and the BTSs forming the wireless cells 9a to 9f, 11a to 11f, 13a to 13f, and 15a to 15f as lower nodes, thus indirectly managing the location registration area 17. The RNC 7 therefore corresponds to the management node for managing the location registration area 17.

For example, when receiving information indicating that the wireless cells 9a, 11b, and 13a are already located wireless cells from the SGSN 3, the RNC 7 derives the wireless cell 13b or the like as a presumably located wireless cell based on the received information, and makes a call request (e.g. a paging request) to the wireless cells 9a, 11b, and 13a and the wireless cell 13b as shown by the dashed arrows in the drawing (to be described in detail later). The RNC 7 may make the call request to the wireless cell 15b overlaid with the wireless cell 11b and the wireless cell 9b overlaid with the wireless cell 13b.

(Schematic Configuration of SGSN 3 as Exchange)

Figure 2:
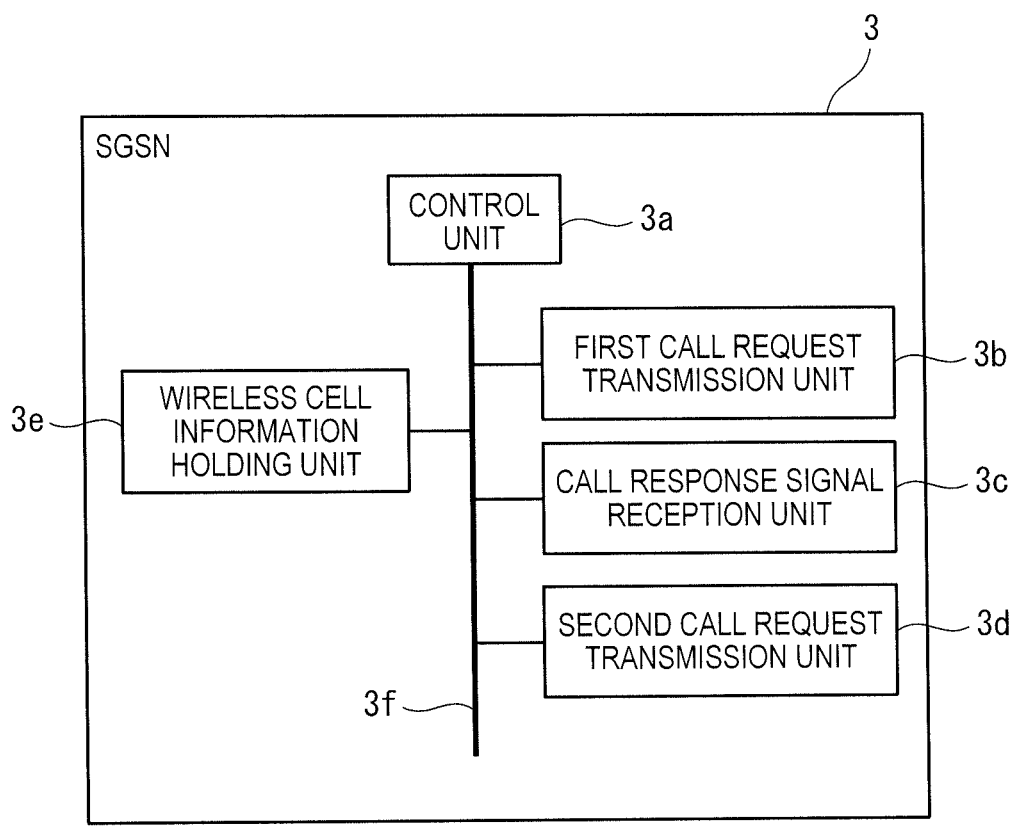
FIG. 2 is a block view illustrating the schematic configuration of an SGSN 3 as an exchange in the first embodiment of the present invention.

The SGSN 3 as the exchange in the present embodiment will be described by using FIG. 2 and FIG. 3 with reference to FIG. 1. FIG. 2 is a functional block view relating to the call request function of the SGSN 3.

As illustrated in FIG. 2, the SGSN 3 includes a control unit 3a, a first call request transmission unit 3b, a call response signal reception unit 3c, a second call request transmission unit 3d, and a wireless cell information holding unit 3e. Instead of separating the first call request transmission unit 3b and the second call request transmission unit 3d as illustrated in FIG. 2, one call request transmission unit may serve as both the first call request transmission unit 3b and the second call request transmission unit 3d.

The control unit 3a, the first call request transmission unit 3b, the call response signal reception unit 3c, the second call request transmission unit 3d, and the wireless cell information holding unit 3e are connected to a bus line 3f. The control unit 3a, the first call request transmission unit 3b, the call response signal reception unit 3c, the second call request transmission unit 3d, and the wireless cell information holding unit 3e may be realized physically as separate devices, or may be realized each as a function of the SGSN 3.

The control unit 3a integrally controls the SGSN 3. The first call request transmission unit 3b, the call response signal reception unit 3c, the second call request transmission unit 3d, and the wireless cell information holding unit 3e each perform a predetermined operation based on a control signal transmitted from the control unit 3a via the bus line 3f.

The first call request transmission unit 3b transmits the first call request which is a call request to only the already located wireless cell, to the management node for managing the location registration area composed of the plural wireless cells including the already located wireless cell.

The already located wireless cell mentioned here is the wireless cell in which the target communication terminal device that is a target of the communication request was located in the past predetermined period before the current time (the time of transmission of the first call request). For example, the wireless cells 9a, 11b, and 13b are already located wireless cells in FIG. 1. The management node is the RNC 7 in FIG. 1, as an example. The first call request includes the terminal identification information (e.g. user identifier, user ID, or MSISDN) of the target communication terminal device.

When the SGSN 3 receives the communication request including the terminal identification information of the target communication terminal device from an external device (not illustrated) connected to the wireless communication network system 1, the control unit 3a transmits the terminal identification information to the first call request transmission unit 3b. The first call request transmission unit 3b acquires the cell identification information (e.g. cell ID or cell identifier) of the already located wireless cell associated with the terminal identification information from the wireless cell information holding unit 3e (to be described in detail later), and transmits the first call request including the acquired cell identification information of the already located wireless cell and the received terminal identification information to the management node (the RNC in this example) managing the location registration area composed of the plural wireless cells including the acquired already located wireless cell.

The call response signal reception unit 3c receives a response signal to the first call request, from the management node. In this example, the first call request is transmitted to the RNC 7, and the call response signal reception unit 3c receives the response signal from the RNC 7. Having received the response signal, the call response signal reception unit 3c notifies the control unit 3a of the reception of the response signal.

The control unit 3a measures the standby time from when the first call request transmission unit 3b transmits the first call request signal to when the call response signal reception unit 3c receives the response signal. If the standby time from when the first call request transmission unit 3b transmits the first call request exceeds a predetermined period without the call response signal reception unit 3c receiving the response signal, the control unit 3a instructs the second call request transmission unit 3d to transmit a second call request.

The second call request is a call request to at least a wireless cell different from the already located wireless cell from among the plural wireless cells. The second call request includes the same terminal identification information as that included in the first call request. The plurality of wireless cells are the wireless cells included in the location registration area to which the first call request is made. The second call request transmission unit 3d transmits the second call request.

In detail, the second call request transmission unit 3d transmits the second call request to the management node, in the case where the call response signal reception unit 3c has not received the response signal to the first call request within the predetermined period after the transmission of the first call request by the first call request transmission unit 3b. The management node mentioned here is the management node for managing the location registration area to which the first call request is made (the RNC 7 in this example).

The wireless cell information holding unit 3e in the SGSN 3 will be described below, with reference to FIG. 3. FIG. 3 is a view illustrating an example of the configuration of the wireless cell information holding unit 3e.

As illustrated in FIG. 3, the wireless cell information holding unit 3e is mainly divided into three fields: "service type"; "wireless cell information of past communication"; and "wireless cell information of immediately previous communication". The "service type" indicates the type of service used by the communication terminal device. In this example, the "service type" field includes "incoming call", "email", and "Machine-to-Machine (M2M) reception". In the "service type" field, " . . . " indicates that any service type is stored. The "incoming call" indicates that the service used by the communication terminal device is voice call. The "email" indicates that the service used by the communication terminal device is email transmission/reception. The "incoming M2M" indicates communication to a communication terminal device used in M2M.

The "wireless cell information of past communication" is divided into three fields: "holding period T (sec)"; "maximum number N of held wireless cells (number)"; and "wireless cell information". The "holding period T (sec)" indicates the period during which wireless cell information is held in the wireless cell information holding unit 3e as an already located wireless cell. The "maximum number N of held wireless cells (number)" indicates the maximum number of already located wireless cells that can be held for one service type. The "wireless cell information" indicates the cell identification information of each already located wireless cell. In the wireless cell information, "wireless cell#" indicates cell identification information from which a wireless cell can be identified. Plural "wireless cells#" in the "wireless cell information" field do not necessarily represent the same cell identification information. In the "holding period T (sec)", "maximum number N of held wireless cells (number)", and "wireless cell information" fields, " . . . " indicates that any data of a holding period, maximum number, or the like is stored.

For example, the cell identification information of a wireless cell stored in the "wireless cell information" field in association with "incoming call" is deleted from the "wireless cell information" field, once the holding period Ta (sec) has elapsed from the holding into the wireless cell information holding unit 3e. Moreover, in the case of holding new cell identification information when the total number of pieces of cell identification information stored in the "wireless cell information" field and the "wireless cell information of immediately previous communication" field is the maximum number Na of held wireless cells, the cell identification information held earliest is deleted from the "wireless cell information" field, the cell identification information stored in the "wireless cell information of immediately previous communication" field is moved to the "wireless cell information" field, and the new cell identification information is stored in the "wireless cell information of immediately previous communication" field.

In this example, in association with the service type "incoming call", a period "Ta" is stored in the "holding period T (sec)", a maximum number "Na" is stored in the "maximum number N of held wireless cells (number)", and "wireless cell#, wireless cell#, wireless cell#, . . . " is stored in the "wireless cell information".

In this example, in association with the service type "email", a period "Tb" is stored in the "holding period T (sec)", a maximum number "Nb" is stored in the "maximum number N of held wireless cells (number)", and "wireless cell#, wireless cell#, wireless cell#, . . . " is stored in the "wireless cell information".

In this example, in association with the service type "incoming M2M", a period "Tx" is stored in the "holding period T (sec)", a maximum number "Nx" is stored in the "maximum number N of held wireless cells (number)", and "wireless cell#, wireless cell#, wireless cell#, . . . " is stored in the "wireless cell information".

Thus, the wireless cell information holding unit 3e holds the cell identification information of already located wireless cells up to the number (Na, Nb, or Nx in this example) set according to the service type.

In the wireless cell information holding unit 3e, the period for holding the cell identification information of each wireless cell is different depending on the service type (Ta seconds, Tb seconds, or Tx seconds in this example).

In the wireless cell information holding unit 3e, the period T for holding each already located wireless cell and the maximum holding number N are set according to the service type. For example, for a service in a communication terminal device that moves frequently (such as a mobile phone or a logistics movement management device), the holding period T is shorter and the maximum holding number N is larger than for a service in a communication terminal device that does not move frequently (such as a vending machine or a smart meter). In FIG. 3, for example, the holding period Ta of the service type "incoming call" is shorter than the holding period Tb of "email", and the holding period Tb is shorter than the holding period Tx of "incoming M2M". The maximum holding number Na of "incoming call" is larger than the maximum holding number Nb of "email", and the maximum holding number Nb is larger than the maximum holding number Nx of "incoming M2M". An incoming request of incoming call or email is expected to be made from a mobile terminal device which is a mobile communication terminal device, and such a mobile terminal device is more likely to move between wireless cells from one incoming request to the next incoming request than a communication terminal device used in M2M. Hence, in "incoming call" and "email" and especially in "incoming call", the maximum number of held wireless cells is larger while the holding period is shorter.

The "wireless cell information of immediately previous communication" indicates the cell identification information of the wireless cell in which the communication terminal device communicated immediately before the first call request transmission unit 3b transmits the first call request to the management node. In other words, from among the plural pieces of cell identification information stored in the "wireless cell information of immediately previous communication" and the "wireless cell information", the wireless cell of the cell identification information stored in the "wireless cell information of immediately previous communication" is the latest wireless cell in which the communication terminal device communicated. In the "wireless cell information of immediately previous communication" field, " . . . " indicates that any cell identification information is stored.

In this example, "wireless cell#" is stored in "wireless cell information of immediately previous communication", in association with each of the service types "incoming call", "email", and "incoming M2M". The "wireless cells#" in the "wireless cell information of immediately previous communication" fields of these service types do not necessarily represent the same cell identification information.

Referring back to FIG. 2, the wireless cell information holding unit 3e holds the cell identification information of already located wireless cells in table form illustrated in FIG. 3, for the terminal identification information of each communication terminal device having communication history with the SGSN 3. The wireless cell information holding unit 3e can thus hold the terminal identification information of each communication terminal device having communication history with the SGSN 3 and the cell identification information of each wireless cell in which the communication terminal device was located in the past, in association with each other according to the service type.

(Schematic Configuration of RNC 7 as Schematic Configuration of Wireless Network Control Device)

Figure 4:
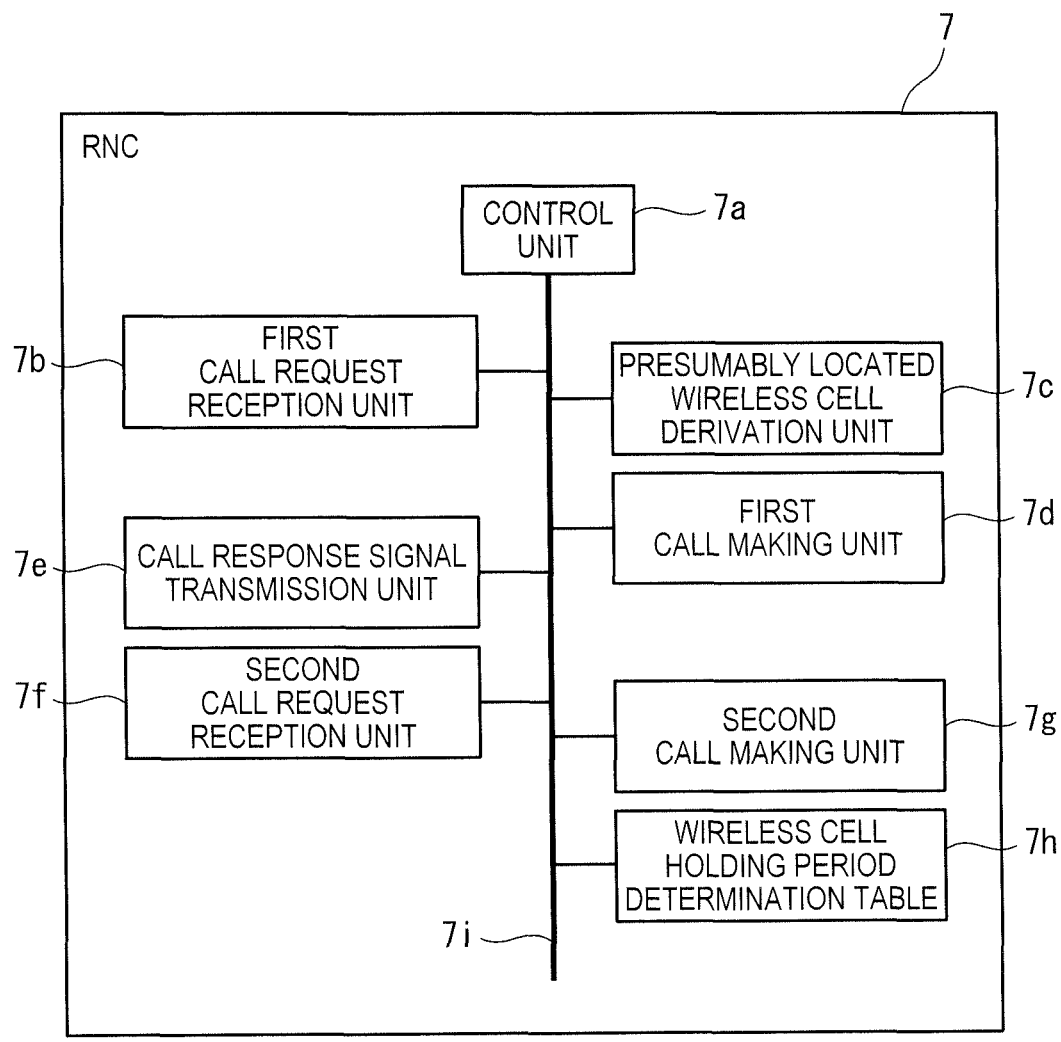
FIG. 4 is a block view illustrating the schematic configuration of a wireless network control device (RNC 7) in the first embodiment of the present invention.

The RNC 7 as the wireless network control device in the present embodiment will be described by using FIG. 4 and FIG. 5 with reference to FIG. 1. FIG. 4 is a functional block view of the RNC 7 relating to the first call request received from the SGSN 3.

As illustrated in FIG. 4, the RNC 7 includes a control unit 7a, a first call request reception unit 7b, a presumably located wireless cell derivation unit 7c, a first call making unit 7d, a call response signal transmission unit 7e, a second call request reception unit 7f, a second call making unit 7g, and a wireless cell holding period determination table 7h. Instead of separating the first call request reception unit 7b and the second call request reception unit 7f as illustrated in FIG. 4, one call request reception unit may serve as both the first call request reception unit 7b and the second call request reception unit 7f. Instead of separating the first call making unit 7d and the second call making unit 7g as illustrated in FIG. 4, one call making unit may serve as both the first call making unit 7d and the second call making unit 7g.

The control unit 7a, the first call request reception unit 7b, the presumably located wireless cell derivation unit 7c, the first call making unit 7d, the call response signal transmission unit 7e, the second call request reception unit 7f, the second call making unit 7g, and the wireless cell holding period determination table 7h are connected to a bus line 7i. The control unit 7a, the first call request reception unit 7b, the presumably located wireless cell derivation unit 7c, the first call making unit 7d, the call response signal transmission unit 7e, the second call request reception unit 7f, the second call making unit 7g, and the wireless cell holding period determination table 7h may be realized physically as separate devices, or may be realized each as a function of the RNC 7.

The control unit 7a integrally controls the RNC 7. The first call request reception unit 7b, the presumably located wireless cell derivation unit 7c, the first call making unit 7d, the call response signal transmission unit 7e, the second call request reception unit 7f, the second call making unit 7g, and the wireless cell holding period determination table 7h each perform a predetermined operation based on a control signal transmitted from the control unit 7a via the bus line 7i.

The first call request reception unit 7b receives the first call request which is a call request to only the already located wireless cell, from its upper node.

The already located wireless cell mentioned here is the wireless cell in which the target communication terminal device that is a target of the communication request was located in the past predetermined period before the current time (the time of transmission of the first call request from the first call request transmission unit 3b). The upper node is the upper node of the RNC 7, and is the SGSN 3 in FIG. 1 as an example. The first call request received by the first call request reception unit 7b includes the terminal identification information (e.g. user identifier, user ID, or MSISDN) of the target communication terminal device.

When the RNC 7 receives the first call request including the terminal identification information of the target communication terminal device and the cell identification information of the already located wireless cell from the SGSN 3 via the first call request reception unit 7b, the control unit 7a transmits the cell identification information of the already located wireless cell to the presumably located wireless cell derivation unit 7c, and instructs the presumably located wireless cell derivation unit 7c to derive a presumably located wireless cell. The control unit 7a also transmits the terminal identification information of the target communication terminal device to the first call making unit 7d, and instructs the first call making unit 7d to make the call request.

The presumably located wireless cell derivation unit 7c derives the presumably located wireless cell in which the target communication terminal device is presumed to exist, based on the already located wireless cell that is a target of the first call request received by the first call request reception unit 7b. In more detail, the presumably located wireless cell derivation unit 7c derives the presumably located wireless cell based on the cell identification information of the already located wireless cell transmitted from the control unit 7a and the wireless cell holding period determination table 7h (to be described in detail later), and transmits the derived presumably located wireless cell to the first call making unit 7d.

The wireless cell holding period determination table 7h will be described below, with reference to FIG. 5A and FIG. 5B. FIG. 5A and FIG. 5B are views illustrating examples of the configuration of a data table included in the wireless cell holding period determination table 7h. The wireless cell holding period determination table 7h is a table for determining the period for holding the cell identification information of each wireless cell in which the target communication terminal device communicated in the past predetermined period before the time of transmission of the first call request from the first call request transmission unit 3b (see FIG. 2), according to the service type and a predetermined condition. Although the wireless cell holding period determination table 7h has two types of data tables in the present embodiment, the number of data tables is not limited to such.

As illustrated in FIG. 5A, the wireless cell holding period determination table 7h is mainly divided into two fields:

"service type"; and "wireless cell of past communication". The "service type" indicates the type of service used by the communication terminal device. In this example, the "service type" field includes "incoming call", "email", and "incoming M2M". In the "service type" field, " . . . " indicates that any service type is stored. The "incoming call" indicates that the service used by the communication terminal device is voice call. The "email" indicates that the service used by the communication terminal device is email transmission/reception. The "incoming M2M" indicates communication to a communication terminal device which is an M2M device.

The "wireless cell of past communication" indicates an already located wireless cell. The "holding period T" indicates the period for holding the cell identification information of the already located wireless cell to derive a presumably located wireless cell. The "holding period T" is classified according to the remaining paging capacity. The "remaining paging capacity" is the capacity remaining as a result of subtracting the capacity of the call request to the already located wireless cell from the capacity of call requests to all wireless cells included in the location registration area.

The "holding period T" is classified according to the remaining paging capacity and the service type. The remaining paging capacity corresponds to the predetermined condition used to determine the cell identification information holding period. In the wireless cell holding period determination table 7h, the cell identification information holding period is longer when the first call request capacity is smaller, and the cell identification information holding period is shorter when the first call request capacity is larger.

In this example, the "holding period T" associated with the service type "incoming call" is "Ta1 (sec)" when the remaining paging capacity is not less than P1 and not greater than P2, "Ta2 (sec)" when the remaining paging capacity is greater than P2 and not greater than P3, and "Tan (sec)" when the remaining paging capacity is greater than Pn−1 and not greater than Pn.

In this example, the "holding period T" associated with the service type "email" is "Tb1 (sec)" when the remaining paging capacity is not less than P1 and not greater than P2, "Tb2 (sec)" when the remaining paging capacity is greater than P2 and not greater than P3, and "Tbn (sec)" when the remaining paging capacity is greater than Pn−1 and not greater than Pn.

In this example, the "holding period T" associated with the service type "incoming M2M" is "Tx1 (sec)" when the remaining paging capacity is not less than P1 and not greater than P2, "Tx2 (sec)" when the remaining paging capacity is greater than P2 and not greater than P3, and "Txn (sec)" when the remaining paging capacity is greater than Pn−1 and not greater than Pn. In each field of the database configuration illustrated in FIG. 5A, indicates that any data of a service type, time, or the like is stored.

When the remaining paging capacity is smaller, paging needs to be performed more efficiently, so that the cell identification information holding period is set to be longer. Accordingly, in the present embodiment, the "holding period T" is set to, for example, satisfy the relationship "Ta1>Ta2>Tan" in the service type "incoming call", satisfy the relationship "Tb1>Tb2>Tbn" in the service type "email", and satisfy the relationship "Tx1>Tx2>Txn" in the service type "incoming M2M".

The relationship of the periods set in the "holding period T" field is merely an example, and the present invention is not limited to such. The periods set in the "holding period T" field may satisfy a different relationship.

FIG. 5B illustrates another example of the configuration of the data table included in the wireless cell holding period determination table 7h. As illustrated in FIG. 5B, the "holding period T" is classified according to "time of day" in the data table configuration in this example. The time of day corresponds to the predetermined condition used to determine the cell identification information holding period.

In this example, the "holding period T" associated with the service type "incoming call" is "Ta1 (sec)" in the time of day 1, "Ta2 (sec)" in the time of day 2, and "Tan (sec)" in the time of day n.

In this example, the "holding period T" associated with the service type "email" is "Tb1 (sec)" in the time of day 1, "Tb2 (sec)" in the time of day 2, and "Tbn (sec)" in the time of day n.

In this example, the "holding period T" associated with the service type "incoming M2M" is "Tx1 (sec)" in the time of day 1, "Tx2 (sec)" in the time of day 2, and "Txn (sec)" in the time of day n. In each field of the database configuration illustrated in FIG. 5B, " . . . " indicates that any data of a service type, time, or the like relating to the field is stored.

The communication situation typically varies depending on the time of day. As an example, during late night hours, the user of a mobile communication terminal device is sleeping, and the mobile communication terminal device is likely to remain at one location. As another example, during hours when communication is congested, one mobile communication terminal device may make plural communication connection requests (e.g. incoming requests) due to communication errors or the like. Further, during commuting hours, a mobile communication terminal device of a user on the way to or from workplace is likely to move frequently. Accordingly, in the present embodiment, the "holding period T" is relatively long during late night hours and relatively short during commuting hours, as an example.

For example, suppose five times of day (n=5 in "time of day n" in FIG. 5B) are defined, where "time of day 1" is late night hours (01:00 to 07:00), "time of day 2" is commuting hours (07:00 to 10:00), "time of day 3" (not illustrated in FIG. 5B) is daylight hours (10:00 to 17:00), "time of day 4" (not illustrated in FIG. 5B) is hours from daytime to nighttime (17:00 to 21:00), and "time of day 5" (n=5 in FIG. 5B) is hours before bedtime to midnight (21:00 to 01:00 of the following day). The "holding period T" in the "time of day 1" is longer than the "holding period T" in the "time of day 2". The "holding period T" in the "time of day 3" is longer than the "holding period T" in the "time of day 2", and shorter than the "holding period T" in the "time of day 1". The "holding period T" in the "time of day 4" is longer than the "holding period T" in the "time of day 3", and shorter than the "holding period T" in the "time of day 1". The "holding period T" in the "time of day 5" is longer than the "holding period T" in the "time of day 4", and shorter than the "holding period T" in the "time of day 1".

The relationship of the periods set in the "holding period T" field is merely an example, and the present invention is not limited to such. The periods set in the "holding period T" field may satisfy a different relationship.

Referring back to FIG. 4, the presumably located wireless cell derivation unit 7c determines the holding period based on the service type that is a target of the communication request, the total capacity of the call request to the already located wireless cell received by the first call request reception unit 7b, and the time of day in which the first call request is made, with reference to the wireless cell holding period determination table 7h. The presumably located wireless cell derivation unit 7c then determines and derives, as the presumably located wireless cell, a wireless cell that is different from the already located wireless cell received by the first call request reception unit 7b and has not elapsed the already located wireless cell holding period, from among the already located wireless cells held in the RNC 7. Meanwhile, the presumably located wireless cell derivation unit 7c deletes, from the call target, any wireless cell that has elapsed the already located wireless cell holding period from among the already located wireless cells received by the first call request reception unit 7b. The presumably located wireless cell derivation unit 7c thus derives the presumably located wireless cell, and transmits the cell identification information of the derived presumably located wireless cell to the first call making unit 7d. In the case where there is a wireless cell that is overlaid with the already located wireless cell or the derived presumably located wireless cell, the presumably located wireless cell derivation unit 7c may transmit the cell identification information of the overlaid wireless cell to the first call making unit 7d. Information of which wireless cells are overlaid with each other is, for example, stored in a predetermined storage unit (not illustrated) in the RNC 7. In the case of deriving a wireless cell to be deleted from the already located wireless cells, the presumably located wireless cell derivation unit 7c transmits the cell identification information of the wireless cell to the first call making unit 7d.

The first call making unit 7d makes the call to the already located wireless cell transmitted from the first call request reception unit 7b and the presumably located wireless cell transmitted from the presumably located wireless cell derivation unit 7c. The first call making unit 7d may make a call to a wireless cell overlaid with the already located wireless cell to be called and a wireless cell overlaid with the presumably located wireless cell to be called. Suppose the first call making unit 7d receives the cell identification information of the wireless cells 9a, 11b, and 13a (see FIG. 1) from the first call request reception unit 7b as the already located wireless cells, and receives the cell identification information of the wireless cell 13b (see FIG. 1) from the presumably located wireless cell derivation unit 7c as the presumably located wireless cell. In this case, the first call making unit 7d makes the first call request (e.g. paging request) to the wireless cells 9a, 11b, 13a, and 13b, as shown by the dashed arrows in FIG. 1. The first call making unit 7d may make the first call request to the wireless cell 15b overlaid with the wireless cell 11b, and the wireless cell 9b overlaid with the wireless cell 13b.

The call response signal transmission unit 7e, upon receiving a response signal from the communication terminal device to the first call request made by the first call making unit 7d, transmits the response signal to the upper node (the SGSN 3 in the present embodiment).

The second call request reception unit 7f receives the second call request transmitted from the second call request transmission unit 3d in the SGSN 3. The second call request is a request transmitted from the SGSN 3 in the case where the call response signal reception unit 3c has not received the response signal to the first call request within the predetermined period from the transmission of the first call request by the first call request transmission unit 3b. In other words, the second call request is a request transmitted from the SGSN 3 in the case where the call response signal transmission unit 7e has not transmitted the response signal within the predetermined period from the reception of the first call request by the first call request reception unit 7b. The second call request received by the second call request reception unit 7f includes at least the cell identification information of a wireless cell different from the already located wireless cell from among the plural wireless cells included in the location registration area called by the first call request. The second call request received by the second call request reception unit 7f also includes the same terminal identification information as that included in the first call request.

The second call making unit 7g makes the call to the wireless cell different from the already located wireless cell, based on the second call request received by the second call request reception unit 7f. When the second call making unit 7g makes the second call request, the presumably located wireless cell derivation unit 7c does not derive the presumably located wireless cell.

(Operation of Wireless Communication Network System 1 Including SGSN 3 and RNC 7)

Figure 6:
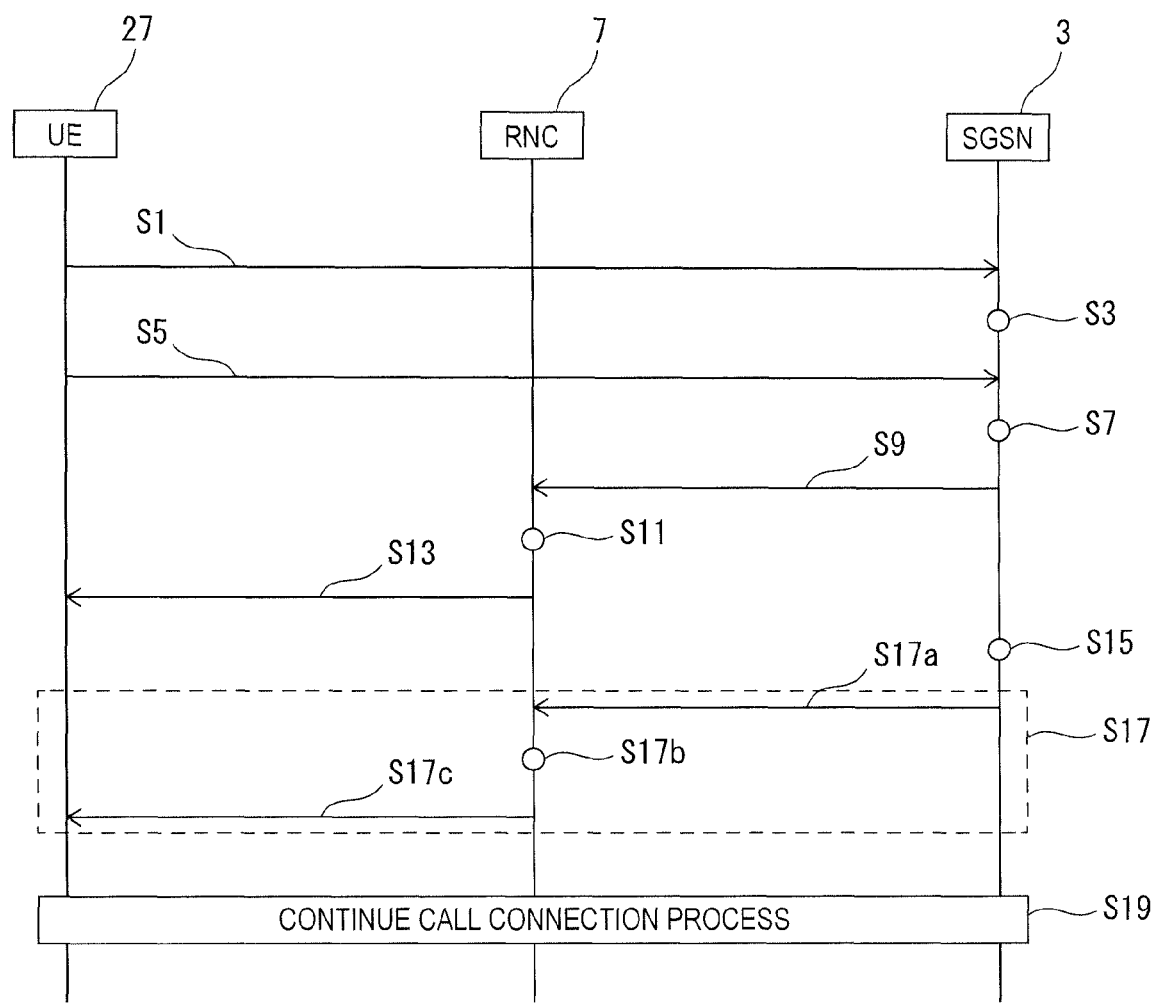
FIG. 6 is a sequence view illustrating an example of the operation of the wireless communication network system 1 in the first embodiment of the present invention.

The operations of the SGSN 3 as the exchange, the RNC 7 as the wireless network control device, and the wireless communication network system 1 including these devices in the present embodiment will be described by using FIG. 6 with reference to FIG. 1 to FIG. 5. FIG. 6 is a sequence view illustrating an example of the operation of the wireless communication network system 1 in the present embodiment.

As illustrated in FIG. 6, the wireless communication network system 1 carries out a location registration process each time the location registration area in which a communication terminal device (user equipment (UE)) 27 is located changes.

For example, when the UE 27 recognizes a change of the area information of the location registration area, the UE 27 makes a location registration request to the SGSN 3 via the RNC 7 (step S1). The location registration request includes the cell identification information of the cell in which the UE 27 is located.

The SGSN 3 holds the cell identification information included in the location registration request, in the wireless cell information holding unit 3e in association with the terminal identification information of the UE 27 (step S3). The RNC 7 equally stores the cell identification information included in the location registration request, in a predetermined storage unit in association with the terminal identification information of the UE 27.

The UE 27 transmits a connection establishment signal via the RNC 7, in order to establish a signaling connection with the SGSN 3 (step S5). The connection establishment signal includes the cell identification information of the cell in which the UE 27 is located.

The SGSN 3 holds the cell identification information included in the connection establishment signal, in the wireless cell information holding unit 3e in association with the terminal identification information of the UE 27 (step S7). The RNC 7 equally stores the cell identification information included in the connection establishment signal, in the predetermined storage unit in association with the terminal identification information of the UE 27.

Thus, upon receiving the location registration request signal or the connection establishment signal, the RNC 7 and the SGSN 3 each store the cell identification information of the UE 27 and the like included in such a signal, and also update the held information. In this way, for example, the presence history of each wireless cell in which the UE 27 is located can be held in the wireless cell information holding unit 3e in the SGSN 3.

In the case where a signal transmitted from the UE 27 other than the location registration request signal or the connection establishment signal includes cell identification information, the information may be held in the storage unit.

For example, suppose an incoming call request to the UE 27 is made from an external device (not illustrated) connected to the wireless communication network system 1. When the SGSN 3 receives the incoming request, the control unit 3a instructs the wireless cell information holding unit 3e to transmit the cell identification information of the already located wireless cell associated with the terminal identification information of the UE 27 and the service type (incoming call in this example) in the "service type" field illustrated in FIG. 3, to the first call request transmission unit 3b. Having received the instruction, the wireless cell information holding unit 3e transmits, to the first call request transmission unit 3b, the cell identification information of the already located wireless cell stored in association with the "incoming call" in the "wireless cell information" field and "wireless cell information of immediately previous communication" field associated with the terminal identification information of the UE 27. The first call request transmission unit 3b transmits the first call request including the terminal identification information of the UE 27 that is a target of the incoming request and the received cell identification information of the already located wireless cell, to the RNC 7 (step S9). When the first call request transmission unit 3b transmits the first call request, the control unit 3a starts measuring the standby time until the reception of the response signal to the first call request.

Having received the first call request, the RNC 7 derives the presumably located wireless cell (step S11). In step S11, for example, the control unit 7a transmits the cell identification information of the already located wireless cell included in the first call request to the presumably located wireless cell derivation unit 7c, and instructs the presumably located wireless cell derivation unit 7c to derive the presumably located wireless cell. The control unit 7a also transmits the terminal identification information of the target communication terminal device to the first call making unit 7d, and instructs the first call making unit 7d to make the call request. Having received the instruction from the control unit 7a, the presumably located wireless cell derivation unit 7c derives the presumably located wireless cell based on the wireless cell holding period determination table 7h, the cell identification information of the already located wireless cell, the service type that is a target of the communication request (incoming call in this example), the remaining call request capacity (remaining paging capacity), and the time of day in which the first call request is made. The presumably located wireless cell derivation unit 7c transmits the cell identification information of the derived presumably located wireless cell to the first call making unit 7d. In the case where there is a wireless cell overlaid with the already located wireless cell or the derived presumably located wireless cell, the presumably located wireless cell derivation unit 7c may transmit the cell identification information of the overlaid wireless cell to the first call making unit 7d.

The first call making unit 7d receives the terminal identification information of the UE 27 from the control unit 7a, receives the cell identification information of the already located wireless cell from the first call request reception unit 7b, receives the cell identification information of the presumably located wireless cell from the presumably located wireless cell derivation unit 7c, and receives the instruction to make the first call request from the control unit 7a. The first call making unit 7d then makes the call request to the already located wireless cell and presumably located wireless cell indicated by the cell identification information and, when necessary, the wireless cell overlaid with the already located wireless cell and the presumably located wireless cell (step S13).

Suppose the UE 27 does not exist in the already located wireless cell included in the first call request or the presumably located wireless cell. In this case, the RNC 7 does not receive the response signal to the first call request. As a result, the time measured by the control unit 3a in the SGSN 3 exceeds the predetermined period, and the standby time for the response signal reaches a timeout (step S15).

When the standby time reaches a timeout, the SGSN 3 makes the second call request used in the case where the first call request fails (step S17).

The second call request transmission unit 3d transmits the second call request including information indicating the execution of the call request to a wireless cell other than the already located wireless cell in the location registration area included in the first call request, to the RNC 7 (step S17a). The second call request may include information indicating the execution of the call request to all wireless cells included in the location registration area.

The control unit 7a acquires the cell identification information of the wireless cell included in the location registration area and different from the already located wireless cell, and transmits the cell identification information to the second call making unit 7g (step S17b). In the case where the second call request includes the information indicating the execution of the call request to all wireless cells included in the location registration area, the control unit 7a acquires the cell identification information of all wireless cells included in the location registration area, and transmits the cell identification information to the second call making unit 7g.

Having received the instruction to make the second call request, the second call making unit 7g makes the second call request to the wireless cell designated by the control unit 7a (step S17c).

The SGSN 3 receives the response signal to the second call request, and starts and continues a call connection process by an already known method (step S19).

If the SGSN 3 receives the response signal to the first call request before the standby time reaches a timeout, the SGSN 3 starts and continues the call connection process by the already known method (step S19).

As described above, the exchange, wireless network control device, and wireless communication network system including these devices in the present embodiment can make the first call request (paging request) not to all wireless cells included in the location registration area but to only a wireless cell in which the communication terminal device is relatively likely to exist. In this way, the exchange, wireless network control device, and wireless communication network system including these devices in the present embodiment can prevent a shortage of wireless resources and an increase in system load.

Even in the case where the response signal to the first call request is not obtained, the exchange, wireless network control device, and wireless communication network system including these devices in the present embodiment can make the second call request to a wireless cell other than the wireless cell that is a target of the first call request. The call request amount in such an exchange, wireless network control device, and wireless communication network system including these devices in the present embodiment is not greater than that in a wireless communication network system in one technology.

Even when the second call request is made to all wireless cells included in the location registration area, the call request is made in two stages in the present embodiment, where the amount of the first call request is less than the amount of the call request to all wireless cells. Hence, the amount of call request made by the wireless communication network system in a predetermined period (e.g. one day) can be reduced as a whole in the present embodiment. According to such an embodiment, a shortage of wireless resources and an increase in system load can be prevented even when the second call request is made to all wireless cells included in the location registration area.

(Comparison with a Wireless Communication Network System in Prior Art Technology)

Comparisons of the exchange, wireless network control device, and wireless communication network system including these devices in the present embodiment with a wireless communication network system in one technology will be described by using FIG. 7 to FIG. 10.

Figure 7:
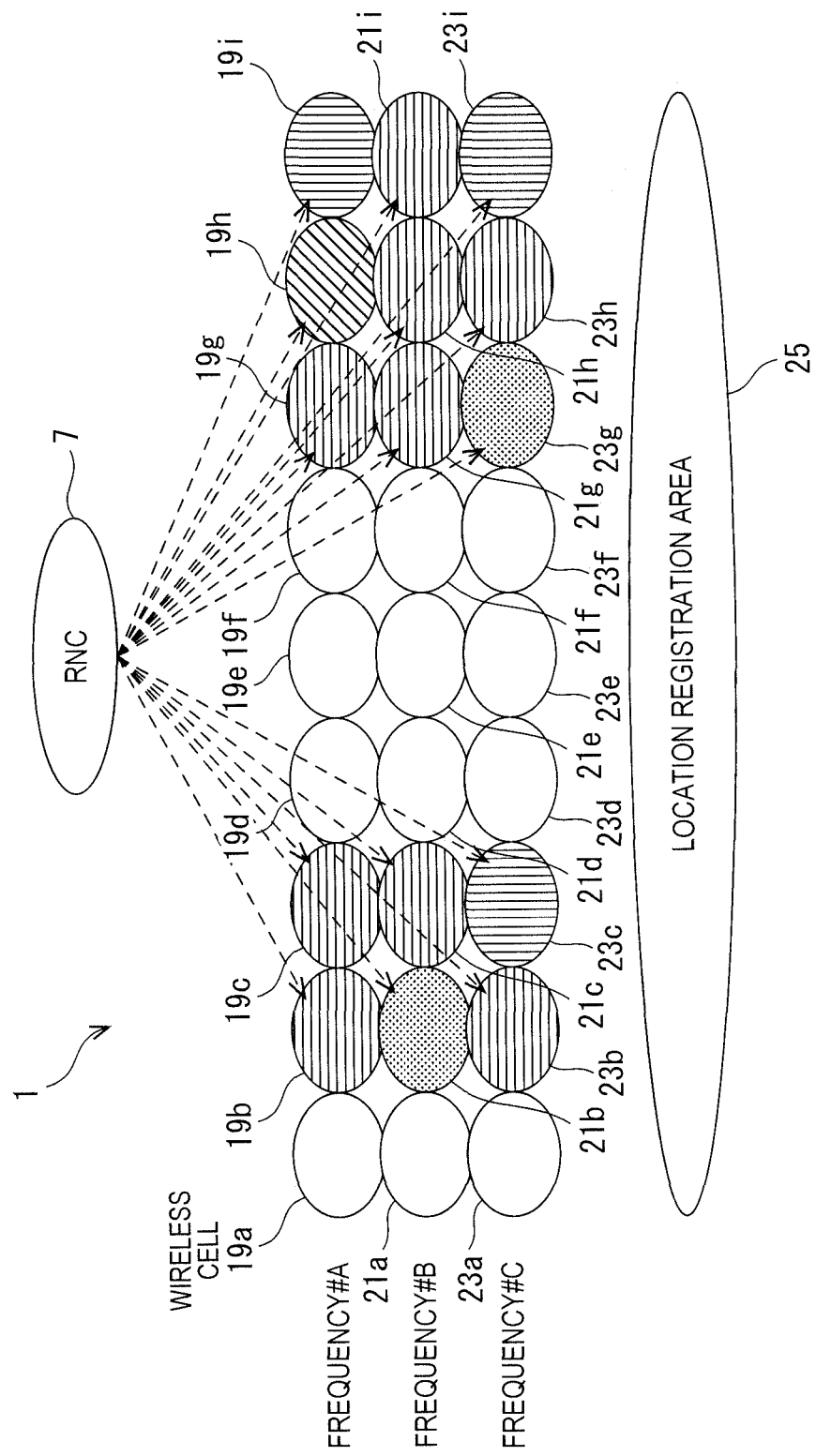
FIG. 7 is a view schematically illustrating a first call request (first paging request) in the wireless communication network system 1 in the first embodiment of the present invention.

FIG. 7 schematically illustrates the state in which the first call request is made in the wireless communication network system 1 in the present embodiment. As illustrated in FIG. 7, the RNC 7 is a management node for managing a location registration area 25. The location registration area 25 is composed of wireless cells 19a, 19b, 19c, 19d, 19e, 19f, 19g, 19h, and 19i (hereafter referred to as 19a to 19i), wireless cells 21a, 21b, 21c, 21d, 21e, 21f, 21g, 21h, and 21i (hereafter referred to as 21a to 21i), and wireless cells 23a, 23b, 23c, 23d, 23e, 23f, 23g, 23h, and 23i (hereafter referred to as 23a to 23i). The wireless cells 19a to 19i are wireless cells formed by a BTS (not illustrated) transmitting radio waves of frequency #A. The wireless cells 21a to 21i are wireless cells formed by a BTS (not illustrated) transmitting radio waves of frequency #B. The wireless cells 23a to 23i are wireless cells formed by a BTS (not illustrated) transmitting radio waves of frequency #C.

The wireless cells 19a, 21a, and 23a are overlaid with each other. The wireless cells 19b, 21b, and 23b are overlaid with each other. The wireless cells 19c, 21c, and 23c are overlaid with each other. The wireless cells 19d, 21d, and 23d are overlaid with each other. The wireless cells 19e, 21e, and 23e are overlaid with each other. The wireless cells 19f, 21f, and 23f are overlaid with each other. The wireless cells 19g, 21g, and 23g are overlaid with each other. The wireless cells 19h, 21h, and 23h are overlaid with each other. The wireless cells 19i, 21i, and 23i are overlaid with each other.

Suppose the SGSN 3 (not illustrated in FIG. 7) as the exchange determines the wireless cell 19h in which the target communication terminal device (not illustrated) communicated immediately previously and the wireless cells 19i, 23c, and 23i in which the target communication terminal device communicated before the wireless cell 19h, as already located wireless cells. Also suppose the RNC 7 derives the wireless cells 21b and 23g as presumably located wireless cells. In this example, the RNC 7 makes the first call request to the wireless cells 19h, 19i, 21b, 23c, 23g, and 23i and the wireless cells 21h, 23h, 21i, 19b, 23b, 19c, 21c, 19g, and 21g overlaid with these wireless cells, as shown by the dashed arrows in FIG. 7. The first call request is made on 18 out of 27 wireless cells included in the location registration area 25. Accordingly, the first call request amount in the present embodiment is about 67% (=(18/27)×100) with respect to the case where the call request is made to all of 27 wireless cells. Since part (about 33% in this example) of the wireless resources between the RNC 7 and the location registration area 25 is released, communication with the RNC 7 is possible. Moreover, the call request amount is reduced in the present embodiment, thus preventing an increase in system load.

Figure 8:
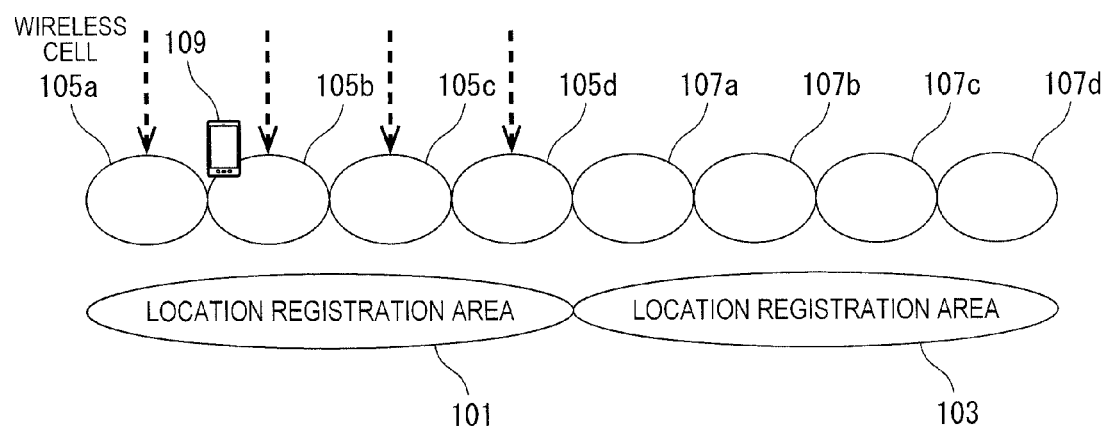
FIG. 8 is a view schematically illustrating a paging request in a wireless communication network in one technology.

FIG. 8 schematically illustrates a call request in a wireless communication network system in one technology. As illustrated in FIG. 8, a location registration area 101 is composed of wireless cells 105a, 105b, 105c, and 105d, and a location registration area 103 is composed of wireless cells 107a, 107b, 107c, and 107d.

For example, in the case where a mobile communication terminal device 109 is located in the wireless cell 105b, the wireless communication network system in one technology makes the call request to not only the wireless cell 105b but also the wireless cells 105a, 105c, and 105d in the location registration area 101, as shown by the dashed arrows in FIG. 8.

The call request amount in the wireless communication network system in one technology is therefore 100%. Since no wireless resource between an RNC (not illustrated) and the location registration area 101 is released, a shortage of wireless resources occurs. Besides, the call request amount increases in the wireless communication network system in one technology, which causes an increase in system load.

Figure 9:
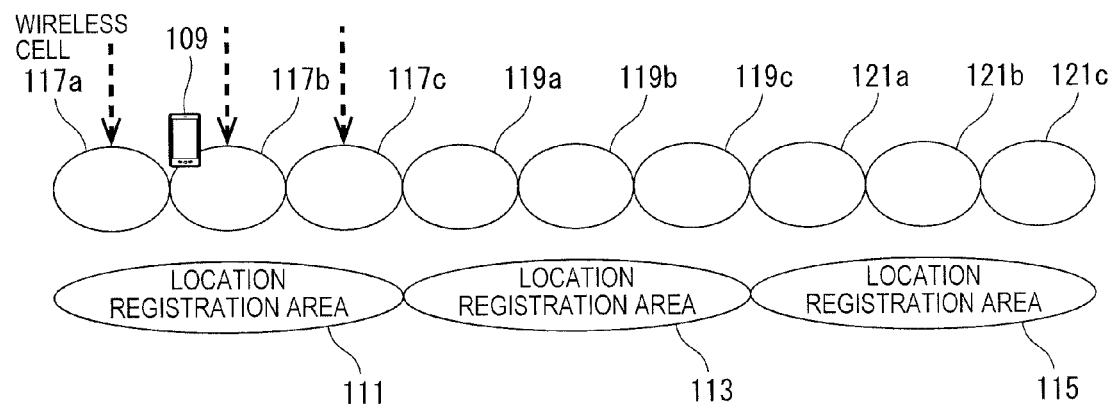
FIG. 9 is a view schematically illustrating another paging request in the wireless communication network in one technology.

FIG. 9 schematically illustrates a call request in another wireless communication network system in one technology. As illustrated in FIG. 9, each location registration area is smaller in the wireless communication network system in this example than in the wireless communication network system in one technology illustrated in FIG. 8. A location registration area 111 is composed of wireless cells 117a, 117b, and 117c, a location registration area 113 is composed of wireless cells 119a, 119b, and 119c, and a location registration area 115 is composed of wireless cells 121a, 121b, and 121c.

For example, in the case where the mobile communication terminal device 109 is located in the wireless cell 117b, the wireless communication network system makes the call request to not only the wireless cell 117b but also the wireless cells 117a and 117c in the location registration area 111 in one technology, as shown by the dashed arrows in FIG. 9.

The call request amount in the wireless communication network system is therefore 100% in one technology. Since no wireless resource between an RNC (not illustrated) and the location registration area 111 is released, a shortage of wireless resources occurs. Each location registration area is smaller in the wireless communication network system in this example in one technology than in the wireless communication network system illustrated in FIG. 8, and the absolute value of the call request amount is smaller. However, the likelihood of the mobile communication terminal device 109 moving between location registration areas is higher. Hence, the wireless communication network system in this example in one technology does not have a significant effect in reducing the system load, as compared with the wireless communication network system illustrated in FIG. 8.

Figure 10:
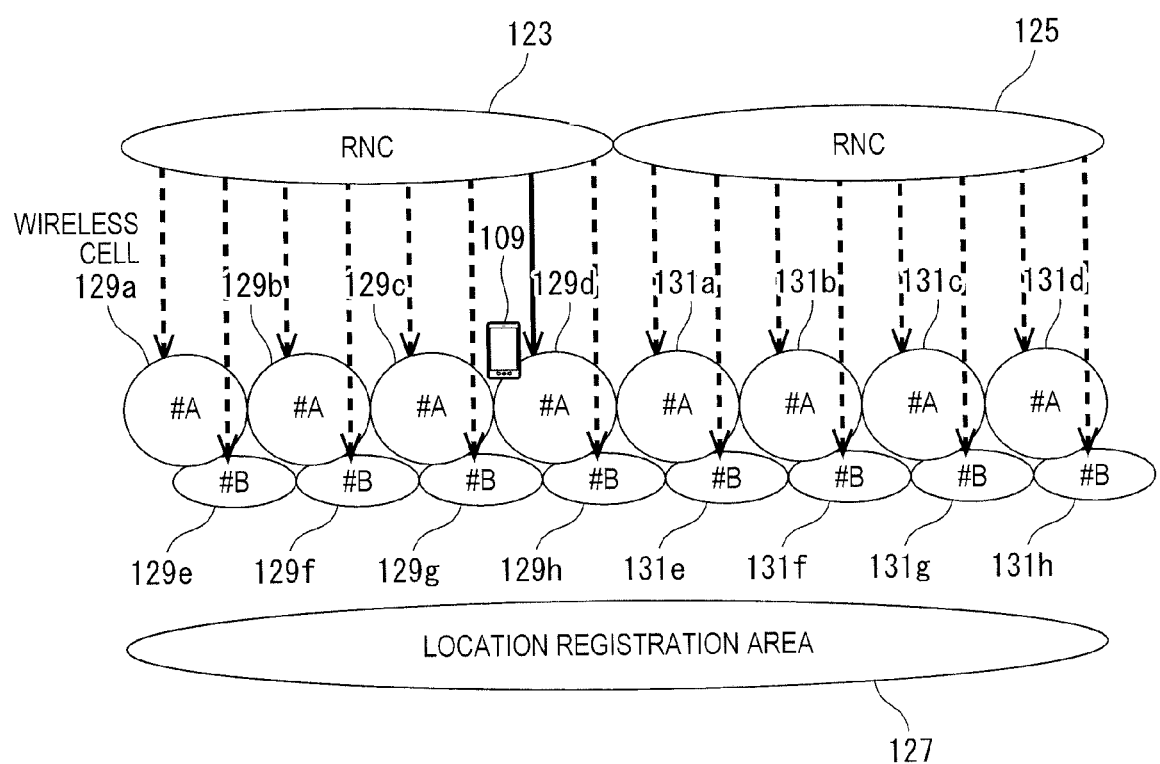
FIG. 10 is a view schematically illustrating yet another paging request in the wireless communication network in one technology.

FIG. 10 schematically illustrates a call request in yet another wireless communication network system in one technology. As illustrated in FIG. 10, in the wireless communication network system in this example in one technology, a location registration area 127 is managed by two RNCs 123 and 125. The wireless communication network system in this example in one technology has a configuration in which wireless cells of different frequencies are overlaid with each other.

As illustrated in FIG. 10, the location registration area 127 is composed of wireless cells 129a, 129b, 129c, 129d, 129e, 129f, 129g, and 129h and wireless cells 131a, 131b, 131c, 131d, 131e, 131f, 131g, and 131h. The wireless cells 129a, 129b, 129c, and 129d and the wireless cells 131a, 131b, 131c, and 131d are wireless cells formed by a BTS (not illustrated) transmitting radio waves of frequency #A. The wireless cells 129e, 129f, 129g, and 129h and the wireless cells 131e, 131f, 131g, and 131h are wireless cells formed by a BTS (not illustrated) transmitting radio waves of frequency #B. The wireless cells 129a and 129e are overlaid with each other, the wireless cells 129b and 129f are overlaid with each other, the wireless cells 129c and 129g are overlaid with each other, and the wireless cells 129d and 129h are overlaid with each other. The wireless cells 131a and 131e are overlaid with each other, the wireless cells 131b and 131f are overlaid with each other, the wireless cells 131c and 131g are overlaid with each other, and the wireless cells 131d and 131h are overlaid with each other.

For example, in the case where the mobile communication terminal device 109 is located in the wireless cell 129d in a standby state of frequency #A, the wireless communication network system in one technology makes the call request to not only the wireless cells 129a, 129b, 129c, 131a, 131b, 131c, and 131d in the same frequency band as the wireless cell 129d but the wireless areas 129e, 129f, 129g, 129h, 131e, 131f, 131g, and 131h in a different frequency band, as shown by the dashed arrows in FIG. 10.

The call request amount in the wireless communication network system in one technology is therefore 100%. Since no wireless resource between an RNC (not illustrated) and the location registration area 127 is released, a shortage of wireless resources and an increase in system load cannot be prevented.

In the wireless communication network system 1 in the present embodiment, on the other hand, the first call request is made to only part of the wireless cells included in the location registration area. As a result, the call request amount is reduced, wireless resources between the RNC 7 and the location registration area 25 are secured, and an increase in system load is prevented.

(First Variation)
(Schematic Configuration of Wireless Network Control Device in the First Variation)

Figure 11:
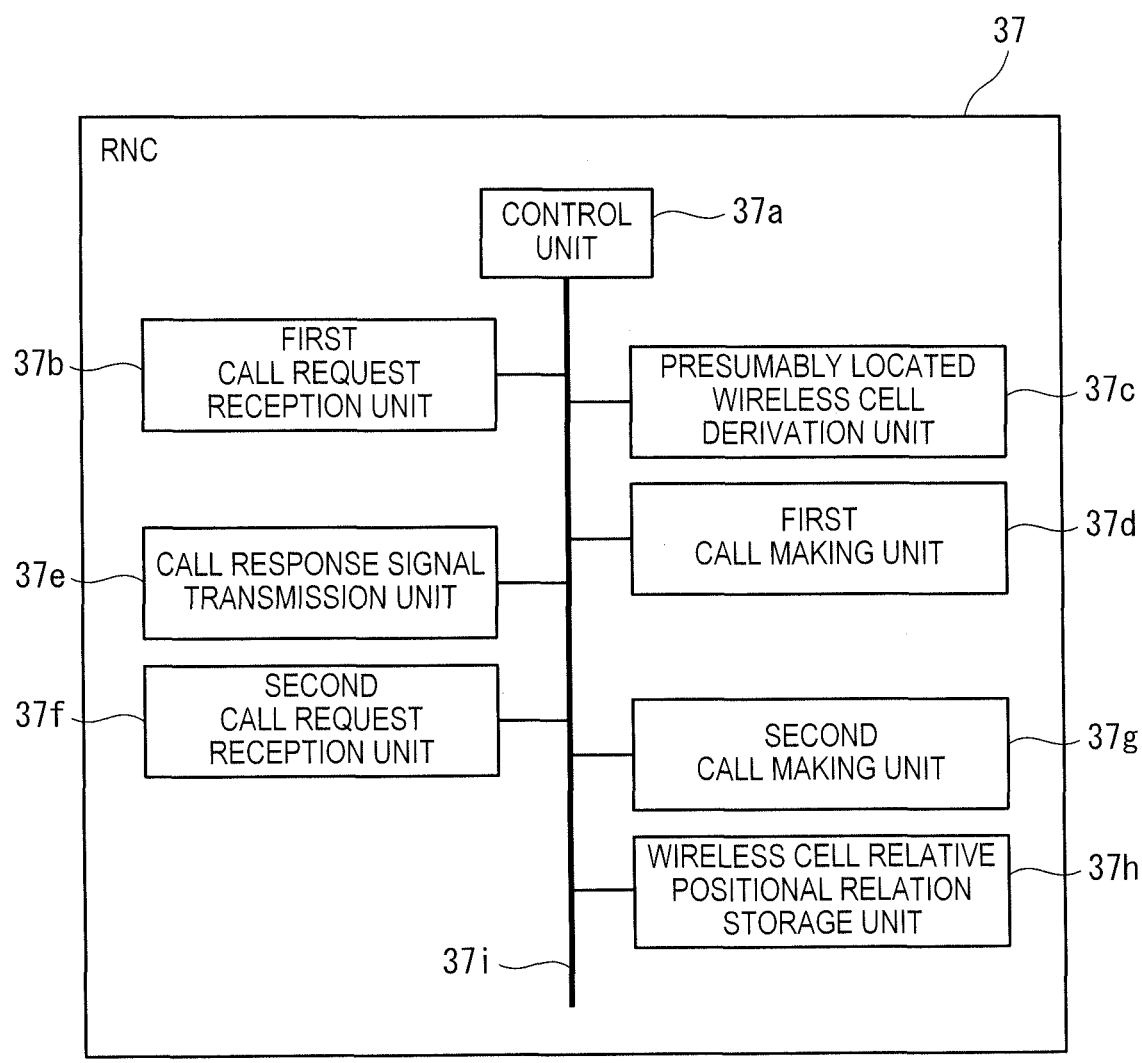
FIG. 11 is a block view illustrating the schematic configuration of a wireless network control device (RNC 37) in a first variation to the first embodiment of the present invention.

A wireless network control device in the first variation of the present embodiment will be described by using FIG. 11 and FIG. 12. The wireless network control device in the present variation has substantially the same configuration and function as the RNC 7 illustrated in FIG. 4, and only the differences are briefly described below. FIG. 11 is a functional block view illustrating the schematic configuration of an RNC 37 as the wireless network control device in the present embodiment relating to the first call request received from the exchange.

As illustrated in FIG. 11, the RNC 37 includes a control unit 37a, a first call request reception unit 37b, a presumably located wireless cell derivation unit 37c, a first call making unit 37d, a call response signal transmission unit 37e, a second call request reception unit 37f, a second call making unit 37g, a wireless cell relative positional relation storage unit 37h, and a bus line 37i. The first call request reception unit 37b has the same configuration and function as the first call request reception unit 7b, the first call making unit 37d has the same configuration and function as the first call making unit 7d, the call response signal transmission unit 37e has the same configuration and function as the call response signal transmission unit 7e, and their description will be omitted. The second call request reception unit 37f has the same configuration and function as the second call request reception unit 7f, the second call making unit 37g has the same configuration and function as the second call making unit 7g, the bus line 37i has the same configuration and function as the bus line 7i, and their description will be omitted.

The control unit 37a has the same configuration and function as the control unit 7a except that it transmits a predetermined control signal to the wireless cell relative positional relation storage unit 37h via the bus line 37i, and its description will be omitted.

The wireless cell relative positional relation storage unit 37h stores the relative positional relations between plural wireless cells included in a location registration area. The wireless cell relative positional relation storage unit 37h stores the relative positional relations using the cell identification information of the wireless cells. For example, the wireless cell relative positional relation storage unit 37h stores not only the cell identification information of a wireless cell adjacent to one wireless cell but also the cell identification information of a wireless cell within a predetermined distance from one wireless cell or the cell identification information of a wireless cell overlaid with one wireless cell.

The presumably located wireless cell derivation unit 37c derives, as a presumably located wireless cell, at least any of a wireless cell adjacent to an already located wireless cell, a wireless cell within a predetermined distance from the already located wireless cell, and a wireless cell overlaid with the already located wireless cell, based on the relative positional relations between wireless cells stored in the wireless cell relative positional relation storage unit 37h.

Figure 12:
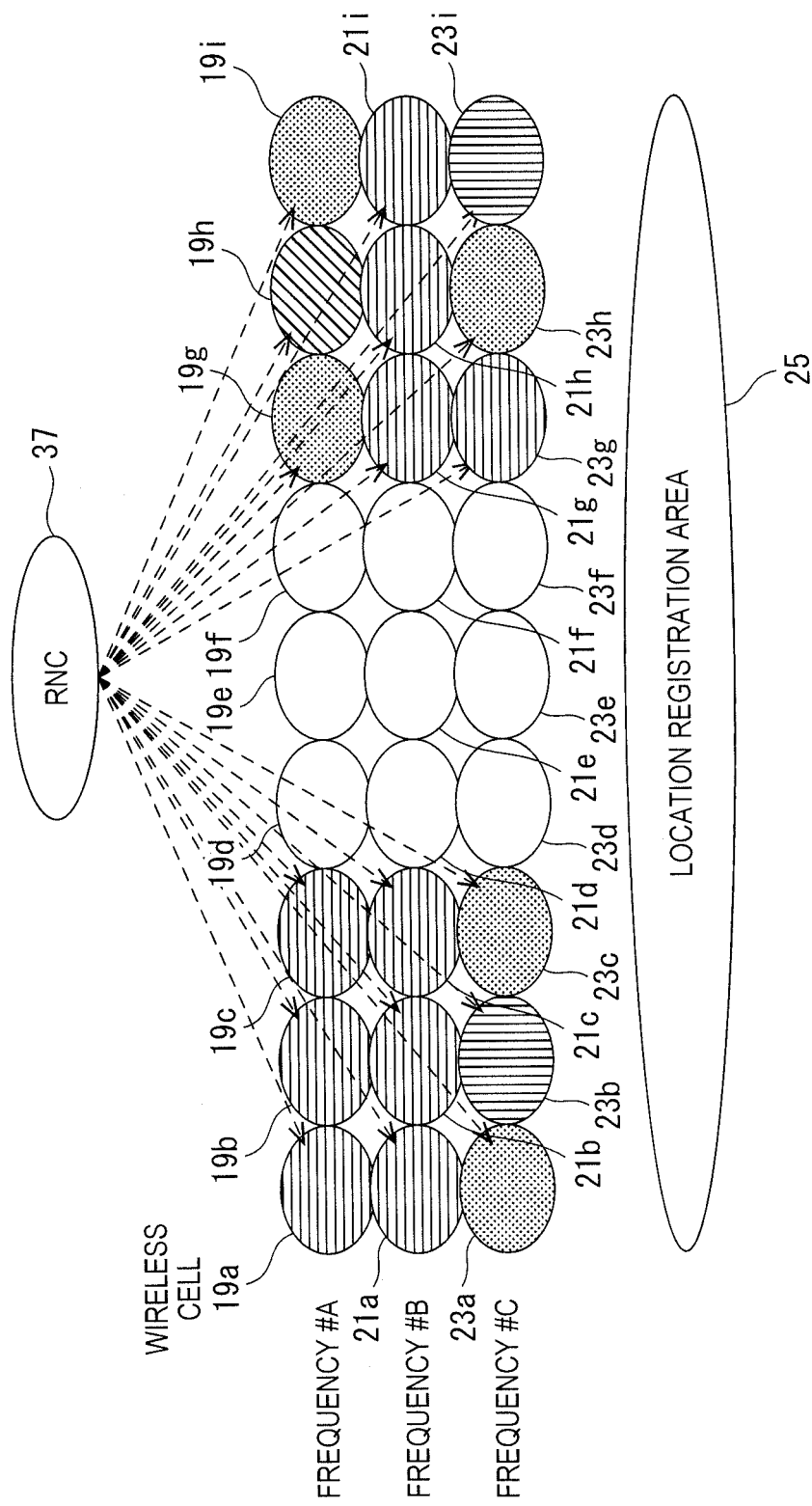
FIG. 12 is a view schematically illustrating a first call request in the wireless communication network system 1 in the first variation to the first embodiment of the present invention.

FIG. 12 schematically illustrates the state of executing the first call request in the wireless communication network system in the present variation. The location registration area 25 and wireless cells 19a to 19i, 21a to 21i, and 23a to 23i illustrated in FIG. 12 have the same configurations as the location registration area 25 and wireless cells 19a to 19i, 21a to 21i, and 23a to 23i illustrated in FIG. 7, and their description will be omitted.

Suppose the exchange (not illustrated in FIG. 12) determines the wireless cell 19h in which the target communication terminal device (not illustrated) communicated immediately previously and the wireless cells 23b and 23i in which the target communication terminal device communicated before the wireless cell 19h, as already located wireless cells.

When the RNC 37 receives the cell identification information of the already located wireless cells 19h, 23b, and 23i from the exchange, the presumably located wireless cell derivation unit 37c acquires, for example, the cell identification information of wireless cells adjacent to the cell identification information of the already located wireless cells 19h, 23b, and 23i, and derives the wireless cells of the acquired cell identification information as presumably located wireless cells. Thus, the wireless cells 19g and 19i adjacent to the already located wireless cell 19h, the wireless cells 23a and 23c adjacent to the wireless cell 23b, and the wireless cell 23h adjacent to the wireless cell 23i are derived as presumably located wireless cells, as illustrated in FIG. 12. Further, the wireless cell 21h overlaid with the already located wireless cell 19h and the presumably located wireless cell 23h, the wireless cells 19b and 21b overlaid with the already located wireless cell 23b, the wireless cell 21i overlaid with the already located wireless cell 23i and the presumably located wireless cell 19i, the wireless cells 19a and 21a overlaid with the presumably located wireless cell 23a, the wireless cells 19c and 21c overlaid with the presumably located wireless cell 23c, and the wireless cells 21g and 23g overlaid with the presumably located wireless cell 19g are derived as presumably located wireless cells.

The first call making unit 37d in the RNC 37 accordingly makes the first call request to the wireless cells 19a, 19b, 19c, 19g, 19h, 19i, 21a, 21b, 21c, 21g, 21h, 21i, 23a, 23b, 23c, 23g, 23h, and 23i, as shown by the dashed arrows in FIG. 12.

The exchange, wireless network control device, and wireless communication network system including these devices in the present variation operate in the same way as the SGSN 3 as the exchange, RNC 7 as the wireless network control device, and wireless communication network system 1 including these devices in the above-described embodiment except that the presumably located wireless cell is derived using the information stored in the wireless cell relative positional relation storage unit 37h instead of the wireless cell holding period determination table in step S11 in the sequence view illustrated in FIG. 6, and its description will be omitted.

Although the RNC 37 in the present variation does not have the wireless cell holding period determination table, the RNC 37 may have the wireless cell holding period determination table. In this case, the presumably located wireless cell derivation unit 37c may derive the presumably located wireless cell using the wireless cell holding period determination table and the wireless cell relative positional relation storage unit 37h, or derive the presumably located wireless cell using one of the wireless cell holding period determination table and the wireless cell relative positional relation storage unit 37h according to need.

As described above, the exchange, wireless network control device, and wireless communication network system including these devices in the present variation can selectively make the call request to the wireless cell in which the communication terminal device is relatively likely to exist from among the plural wireless cells included in the location registration area. Such a variation has the same advantageous effects as the exchange, wireless network control device, and wireless communication network system including these devices in the above-described embodiment.

(Second Variation)

Figure 13:
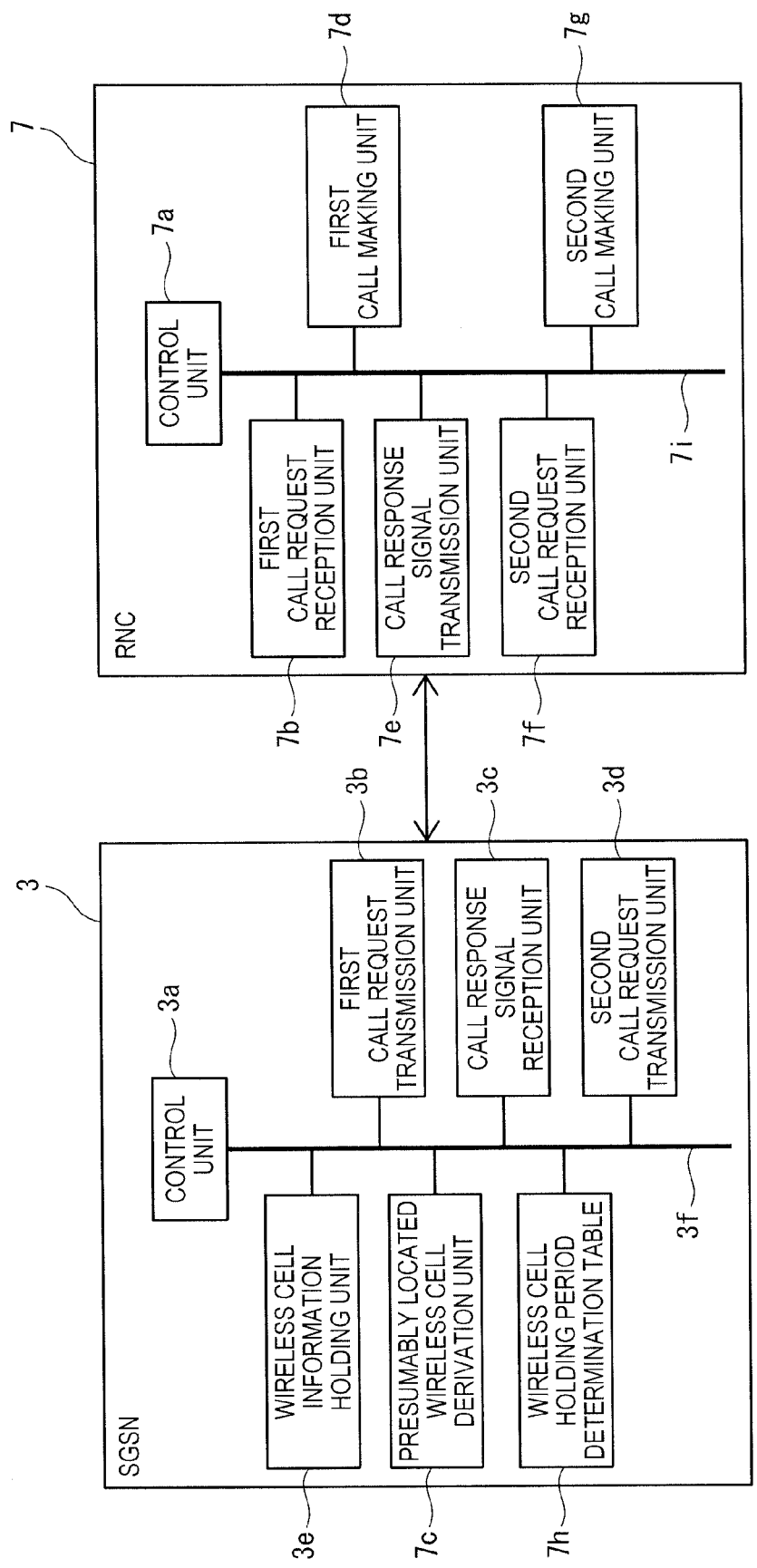
FIG. 13 is a block view illustrating the schematic configurations of an exchange (SGSN 3) and wireless network control device (RNC 7) in a second variation to the first embodiment of the present invention.

An exchange, a wireless network control device, and a wireless communication network system including these devices in the second variation of the present embodiment will be described by using FIG. 13. FIG. 13 is a functional block view of the SGSN 3 as the exchange and the RNC 7 as the wireless network control device in the present variation relating to the call request function. The wireless communication network system in the present variation has the same overall configuration as the wireless communication network system 1 in the above-described embodiment illustrated in FIG. 1, and its description will be omitted.

As illustrated in FIG. 13, the wireless communication network system in the present variation has a feature that, as the configuration relating to the call request function, the presumably located wireless cell derivation unit and the wireless cell holding period determination table are included not in the wireless network control device but in the exchange. In other words, the SGSN 3 as the exchange in the present embodiment includes the presumably located wireless cell derivation unit 7c and the wireless cell holding period determination table 7h in addition to the control unit 3a, the first call request transmission unit 3b, the call response signal reception unit 3c, the second call request transmission unit 3d, and the wireless cell information holding unit 3e, as the configuration relating to the call request function. Meanwhile, the RNC 7 as the wireless network control device in the present variation includes the control unit 7a, the first call request reception unit 7b, the first call making unit 7d, the call response signal transmission unit 7e, the second call request reception unit 7f, and the second call making unit 7g but does not include the presumably located wireless cell derivation unit and the wireless cell holding period determination table, as the configuration relating to the call request function.

The control unit 3a has the same configuration and function as the control unit 3a illustrated in FIG. 3, except that it transmits a predetermined control signal to the presumably located wireless cell derivation unit 7c via the bus line 3f.

The first call request transmission unit 3b has the same configuration and function as the first call request transmission unit 3b illustrated in FIG. 2, except that it includes, in the first call request, the cell identification information of the presumably located wireless cell derived by the presumably located wireless cell derivation unit 7c.

The first call request reception unit 7b has the same configuration and function as the first call request reception unit 7b illustrated in FIG. 4, except that it receives the first call request including the cell identification information of the presumably located wireless cell derived by the presumably located wireless cell derivation unit 7c.

The control unit 7a has the same configuration and function as the control unit 7a illustrated in FIG. 4, except that it does not transmit a predetermined control signal to the presumably located wireless cell derivation unit 7c.

The call response signal reception unit 3c, the second call request transmission unit 3d, the wireless cell information holding unit 3e, the presumably located wireless cell derivation unit 7c, the first call making unit 7d, the call response signal transmission unit 7e, the second call request reception unit 7f, the second call making unit 7g, and the wireless cell holding period determination table 7h have the same configurations and functions as the respective components described with reference to FIG. 2 and FIG. 4, and their description will be omitted.

The operations of the exchange and wireless network control device in the present variation will be described.

When the SGSN 3 in the present variation receives a communication request (e.g. incoming call) including the terminal identification information of the target communication terminal device that is a target of the communication request from an external device (not illustrated) connected to the wireless communication network system, the control unit 3a instructs the wireless cell information holding unit 3e to transmit the cell identification information of the already located wireless cell associated with the terminal identification information of the target communication terminal device and the service type (incoming call in this example) in the "service type" field illustrated in FIG. 3, to the first call request transmission unit 3b. The control unit 3a also instructs the wireless cell information holding unit 3e to transmit the cell identification information of the already located wireless cell associated with the terminal identification information and the service type (incoming call in this example), to the presumably located wireless cell derivation unit 7c. The control unit 3a further instructs the presumably located wireless cell derivation unit 7c to derive the presumably located wireless cell based on the cell identification information of the already located wireless cell received from the wireless cell information holding unit 3e.

Having received the instruction, the wireless cell information holding unit 3e transmits, to the first call request transmission unit 3b and the presumably located wireless cell derivation unit 7c, the cell identification information of the already located wireless cell stored in association with the "incoming call" in the "wireless cell information" field and "wireless cell information of immediately previous communication" field associated with the terminal identification information of the target communication terminal device (see FIG. 3).

Having received the instruction, the presumably located wireless cell derivation unit 7c derives the presumably located wireless cell based on the wireless cell holding period determination table 7h, the cell identification information of the already located wireless cell, the service type that is a purpose of the communication request (incoming call in this example), the remaining call request capacity (remaining paging capacity), and the time of day in which the first call request is made (see FIG. 5A and FIG. 5B). The presumably located wireless cell derivation unit 7c transmits the cell identification information of the derived presumably located wireless cell to the first call request transmission unit 3b. In the case where there is a wireless cell overlaid with the already located wireless cell or the derived presumably located wireless cell, the presumably located wireless cell derivation unit 7c may transmit the cell identification information of the overlaid wireless cell to the first call request transmission unit 3b. In the present variation, information of which wireless cells are overlaid with each other is stored in a predetermined storage unit (not illustrated) in the SGSN 3.

The first call request transmission unit 3b transmits the first call request including the terminal identification information of the target communication terminal device, the received cell identification information of the already located wireless cell, the cell identification information of the presumably located wireless cell, and, when necessary, the cell identification information of the overlaid wireless cell, to the RNC 7. The first call request may include only the terminal identification information of the target communication terminal device, the cell identification information of the already located wireless cell, and the cell identification information of the presumably located wireless cell, and be a call request to only the already located wireless cell and the presumably located wireless cell. When the first call request transmission unit 3b transmits the first call request, the control unit 3a starts measuring the standby time until the reception of the response signal to the first call request.

When the first call request reception unit 7b in the RNC 7 receives the first call request, the control unit 7a in the RNC 7 instructs the first call request reception unit 7b to transmit the cell identification information of each of the already located wireless cell, presumably located wireless cell, and overlaid wireless cell included in the first call request, to the first call making unit 7d.

Having received the instruction, the first call request reception unit 7b transmits the cell identification information to the first call making unit 7d.

The first call making unit 7d receives the terminal identification information of the target communication terminal device from the control unit 7a, receives the cell identification information from the first call request reception unit 7b, and receives the instruction to make the first call request from the control unit 7a. The first call making unit 7d then makes the call request to the already located wireless cell, presumably located wireless cell, and wireless cell overlaid with the already located wireless cell or presumably located wireless cell indicated by the cell identification information.

The operations of the SGSN 3 and RNC 7 after the execution of the call request by the first call making unit 7d are the same as the operations of the SGSN 3 and RNC 7 in the above-described embodiment described with reference to FIG. 1 to FIG. 6, and their descriptions will be omitted.

As described above, the wireless communication network system in the present variation has the presumably located wireless cell derivation unit and the wireless cell holding period determination table on the exchange side. The wireless communication network system in the present variation therefore does not need to provide a storage unit for storing wireless cell-related information such as the wireless cell holding period determination table on the wireless network control device side. Such a wireless communication network system in the present variation has the same advantageous effects as the wireless communication network system 1 in the above-described embodiment, by simply modifying the exchange without significantly modifying the wireless network control device in one technology.

(Third Variation)

Figure 14:
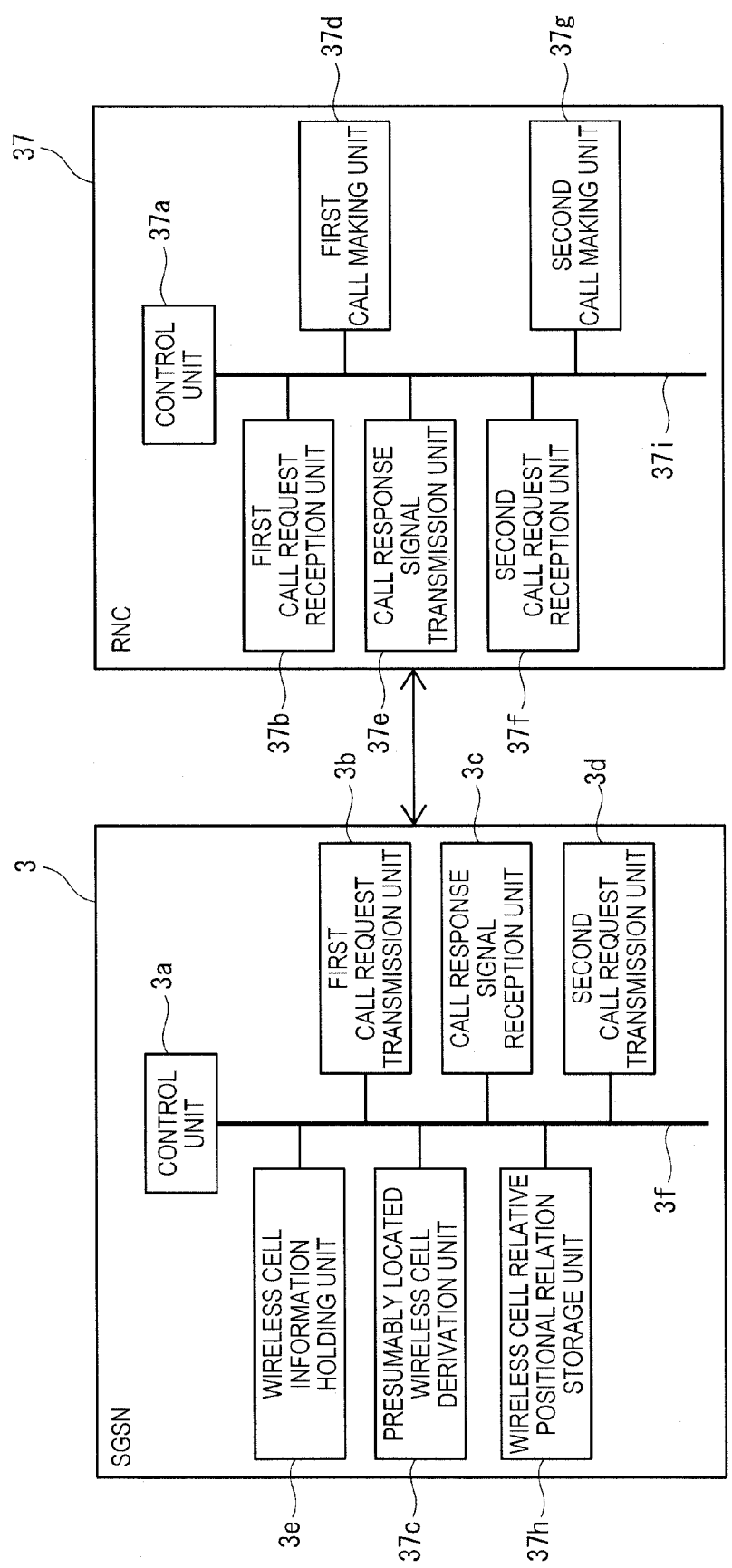
FIG. 14 is a block view illustrating the schematic configurations of an exchange (SGSN 3) and wireless network control device (RNC 37) in the second variation to the first embodiment of the present invention.

An exchange, a wireless network control device, and a wireless communication network system including these devices in the third variation of the present embodiment will be described by using FIG. 14. FIG. 14 is a functional block view of the SGSN 3 as the exchange and the RNC 37 as the wireless network control device in the present variation relating to the call request function. The wireless communication network system in the present variation has the same overall configuration as the wireless communication network system 1 in the above-described embodiment illustrated in FIG. 1, and its description will be omitted.

As illustrated in FIG. 14, the wireless communication network system in the present variation has a feature that, as the configuration relating to the call request function, the presumably located wireless cell derivation unit and the wireless cell relative positional relation storage unit are included not in the wireless network control device but in the exchange. In other words, the SGSN 3 as the exchange in the present embodiment includes the presumably located wireless cell derivation unit 37c and the wireless cell relative positional relation storage unit 37h in addition to the control unit 3a, the first call request transmission unit 3b, the call response signal reception unit 3c, the second call request transmission unit 3d, and the wireless cell information holding unit 3e, as the configuration relating to the call request function. Meanwhile, the RNC 37 as the wireless network control device in the present variation includes the control unit 37a, the first call request reception unit 37b, the first call making unit 37d, the call response signal transmission unit 37e, the second call request reception unit 37f, and the second call making unit 37g but does not include the presumably located wireless cell derivation unit and the wireless cell relative positional relation storage unit, as the configuration relating to the call request function.

The control unit 3a has the same configuration and function as the control unit 3a illustrated in FIG. 3, except that it transmits a predetermined control signal to the presumably located wireless cell derivation unit 37c via the bus line 3f.

The first call request transmission unit 3b has the same configuration and function as the first call request transmission unit 3b illustrated in FIG. 2, except that it includes, in the first call request, the cell identification information of the presumably located wireless cell derived by the presumably located wireless cell derivation unit 37c.

The first call request reception unit 37b has the same configuration and function as the first call request reception unit 37b illustrated in FIG. 11, except that it receives the first call request including the cell identification information of the presumably located wireless cell derived by the presumably located wireless cell derivation unit 37c.

The control unit 37a has the same configuration and function as the control unit 37a illustrated in FIG. 11, except that it does not transmit a predetermined control signal to the presumably located wireless cell derivation unit 37c.

The control unit 3a, the call response signal reception unit 3c, the second call request transmission unit 3d, the wireless cell information holding unit 3e, the presumably located wireless cell derivation unit 37c, the wireless cell relative positional relation storage unit 37h, the first call making unit 37d, the call response signal transmission unit 37e, the second call request reception unit 37f, and the second call making unit 37g have the same configurations and functions as the respective components described with reference to FIG. 2 and FIG. 11, and their descriptions will be omitted.

The operations of the exchange and wireless network control device in the present variation will be described.

When the SGSN 3 in the present variation receives a communication request (e.g. incoming call) including the terminal identification information of the target communication terminal device that is a target of the communication request from an external device (not illustrated) connected to the wireless communication network system, the control unit 3a instructs the wireless cell information holding unit 3e to transmit the cell identification information of the already located wireless cell associated with the terminal identification information of the target communication terminal device and the service type (incoming call in this example) in the "service type" field illustrated in FIG. 3, to the first call request transmission unit 3b. The control unit 3a also instructs the wireless cell information holding unit 3e to transmit the cell identification information of the already located wireless cell associated with the terminal identification information and the service type (incoming call in this example), to the presumably located wireless cell derivation unit 37c. The control unit 3a further instructs the presumably located wireless cell derivation unit 37c to derive the presumably located wireless cell based on the cell identification information of the already located wireless cell received from the wireless cell information holding unit 3e.

Having received the instruction, the wireless cell information holding unit 3e transmits, to the first call request transmission unit 3b and the presumably located wireless cell derivation unit 37c, the cell identification information of the already located wireless cell stored in association with the "incoming call" in the "wireless cell information" field and "wireless cell information of immediately previous communication" field associated with the terminal identification information of the target communication terminal device.

Having received the instruction, the presumably located wireless cell derivation unit 37c derives, as the presumably located wireless cell, at least any of the wireless cell adjacent to the already located wireless cell, the wireless cell within the predetermined distance from the already located wireless cell, and the wireless cell overlaid with the already located wireless cell, based on the relative positional relations between wireless cells stored in the wireless cell relative positional relation storage unit 37h. The presumably located wireless cell derivation unit 37c transmits the cell identification information of the derived presumably located wireless cell to the first call request transmission unit 3b.

The first call request transmission unit 3b transmits the first call request that includes the terminal identification information of the target communication terminal device, the received cell identification information of the already located wireless cell, and the cell identification information of the presumably located wireless cell derived by the presumably located wireless cell derivation unit 37c and is a call request only to the already located wireless cell and presumably located wireless cell, to the RNC 7. When the first call request transmission unit 3b transmits the first call request, the control unit 3a starts measuring the standby time until the reception of the response signal to the first call request.

When the first call request reception unit 37b in the RNC 37 receives the first call request, the control unit 37a in the RNC 37 instructs the first call request reception unit 37b to transmit the cell identification information of each of the already located wireless cell and presumably located wireless cell included in the first call request, to the first call making unit 37d.

Having received the instruction, the first call request reception unit 37b transmits the cell identification information to the first call making unit 37d.

The first call making unit 37d receives the terminal identification information of the target communication terminal device from the control unit 37a, receives the cell identification information from the first call request reception unit 37b, and receives the instruction to make the first call request from the control unit 37a. The first call making unit 7d then makes the call request to the already located wireless cell and presumably located wireless cell indicated by the cell identification information.

The operations of the SGSN 3 and RNC 37 after the execution of the call request by the first call making unit 37d are the same as the operations of the SGSN 3 and RNC 7 in the above-described embodiment described with reference to FIG. 1 to FIG. 6, and their descriptions will be omitted.

Although the SGSN 3 in the present variation does not have the wireless cell holding period determination table, the SGSN 3 may have the wireless cell holding period determination table. In this case, the presumably located wireless cell derivation unit 37c may derive the presumably located wireless cell using the wireless cell holding period determination table and the wireless cell relative positional relation storage unit 37h, or derive the presumably located wireless cell using one of the wireless cell holding period determination table and the wireless cell relative positional relation storage unit 37h in need.

As described heretofore, the wireless communication network system in the present variation has the presumably located wireless cell derivation unit 37c and the wireless cell relative positional relation storage unit 37h. The wireless communication network system in the present variation therefore does not need to provide a storage unit for storing wireless cell-related information such as the wireless cell holding period determination table on the wireless network control device side. Such a wireless communication network system in the present variation has the same advantageous effects as the wireless communication network system 1 in the above-described embodiment and the wireless communication network system in the first variation, by simply modifying the exchange without significantly modifying the wireless network control device in one technology.

Second Embodiment (Schematic Configuration of Wireless Communication Network System)

An exchange, a wireless network control device, and a wireless communication network system including these devices in the second embodiment of the present invention will be described by using FIG. 15 to FIG. 17.

Figure 15:
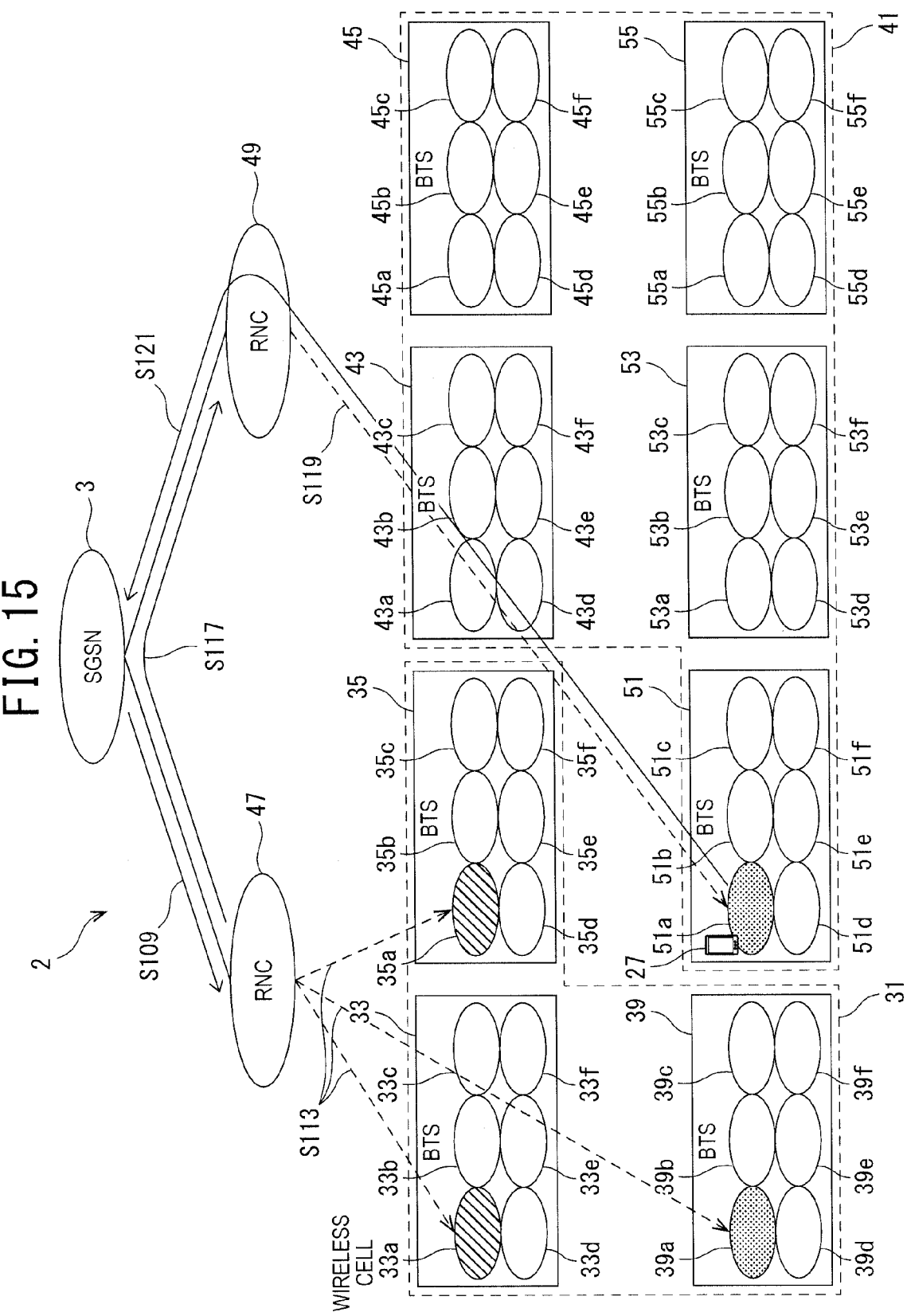
FIG. 15 is a block view illustrating the schematic configuration of a wireless communication network system 2 in the second embodiment of the present invention.

FIG. 15 is a block view illustrating the schematic configuration of a wireless communication network system 2 in the present embodiment. Part of the step numbers in the below-mentioned operation sequence view of the wireless communication network system is also illustrated in FIG. 15 (such as step S109). As illustrated in FIG. 15, the wireless communication network system 2 includes an SGSN 3, an RNC 47, an RNC 49, an HLR, a GGSN, an MSC, a VLR, a GMSC (not illustrated), and plural BTSs 33, 35, 39, 43, 45, 53, and 55. The SGSN 3 corresponds to the exchange in the present embodiment, the RNC 47 corresponds to the wireless network control device in the present embodiment, and the RNC 49 corresponds to another wireless network control device in the present embodiment. The SGSN 3 in the present embodiment has the same configuration and function as the SGSN 3 in the first embodiment, and its description will be omitted.

The RNC 47 is associated with the BTSs 33, 35, and 39 and BTSs (not illustrated) provided in the wireless cells formed by the BTSs 33, 35, and 39 (to be described in detail later), and performs a process relating to wireless communication of the BTSs 33, 35, and 39 and any communication terminal device located (residing) in the wireless cells formed by the BTSs 33, 35, and 39. In detail, the RNC 47 performs, for example, a circuit connection process or a handover process during a call for the communication terminal device. The RNC 47 also stores the cell identification information (e.g. cell identifier) of the BTSs corresponding to the RNC 47 (the BTSs 33, 35, and 39 and the BTSs (not illustrated) provided in the wireless cells formed by the BTSs 33, 35, and 39 in this example) and the terminal identification information (e.g. terminal identifier or MSISDN) of the communication terminal devices located in the wireless cells formed by the BTSs 33, 35, 39, and the like, in association with each other.

In addition to the above-mentioned functions, the RNC 47 has a function of deriving, based on the already located wireless cell that is a target of the first call request received from the SGSN 3, a presumably located wireless cell in which the target communication terminal device is presumed to exist, and executing a call request (e.g. a paging request) to the already located wireless cell and the presumably located wireless cell, in order to prevent a shortage of wireless resources and an increase in system load. The configuration of the RNC 47 for achieving this function will be described later.

The BTS 33 has the same configuration and function as the BTS 9 in the first embodiment. Six wireless cells 33a, 33b, 33c, 33d, 33e, and 33f (hereafter also referred to as "wireless cells 33a to 33f") formed in the wireless cell formed by the BTS 33 have the same configurations and functions as the wireless cells 9a, 9b, 9c, 9d, 9e, and 9f in the first embodiment.

Similarly, the BTS 35 has the same configuration and function as the BTS 9 in the first embodiment. Six wireless cells 35a, 35b, 35c, 35d, 35e, and 35f (hereafter also referred to as "wireless cells 35a to 35f") formed in the wireless cell formed by the BTS 35 have the same configurations and functions as the wireless cells 9a, 9b, 9c, 9d, 9e, and 9f in the first embodiment.

Similarly, the BTS 39 has the same configuration and function as the BTS 9 in the first embodiment. Six wireless cells 39a, 39b, 39c, 39d, 39e, and 39f (hereafter also referred to as "wireless cells 39a to 39f") formed in the wireless cell formed by the BTS 39 have the same configurations and functions as the wireless cells 9a, 9b, 9c, 9d, 9e, and 9f in the first embodiment.

The wireless cells formed by the BTSs 33, 35, and 39 and the wireless cells 33a to 33f, 35a to 35f, and 39a to 39f are included in a location registration area 31. The RNC 47 manages the BTSs 33, 35, and 39 and the BTSs forming the wireless cells 33a to 33f, 35a to 35f, and 39a to 39f as lower nodes, thus indirectly managing the location registration area 31. The RNC 47 therefore corresponds to the management node for managing the location registration area 31.

The RNC 49 is associated with the BTSs 43, 45, 51, 53, and 55 (hereafter also referred to as "BTSs 43 to 55") and BTSs (not illustrated) provided in the wireless cells formed by the BTSs 43 to 55 (to be described in detail later), and performs a process relating to wireless communication of the BTSs 43 to 55 and any communication terminal device located (residing) in the wireless cells formed by the BTSs 43 to 55. In detail, the RNC 49 performs, for example, a circuit connection process or a handover process during a call for the communication terminal device. The RNC 49 also stores the cell identification information (e.g. cell identifier) of the BTSs corresponding to the RNC 49 (the BTSs 43 to 55 and the BTSs (not illustrated) provided in the wireless cells formed by the BTSs 43 to 55 in this example) and the terminal identification information (e.g. terminal identifier or MSISDN) of the communication terminal devices located in the wireless cells formed by the BTSs 43 to 55 and the like, in association with each other.

In addition to the above-mentioned functions, the RNC 49 has a function of deriving, based on the already located wireless cell that is a target of the first call request received from the SGSN 3, a presumably located wireless cell in which the target communication terminal device is presumed to exist, and executing a call request (e.g. a paging request) to the already located wireless cell and the presumably located wireless cell, in order to prevent a shortage of wireless resources and an increase in system load.

The BTS 43 has the same configuration and function as the BTS 9 in the first embodiment. Six wireless cells 43a, 43b, 43c, 43d, 43e, and 43f (hereafter also referred to as "wireless cells 43a to 43f") formed in the wireless cell formed by the BTS 43 have the same configurations and functions as the wireless cells 9a, 9b, 9c, 9d, 9e, and 9f in the first embodiment.

Similarly, the BTS 45 has the same configuration and function as the BTS 9 in the first embodiment. Six wireless cells 45a, 45b, 45c, 45d, 45e, and 45f (hereafter also referred to as "wireless cells 45a to 45f") formed in the wireless cell formed by the BTS 45 have the same configurations and functions as the wireless cells 9a, 9b, 9c, 9d, 9e, and 9f in the first embodiment.

Similarly, the BTS 51 has the same configuration and function as the BTS 9 in the first embodiment. Six wireless cells 51a, 51b, 51c, 51d, 51e, and 51f (hereafter also referred to as "wireless cells 51a to 51f") formed in the wireless cell formed by the BTS 51 have the same configurations and functions as the wireless cells 9a, 9b, 9c, 9d, 9e, and 9f in the first embodiment.

Similarly, the BTS 53 has the same configuration and function as the BTS 9 in the first embodiment. Six wireless cells 53a, 53b, 53c, 53d, 53e, and 53f (hereafter also referred to as "wireless cells 53a to 53f") formed in the wireless cell formed by the BTS 53 have the same configurations and functions as the wireless cells 9a, 9b, 9c, 9d, 9e, and 9f in the first embodiment.

Similarly, the BTS 55 has the same configuration and function as the BTS 9 in the first embodiment. Six wireless cells 55a, 55b, 55c, 55d, 55e, and 55f (hereafter also referred to as "wireless cells 55a to 55f") formed in the wireless cell formed by the BTS 55 have the same configurations and functions as the wireless cells 9a, 9b, 9c, 9d, 9e, and 9f in the first embodiment.

The wireless cells formed by the BTSs 43 to 55 and the wireless cells 43a to 43f, 45a to 45f, 51a to 51f, 53a to 53f, and 55a to 55f are included in a location registration area 41. The RNC 49 manages the BTSs 43 to 55 and the BTSs forming the wireless cells 43a to 43f, 45a to 45f, 51a to 51f, 53a to 53f, and 55a to 55f as lower nodes, thus indirectly managing the location registration area 41. The RNC 49 therefore corresponds to the management node for managing the location registration area 41.

The BTSs 33 and 35 and the BTSs 43 and 45 each transmit radio waves of frequency #A (#A is a predetermined value, for example, 800 MHz) to the wireless cell, and form the wireless cell of frequency band #A. The BTS 39 and the BTSs 51, 53, and 55 each transmit radio waves of frequency #B (#B is a predetermined value different from #A, for example, 2 GHz) to the wireless cell, and form the wireless cell of frequency band #B.

In the present embodiment, for example, the wireless cells 33a and 39a are overlaid with each other, the wireless cells 33b and 39b are overlaid with each other, the wireless cells 33c and 39c are overlaid with each other, the wireless cells 33d and 39d are overlaid with each other, the wireless cells 33e and 39e are overlaid with each other, and the wireless cells 33f and 39f are overlaid with each other.

Moreover, for example, the wireless cells 35a and 51a are overlaid with each other, the wireless cells 35b and 51b are overlaid with each other, the wireless cells 35c and 51c are overlaid with each other, the wireless cells 35d and 51d are overlaid with each other, the wireless cells 35e and 51e are overlaid with each other, and the wireless cells 33f and 51f are overlaid with each other.

Moreover, for example, the wireless cells 43a and 53a are overlaid with each other, the wireless cells 43b and 53b are overlaid with each other, the wireless cells 43c and 53c are overlaid with each other, the wireless cells 43d and 53d are overlaid with each other, the wireless cells 43e and 53e are overlaid with each other, and the wireless cells 43f and 53f are overlaid with each other.

Moreover, for example, the wireless cells 45a and 55a are overlaid with each other, the wireless cells 45b and 55b are overlaid with each other, the wireless cells 45c and 55c are overlaid with each other, the wireless cells 45d and 55d are overlaid with each other, the wireless cells 45e and 55e are overlaid with each other, and the wireless cells 45f and 55f are overlaid with each other.

Thus, the wireless cell formed by the BTS 35 under the control of the RNC 47 and the wireless cell formed by the BTS 51 under the control of the RNC 49 are overlaid with each other, and the wireless cells 35a to 35f and the wireless cells 51a to 51f are respectively overlaid with each other. This embodiment therefore has the configuration in which the wireless cells managed by the different RNCs are overlaid with each other.

(Schematic Configuration of Wireless Network Control Device)

The schematic configuration of the wireless network control device in the present embodiment will be described by using FIG. 16 with reference to FIG. 15. FIG. 16 is a functional block view illustrating the schematic configuration of the RNC 47 as the wireless network control device in the present embodiment, which relates to the first call request received from the exchange (for example, SGSN). Since the RNC 49 has the same configuration as the RNC 47, the schematic configuration of the wireless network control device in the present embodiment will be described below using the RNC 47 as an example, and the illustration or description of the schematic configuration of the RNC 49 is omitted.

Figure 16:
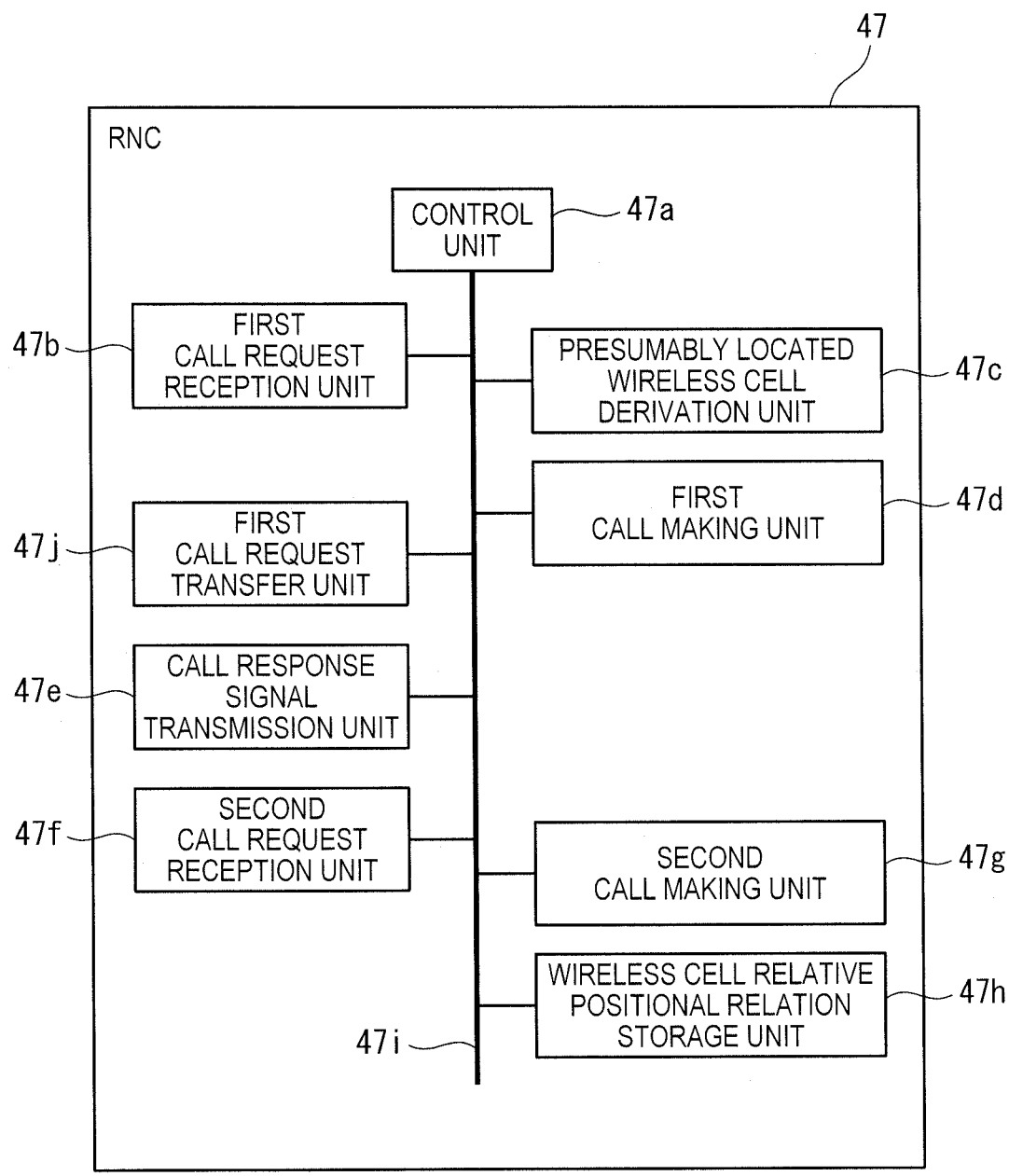
FIG. 16 is a block view illustrating the schematic configuration of a wireless network control device (RNC 47) in the second embodiment of the present invention.

As illustrated in FIG. 16, the RNC 47 includes a control unit 47a, a first call request reception unit 47b, a presumably located wireless cell derivation unit 47c, a first call making unit 47d, a call response signal transmission unit 47e, a second call request reception unit 47f, a second call making unit 47g, a wireless cell relative positional relation storage unit 47h, a bus line 47i, and a first call request transfer unit 47j.

The first call request reception unit 47b has the same configuration and function as the first call request reception unit 7b except that it receives the transferred first call request (to be described in detail later), the first call making unit 47d has the same configuration and function as the first call making unit 7d, the call response signal transmission unit 47e has the same configuration and function as the call response signal transmission unit 7e, and their descriptions will be omitted. The second call request reception unit 47f has the same configuration and function as the second call request reception unit 7f, the second call making unit 47g has the same configuration and function as the second call making unit 7g, the wireless cell relative positional relation storage unit 47h has the same configuration and function as the wireless cell relative positional relation storage unit 37h, the bus line 47i has the same configuration and function as the bus line 7i, and their descriptions will be omitted.

The control unit 47a has the same configuration and function as the control unit 37a except that it transmits a predetermined control signal to the first call request transfer unit 47j via the bus line 47i, and its description will be omitted.

In the case where the presumably located wireless cell derivation unit 47c derives, as the presumably located wireless cell, a wireless cell (e.g. the wireless cell 51a) that is overlaid with the already located wireless cell and included in another location registration area (e.g. the location registration area 41) managed by another wireless network control device (e.g. the RNC 49), the first call request transfer unit 47j transfers the first call request together with the cell identification information of the wireless cell 51a which is the presumably located wireless cell in the location registration area 41, to the RNC 49. Thus, the wireless communication network system 2 in the present embodiment can transfer the first call request from one RNC to another RNC, in the case where overlaid wireless cells lie over more than one RNC, that is, in the case where overlaid wireless cells are managed by different RNCs. Hence, the present embodiment enables responding to a communication request to a communication terminal device that moves between location registration areas.

(Operation of Wireless Communication Network System 2 Including SGSN 3 and RNCs 47 and 49)

The operations of the SGSN 3 as the exchange, RNCs 47 and 49 each as the wireless network control device, and wireless communication network system 2 including these devices in the present embodiment will be described by using FIG. 17 with reference to FIG. 2, FIG. 15, and FIG. 16. FIG. 17 is a sequence view illustrating an example of the operation of the wireless communication network system 2 in the present embodiment.

Figure 17:
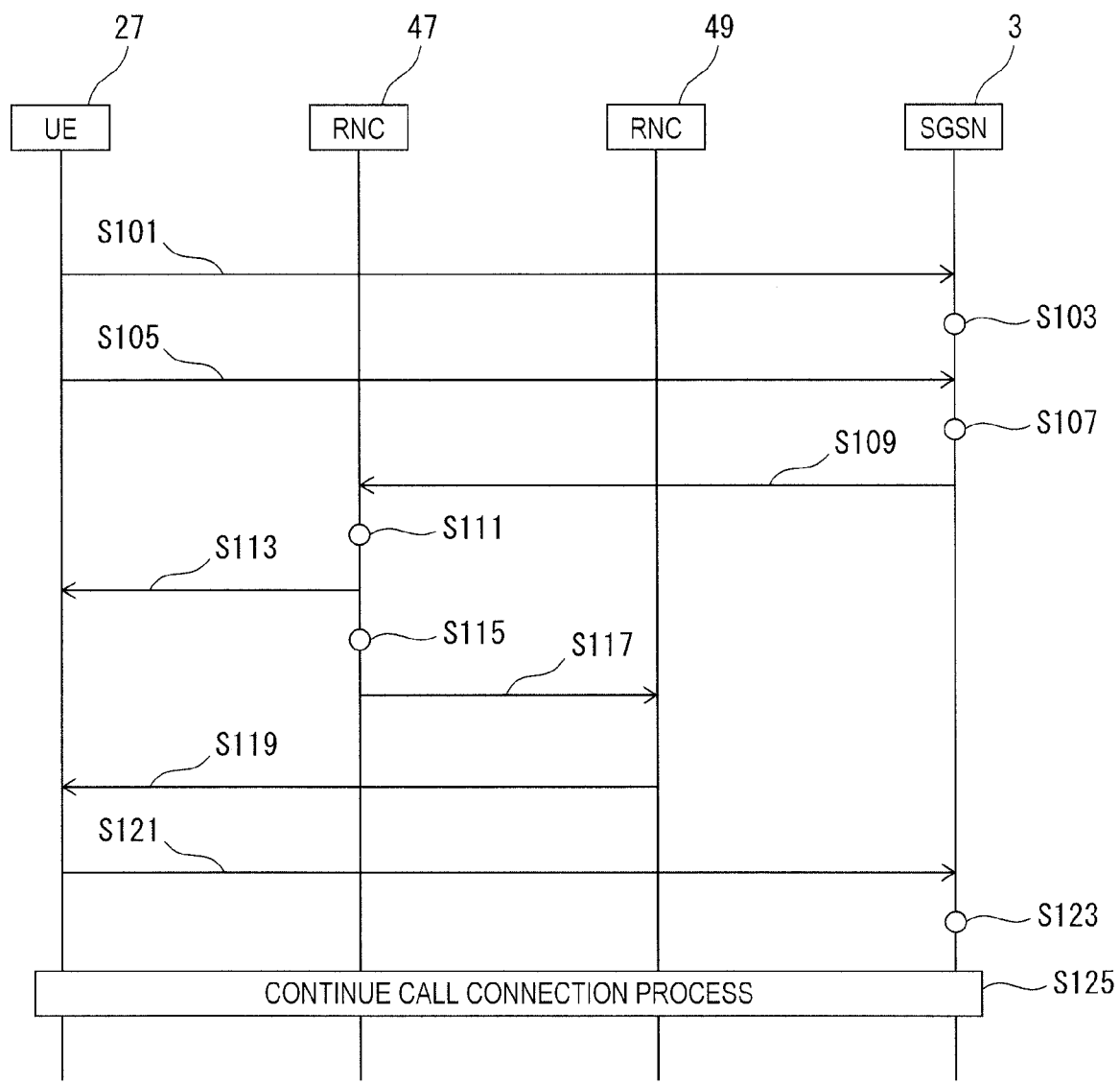
FIG. 17 is a sequence view illustrating an example of the operation of the wireless communication network system 2 in the second embodiment of the present invention.

As illustrated in FIG. 17, the wireless communication network system 2 carries out a location registration process each time the location registration area in which a UE 27 is located changes. For example, when the UE 27 moves to the wireless cell 33a in the location registration area 31 and recognizes the change of the area information, the UE 27 makes a location registration request to the SGSN 3 via the RNC 47 (step S101). The location registration request includes the cell identification information of the wireless cell 33a in which the UE 27 is located.

The SGSN 3 holds the cell identification information included in the location registration request, in the wireless cell information holding unit 3e in association with the terminal identification information of the UE 27 (step S103). The RNC 47 equally stores the cell identification information included in the location registration request, in a predetermined storage unit in association with the terminal identification information of the UE 27.

The UE 27 transmits a connection establishment signal via the RNC 47, in order to establish a signaling connection with the SGSN 3 (step S105). The connection establishment signal includes the cell identification information of, for example, the wireless cell 35a in which the UE 27 is located as a result of moving subsequently.

The SGSN 3 holds the cell identification information included in the connection establishment signal, in the wireless cell information holding unit 3e in association with the terminal identification information of the UE 27 (step S107). The RNC 47 equally stores the cell identification information included in the connection establishment signal, in the predetermined storage unit in association with the terminal identification information of the UE 27.

Thus, upon receiving the location registration request signal or the connection establishment signal, the RNC 47 and the SGSN 3 each store the cell identification information of the UE 27 and the like included in such a signal, and also update the held information. In this way, for example, the presence history of each wireless cell in which the UE 27 is located is held in the wireless cell information holding unit 3e in the SGSN 3, where the cell identification information of the wireless cell 33a is held in the "wireless cell information" field and the cell identification information of the wireless cell 35a is held in the "wireless cell information of immediately previous communication" field.

For example, suppose an incoming call request to the UE 27 is made from an external device (not illustrated) connected to the wireless communication network system 2. In this case, the SGSN 3 operates in the same way as step S9 in the first embodiment. As a result, the first call request transmission unit 3b transmits the first call request including the terminal identification information of the UE 27 that is a target of the incoming request and the received cell identification information of the wireless cells 33a and 35a as each as an already located wireless cell, to the RNC 47 (step S109). When the first call request transmission unit 3b transmits the first call request, the control unit 3a starts measuring the standby time until the reception of the response signal to the first call request.

Having received the first call request, the RNC 47 derives the presumably located wireless cell (step S111). In step S111, for example, the control unit 47a transmits the cell identification information of the already located wireless cell included in the first call request to the presumably located wireless cell derivation unit 47c, and instructs the presumably located wireless cell derivation unit 47c to derive the presumably located wireless cell. The control unit 47a also transmits the terminal identification information of the target communication terminal device to the first call making unit 47d, and instructs the first call making unit 47d to make the call request. Having received the instruction from the control unit 47a, the presumably located wireless cell derivation unit 47c derives the presumably located wireless cell based on the wireless cell relative positional relation storage unit 47h, the cell identification information of the already located wireless cell, and the service type that is a purpose of the communication request (incoming call in this example). For example, the presumably located wireless cell derivation unit 47c derives the wireless cells 39a and 51a overlaid with the already located wireless cells, as the presumably located wireless cells. The presumably located wireless cell derivation unit 47c transmits the cell identification information of the wireless cell 39a which is the derived presumably located wireless cell, to the first call making unit 47d.

The first call making unit 47d receives the terminal identification information of the UE 27 from the control unit 47a, receives the cell identification information of the already located wireless cell from the first call request reception unit 47b, receives the cell identification information of the presumably located wireless cell from the presumably located wireless cell derivation unit 47c, and receives the instruction to make the first call request from the control unit 47a. The first call making unit 47d then makes the call request to the already located wireless cells 33a and 35a and presumably located wireless cell 39a indicated by the cell identification information (step S113).

In step S111, the control unit 47a determines that the presumably located wireless cell derived by the presumably located wireless cell derivation unit 47c is a wireless cell (e.g. the wireless cell 51a) overlaid with the already located wireless cell (e.g. the wireless cell 35a) and managed by another RNC (step S115). The first call request transfer unit 47j transfers the first call request together with the cell identification information of the presumably located wireless cell 51a in the location registration area 41 as another location registration area, to the RNC 49 as another wireless network control device (step S117).

Having received the transfer signal of the first call request, the RNC 49 makes the first call request to the wireless cell 51a (step S119).

As illustrated in FIG. 15, for example, suppose the UE 27 is located in the wireless cell 51a to which the first call request is made. The UE 27 then transmits the response signal to the first call request to the RNC 49. The response signal is transmitted to the SGSN 3 via the RNC 49 (step S121).

In the case where the SGSN 3 receives the response signal before the standby time reaches a timeout, the SGSN 3 accepts the response signal even though the response signal is not from the RNC 47 to which the first call request is made (step S123).

Having received the response signal to the first call request, the SGSN 3 starts and continues a call connection process by an already known method (step S125).

In the case where the SGSN 3 has not received the response signal to the first call request before the standby time reaches a timeout, the SGSN 3 makes the second call request to the RNC 47. After this, the process of step S17 in the first embodiment is made.

As described above, the exchange, wireless network control device, and wireless communication network system including these devices in the present embodiment can selectively make the call request to the wireless cell in which the communication terminal device is relatively likely to exist from among the plural wireless cells included in the location registration area. The exchange, wireless network control device, and wireless communication network system including these devices in the present embodiment thus have the same advantageous effects as the exchange, wireless network control device, and wireless communication network system including these devices in the first embodiment.

In addition, the exchange, wireless network control device, and wireless communication network system including these devices in the present embodiment can transfer the first call request from one wireless network control device to another wireless network control device, in the case where overlaid wireless cells lie over more than one wireless network control device, that is, in the case where overlaid wireless cells are managed by different wireless network control devices. Hence, the present embodiment enables responding to a communication request to a communication terminal device that moves between location registration areas.

Third Embodiment (Schematic Configuration of Wireless Communication Network System)

An exchange, a wireless network device, and a wireless communication network system including these devices in the third embodiment of the present invention will be described by using FIG. 18 to FIG. 21. The schematic configuration of the wireless communication network system in the present embodiment will be described first, with reference to FIG. 18.

Figure 18:
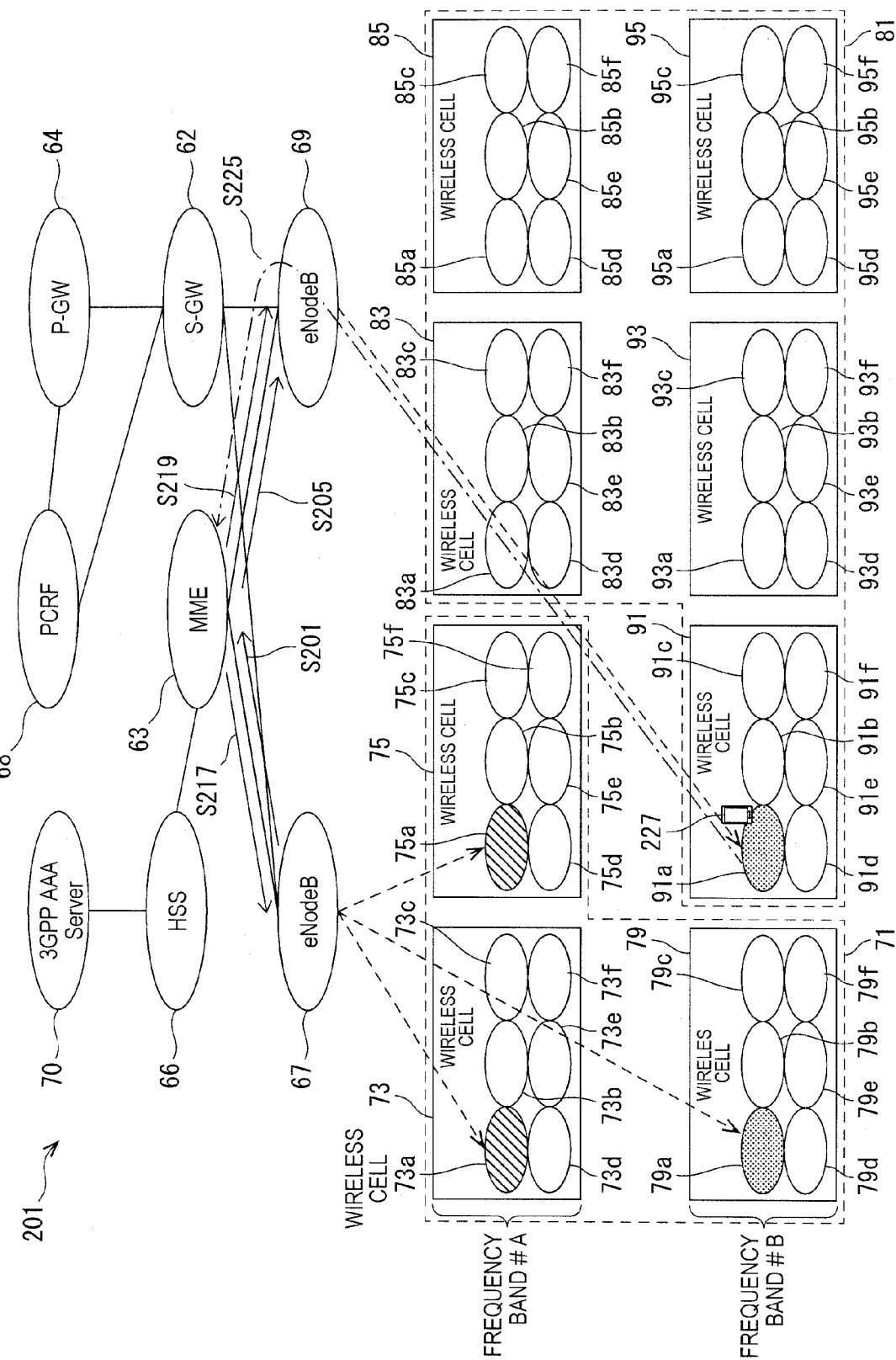
FIG. 18 is a block view illustrating the schematic configuration of a wireless communication network system 201 in the third embodiment of the present invention.

FIG. 18 is a block view illustrating the schematic configuration of a wireless communication network system 201 in the present embodiment. As illustrated in FIG. 18, the wireless communication network system 201 includes: a serving-gateway (S-GW) 62; a mobility management entity (MME) 63; a packet data network (PDN)-gateway (P-GW) 64; a subscriber management server (home subscriber server (HSS)) 66; a policy and charging rules function (PCRF) 68; a 3GPP authentication, authorization and accounting (AAA) server 70; and plural (two in this example) wireless base stations (eNodeB) 67 and 69. The MME 63, the S-GW 62, the G-GW 64, the HSS 66, the PCRF 68, and the 3GPP AAA server 70 are included in an evolved packet core (EPC) network. The wireless communication network system 201 includes the EPC network and the eNodeBs 67 and 69, and forms a wireless communication system based on the 3.9G (3.9th generation mobile communication system) standards. The MME 63 corresponds to the exchange in the present embodiment, and the eNodeBs 67 and 69 each correspond to the wireless network device in the present embodiment.

The HSS 66 is connected to the MME 63 and the 3GPP AAA server 70. The HSS 66 is a subscriber information database for holding user information relating to each communication terminal device (UE) 227 and the like, and stores subscriber information, location information, etc. The subscriber information is, for example, a user identifier or an MSISDN. The location information is the cell identifier of a wireless cell in which the UE 227 is located. In this example, the location information is the cell identifier of each of long term evolution (LTE) wireless cells 73, 75, and 79 included in a location registration area 71 included in the eNodeB 67, and the cell identifier of each of LTE wireless cells 83, 85, 91, 93, and 95 included in a location registration area 81 included in the eNodeB 69.

The MME 63 is connected to the HSS 66 and the eNodeBs 67 and 69. The MME 63 has an interface with the UE 227 present in a wireless zone of an LTE access system, and manages the movement of the UE 227, authenticates the UE 227, and controls the setting of the IP transmission path with the UE 227. The MME 63 manages the movement of the UE 227 and authenticates the UE 227, in cooperation with the HSS 66.

In addition to the above-mentioned function, the MME 63 has a function of executing a first call request to only at least one of an already located wireless cell that is a wireless cell in which a target communication terminal device that is a target of a communication request was located in a past predetermined period before the current time or a presumably located wireless cell, in order to prevent a shortage of wireless resources and an increase in system load. The presumably located wireless cell is a wireless cell that is overlaid with the already located wireless cell and in which the target communication terminal device is presumed to exist. The configuration of the MME 63 for achieving this function will be described later.

The S-GW 62 is connected to the eNodeBs 67 and 69, the P-GW 64, and the PCRF 68. The S-GW 62 is a gateway device for controlling the transmission of user data packets based on the instruction of the MME 63. The S-GW 63 relays user data packets transferred from the P-GW 64 or eNodeB 67 or 69, to the eNodeB 67 or 69 or the P-GW 64.

The P-GW 64 is connected to the PCRF 68 and the S-GW 62, and is capable of transmission/reception of predetermined control signals with these nodes. The P-GW 64 is a point of connection to a PDN, and is a gateway device that performs IP address assignment and the like and also receives all user data packets from a PDN such as a service control network (IP multimedia subsystem: IMS) to the UE 227 and the like.

The PCRF 68 is connected to a Proxy Call Session Control Function (PCSCF) (not illustrated) provided in the S-GW 62, the P-GW 64, or an IMS. The PCRF 68 is capable of transmission/reception of predetermined control signals with the PCSCF. The PCRF 68 determines an IP packet transmission policy such as charging method and quality of service (QoS) for transmission quality control in the S-GW 62 and the P-GW 64.

The 3GPP AAA server 70 is connected to the HSS 66. The 3GPP AAA server 70 authenticates and determines the communication authorization of a communication terminal device based on a user profile and an authentication vector transferred from the HSS 66 when the communication terminal device is located in a wireless zone of a non-cellular wireless access system.

The eNodeB 67 forms an LTE wireless area (wireless cell) by transmitting cell identification information (e.g. a cell identifier or a cell ID) to a specific range. In this example, the eNodeB 67 forms LTE wireless cells 73, 75, and 79. The eNodeB 67 performs a process relating to wireless communication of any communication terminal device located (residing) in the LTE wireless cells 73, 75, and 79. In detail, the eNodeB 67 performs, for example, a packet communication connection process or a handover process during a call for the communication terminal device.

In addition to the above-mentioned functions, the eNodeB 67 has a function of executing a call request (e.g. a paging request) to the already located wireless cell and presumably located wireless cell that is a target of the first call request received from the MME 63, in order to prevent a shortage of wireless resources and an increase in system load. The configuration of the eNodeB 67 for achieving this function will be described later.

Six wireless cells 73a, 73b, 73c, 73d, 73e, and 73f (the wireless cells 73a, 73b, 73c, 73d, 73e, and 73f are hereafter also referred to as "wireless cells 73a to 73f") are formed in the LTE wireless cell 73. Six wireless cells 75a, 75b, 75c, 75d, 75e, and 75f (hereafter the wireless cells 75a, 75b, 75c, 75d, 75e, and 75f are also referred to as "wireless cells 75a to 75f") are formed in the LTE wireless cell 75. Six wireless cells 79a, 79b, 79c, 79d, 79e, and 79f (hereafter the wireless cells 79a, 79b, 79c, 79d, 79e, and 79f are also referred to as "wireless cells 79a to 79f") are formed in the LTE wireless cell 79. The wireless cells 73a to 73f, 75a to 75f, and 79a to 79f are each a wireless cell (e.g. a microcell) formed by a base station (not illustrated) other than the eNodeB 67.

The eNodeB 67 stores the cell identification information (e.g. cell identifier) of the LTE wireless cells 73, 75, and 79 included in the eNodeB 67 and the wireless cells 73a to 73f, 75a to 75f, and 79a to 79f.

The LTE wireless cells 73, 75, and 79 and the wireless cells 73a to 73f, 75a to 75f, and 79a to 79f are included in the location registration area 71. The eNodeB 67 therefore corresponds to the management node for managing the location registration area 71 by storing the cell identification information of the LTE wireless cells 73, 75, and 79 and wireless cells 73a to 73f, 75a to 75f, and 79a to 79f and the like.

The eNodeB 69 has the same configuration and function as the eNodeB 67. In other words, the eNodeB 69 forms an LTE wireless area (wireless cell) by transmitting cell identification information (e.g. a cell identifier or a cell ID) to a specific range. In this example, the eNodeB 69 forms LTE wireless cells 83, 85, 91, 93, and 95. The eNodeB 69 performs a process relating to wireless communication of any communication terminal device located (residing) in the LTE wireless cells 83, 85, 91, 93, and 95. In detail, the eNodeB 69 performs, for example, a packet communication connection process or a handover process during a call for the communication terminal device.

In addition to the above-mentioned functions, the eNodeB 69 has, as with the eNodeB 67, a function of executing a call request (e.g. a paging request) to the already located wireless cell and presumably located wireless cell that is a target of the first call request received from the MME 63, in order to prevent a shortage of wireless resources and an increase in system load. The configuration of the eNodeB 69 for achieving this function will be described later.

Six wireless cells 83a, 83b, 83c, 83d, 83e, and 83f (the wireless cells 83a, 83b, 83c, 83d, 83e, and 83f are hereafter also referred to as "wireless cells 83a to 83f") are formed in the LTE wireless cell 83. Six wireless cells 85a, 85b, 85c, 85d, 85e, and 85f (hereafter the wireless cells 85a, 85b, 85c, 85d, 85e, and 85f are also referred to as "wireless cells 85a to 85f") are formed in the LTE wireless cell 85. Six wireless cells 91a, 91b, 91c, 91d, 91e, and 91f (hereafter the wireless cells 91a, 91b, 91c, 91d, 91e, and 91f are also referred to as "wireless cells 91a to 91f") are formed in the LTE wireless cell 91. Six wireless cells 93a, 93b, 93c, 93d, 93e, and 93f (hereafter the wireless cells 93a, 93b, 93c, 93d, 93e, and 93f are also referred to as "wireless cells 93a to 93f") are formed in the LTE wireless cell 93. The wireless cells 83a to 83f, 85a to 85f, 91a to 91f, 93a to 93f, and 95a to 95f are each a wireless cell (e.g. a microcell) formed by a base station (not illustrated) other than the eNodeB 69.

The eNodeB 69 stores the cell identification information (e.g. cell identifier) of the LTE wireless cells 83, 85, 91, 93, and 95 included in the eNodeB 69 and the wireless cells 83a to 83f, 85a to 85f, 91a to 91f, 93a to 93f, and 95a to 95f.

The LTE wireless cells 83, 85, 91, 93, and 95 and the wireless cells 83a to 83f, 85a to 85f, 91a to 91f, 93a to 93f, and 95a to 95f are included in the location registration area 81. The eNodeB 69 therefore corresponds to the management node for managing the location registration area 81 by storing the cell identification information of the LTE wireless cells 83, 85, 91, 93, and 95 and wireless cells 83a to 83f, 85a to 85f, 91a to 91f, 93a to 93f, and 95a to 95f and the like.

The LTE wireless cells 73, 75, 83, and 85 are wireless cells of frequency band #A in which radio waves of frequency #A (#A is a predetermined value, for example, 800 MHz) are used. The LTE wireless cells 79, 91, 93, and 95 are wireless cells of frequency band #B in which radio waves of frequency #B (#B is a predetermined value different from #A, for example, 2 GHz) are used.

In the case where the communication terminal device (illustrated as the UE 227 in FIG. 18 as an example) is located in the wireless cell 73, 75, or 79, the eNodeB 67 can wirelessly communicate with the communication terminal device according to LTE. In the case where the communication terminal device is located in the wireless cell 83, 85, 91, 93, or 95, the eNodeB 67 can wirelessly communicate with the communication terminal device according to LTE. For example, in the case where the UE 227 is located in the wireless cell 91a in the wireless cell 91 as illustrated in FIG. 18, the UE 227 communicates with the eNodeB 69 that includes the wireless cell 91 and is located upstream (at an upper level).

The wireless cells 73, 75, 79, 83, 85, 91, 93, and 95 and the wireless cells 73a to 73f, 75a to 75f, 79a to 79f, 83a to 83f, 85a to 85f, 91a to 91f, 93a to 93f, and 95a to 95f are each assigned cell identification information. Accordingly, in which wireless cell the communication terminal device is located can be determined from the cell identification information.

In the present embodiment, for example, the LTE wireless cells 73 and 79 are overlaid with each other. Further, the wireless cells 73a and 79a are overlaid with each other, the wireless cells 73b and 79b are overlaid with each other, the wireless cells 73c and 79c are overlaid with each other, the wireless cells 73d and 79d are overlaid with each other, the wireless cells 73e and 79e are overlaid with each other, and the wireless cells 73f and 79f are overlaid with each other.

For example, the LTE wireless cells 75 and 91 are overlaid with each other. Further, the wireless cells 75a and 91a are overlaid with each other, the wireless cells 75b and 91b are overlaid with each other, the wireless cells 75c and 91c are overlaid with each other, the wireless cells 75d and 91d are overlaid with each other, the wireless cells 75e and 91e are overlaid with each other, and the wireless cells 75f and 91f are overlaid with each other.

For example, the LTE wireless cells 83 and 93 are overlaid with each other. Further, the wireless cells 83a and 93a are overlaid with each other, the wireless cells 83b and 93b are overlaid with each other, the wireless cells 83c and 93c are overlaid with each other, the wireless cells 83d and 93d are overlaid with each other, the wireless cells 83e and 93e are overlaid with each other, and the wireless cells 83f and 93f are overlaid with each other.

For example, the LTE wireless cells 85 and 95 are overlaid with each other. Further, the wireless cells 85a and 95a are overlaid with each other, the wireless cells 85b and 95b are overlaid with each other, the wireless cells 85c and 95c are overlaid with each other, the wireless cells 85d and 95d are overlaid with each other, the wireless cells 85e and 95e are overlaid with each other, and the wireless cells 85f and 95f are overlaid with each other.

Thus, the LTE wireless cells 73 and 79 managed by the eNodeB 67 are overlaid with each other. The LTE wireless cells 83 and 93 managed by the eNodeB 69 are overlaid with each other. The LTE wireless cells 85 and 95 managed by the eNodeB 69 are overlaid with each other. The wireless cell 75 managed by the eNodeB 67 and the wireless cell 91 managed by the eNodeB 69 are overlaid with each other. Moreover, the wireless cells 75a to 75f are overlaid respectively with the wireless cells 91a to 91f. This embodiment therefore has the configuration that includes a mixture of the area in which the wireless cells managed by the same eNodeB are overlaid with each other and the area in which the wireless cells managed by the different eNodeBs are overlaid with each other.

(Schematic Configurations of Exchange and Wireless Network Device)

Figure 19:
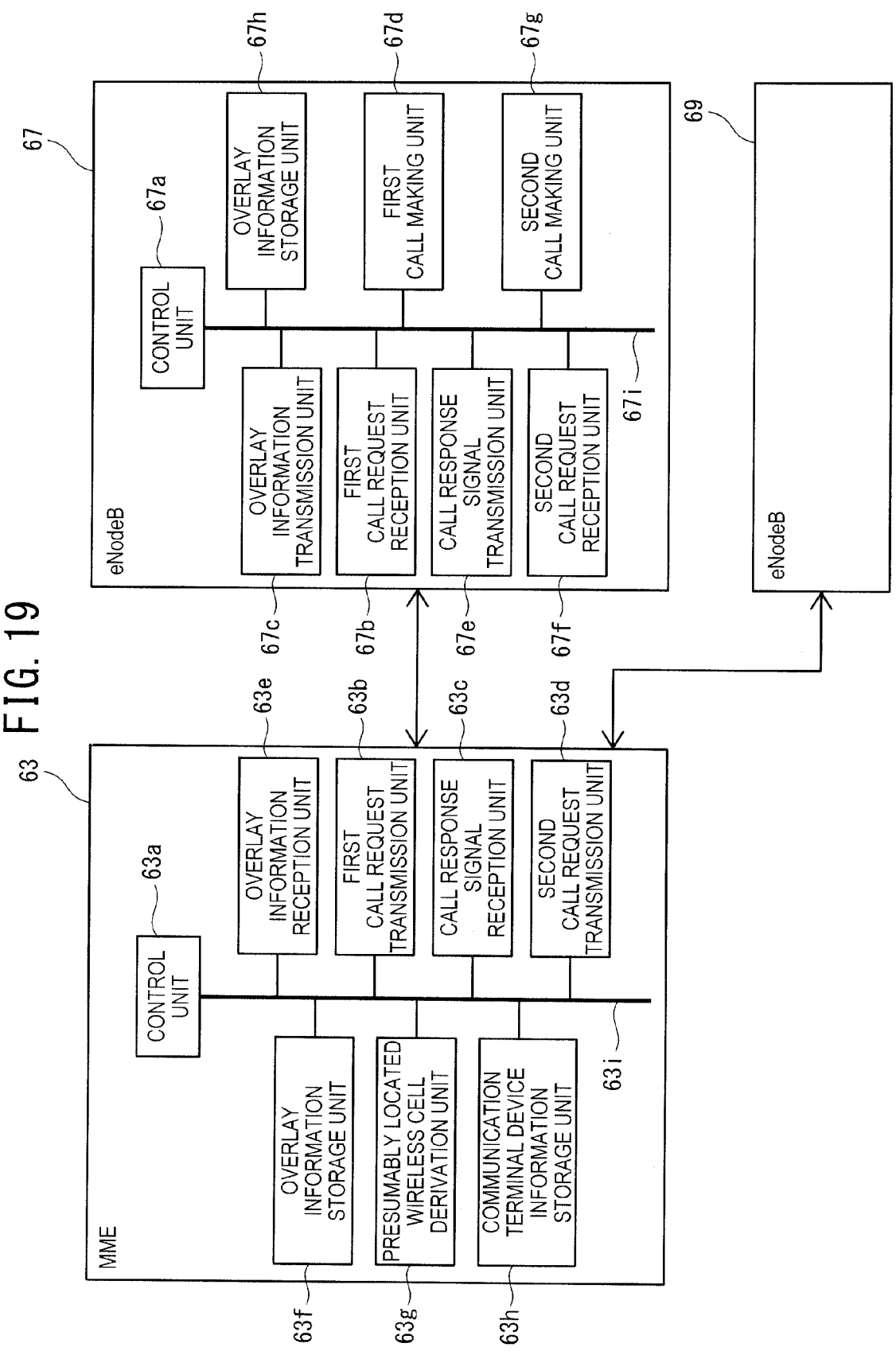
FIG. 19 is a block view illustrating the schematic configurations of an exchange (MME 63) and wireless network device (eNodeB 67, 69) in the third embodiment of the present invention.

The schematic configurations of the MME 63 as the exchange and eNodeBs 67 and 69 each as the wireless network device in the present embodiment will be described by using FIG. 19 and FIG. 20 with reference to FIG. 18. FIG. 19 is a functional block view relating to the call request function of the MME 63 and eNodeBs 67 and 69. The eNodeB 69 has the same configuration and function as the eNodeB 67, and the schematic configuration of the eNodeBs 67 and 69 will be described below using the eNodeB 67 as an example and the components of the eNodeB 69 are omitted in FIG. 19.

As illustrated in FIG. 19, the MME 63 includes a control unit 63a, a first call request transmission unit 63b, a call response signal reception unit 63c, a second call request transmission unit 63d, an overlay information reception unit 63e, an overlay information storage unit 63f, a presumably located wireless cell derivation unit 63g, and a communication terminal device information storage unit 63h. Instead of separating the first call request transmission unit 63b and the second call request transmission unit 63d as illustrated in FIG. 19, one call request transmission unit may serve as both the first call request transmission unit 63b and the second call request transmission unit 63d.

The control unit 63a, the first call request transmission unit 63b, the call response signal reception unit 63c, the second call request transmission unit 63d, the overlay information reception unit 63e, the overlay information storage unit 63f, the presumably located wireless cell derivation unit 63g, and the communication terminal device information storage unit 63h are connected to a bus line 63i. The control unit 63a, the first call request transmission unit 63b, the call response signal reception unit 63c, the second call request transmission unit 63d, the overlay information reception unit 63e, the overlay information storage unit 63f, the presumably located wireless cell derivation unit 63g, and the communication terminal device information storage unit 63h may be realized physically as separate devices, or may be realized each as a function of the MME 63.

The control unit 63a integrally controls the MME 63. The first call request transmission unit 63b, the call response signal reception unit 63c, the second call request transmission unit 63d, the overlay information reception unit 63e, the overlay information storage unit 63f, the presumably located wireless cell derivation unit 63g, and the communication terminal device information storage unit 63h each perform a predetermined operation based on a control signal transmitted from the control unit 63a via the bus line 63i.

The communication terminal device information storage unit 63h stores information of a present communication terminal device notified from a management node for managing a location registration area composed of plural wireless cells. The present communication terminal device is a communication terminal device present in a wireless cell included in the location registration area managed by the management node. In the present embodiment, the eNodeBs 67 and 69 each correspond to a management node, as mentioned above. Having received an outgoing request from the present communication terminal device, the eNodeB 67 or 69 notifies the MME 63 of the terminal identification information (e.g. terminal identifier or MSISDN) of the present communication terminal device and the cell identification information of the wireless cell in which the present communication terminal device is located, in association with each other. The MME 63 extracts the associated terminal identification information of the present communication terminal device and cell identification information of the wireless cell from the information notified from the eNodeB 67 or 69, and stores the terminal identification information and the cell identification information in the communication terminal device information storage unit 63h in association with each other.

The overlay information reception unit 63e receives overlay information at least transmitted from a management node for managing a location registration area composed of plural wireless cells upon connection of the management node. The overlay information relates to the overlaying of the plural wireless cells. From a management node connected for the first time (the eNodeB 67 or 69 in this example) or a management node which has undergone system changes, the MME 63 receives overlay information managed by the management node.

The overlay information includes the identification information (e.g. base station identification information) of the management node transmitting the overlay information and the identification information (e.g. cell identification information) of each overlaid wireless cell, as overlay-related information.

The overlay information storage unit 63f stores the overlay information received by the overlay information reception unit 63e. When the overlay information reception unit 63e receives the overlay information, the control unit 63a transmits the received overlay information to the overlay information storage unit 63f via the bus line 63i. The overlay information storage unit 63f stores the received overlay information in a database.

The overlay information stored in the overlay information storage unit 63f will be described below, with reference to FIG. 20A and FIG. 20B. FIG. 20 A and FIG. 20B illustrate databases of overlay information stored in the overlay information storage unit 63f. FIG. 20A illustrates a database in which each base station is associated with the wireless cells included in the base station. FIG. 20B illustrates a database in which overlaid wireless cells are associated with each other.

As illustrated in FIG. 20A, the overlay information storage unit 63f stores, for each base station, the cell identification information of wireless cells included in the base station in a database. The database has two fields: "base station identification information"; and "cell identification information (included)". The "base station identification information" indicates the identification information (e.g. E-UTRAN cell global ID (ECGI)) of the management node, i.e. the base station, included in the overlay information received by the overlay information reception unit 63e. The "cell identification information (included)" indicates the cell identification information of each wireless cell included in association with the base station identification information in the overlay information received by the overlay information reception unit 63e.

In the database in the upper part of FIG. 20A, "#1" in the "base station identification information" field indicates the base station identification information of the eNodeB 67. In the database, "a0" in the "cell identification information (included)" field indicates the cell identification information of the LTE wireless cell 73, "a1" indicates the cell identification information of the wireless cell 73a, "a2" indicates the cell identification information of the wireless cell 73b, "a3" indicates the cell identification information of the wireless cell 73c, "a4" indicates the cell identification information of the wireless cell 73d, "a5" indicates the cell identification information of the wireless cell 73e, and "a6" indicates the cell identification information of the wireless cell 73f.

"b0" in the "cell identification information (included)" field indicates the cell identification information of the LTE wireless cell 75, "b1" indicates the cell identification information of the wireless cell 75a, "b2" indicates the cell identification information of the wireless cell 75b, "b3" indicates the cell identification information of the wireless cell 75c, "b4" indicates the cell identification information of the wireless cell 75d, "b5" indicates the cell identification information of the wireless cell 75e, and "b6" indicates the cell identification information of the wireless cell 75f.

"c0" in the "cell identification information (included)" field indicates the cell identification information of the LTE wireless cell 79, "c1" indicates the cell identification information of the wireless cell 79a, "c2" indicates the cell identification information of the wireless cell 79b, "c3" indicates the cell identification information of the wireless cell 79c, "c4" indicates the cell identification information of the wireless cell 79d, "c5" indicates the cell identification information of the wireless cell 79e, and "c6" indicates the cell identification information of the wireless cell 79f.

By creasing the database in the upper part of FIG. 20A, the overlay information storage unit 63f can store the information that the base station with the base station identification information "#1" (the eNodeB 67 in this example) includes 21 wireless cells with the cell identification information "a0, a1, a2, a3, a4, a5, a6, b0, b1, b2, b3, b4, b5, b6, c0, c1, c2, c3, c4, c5, c6" (the LTE wireless cells 73, 75, and 79 and the wireless cells 73a to 73f, 75a to 75f, and 79a to 79f in this example).

In the database in the lower part of FIG. 20A, "#2" in the "base station identification information" field indicates the base station identification information of the eNodeB 69. In the database, "d0" in the "cell identification information (included)" field indicates the cell identification information of the LTE wireless cell 83, "d1" indicates the cell identification information of the wireless cell 83a, "d2" indicates the cell identification information of the wireless cell 83b, "d3" indicates the cell identification information of the wireless cell 83c, "d4" indicates the cell identification information of the wireless cell 83d, "d5" indicates the cell identification information of the wireless cell 83e, and "d6" indicates the cell identification information of the wireless cell 83f.

"e0" in the "cell identification information (included)" field indicates the cell identification information of the LTE wireless cell 85, "e1" indicates the cell identification information of the wireless cell 85a, "e2" indicates the cell identification information of the wireless cell 85b, "e3" indicates the cell identification information of the wireless cell 85c, "e4" indicates the cell identification information of the wireless cell 85d, "e5" indicates the cell identification information of the wireless cell 85e, and "e6" indicates the cell identification information of the wireless cell 85f.

"f0" in the "cell identification information (included)" field indicates the cell identification information of the LTE wireless cell 91, "f1" indicates the cell identification information of the wireless cell 91a, "f2" indicates the cell identification information of the wireless cell 91b, "f3" indicates the cell identification information of the wireless cell 91c, "f4" indicates the cell identification information of the wireless cell 91d, "f5" indicates the cell identification information of the wireless cell 91e, and "f6" indicates the cell identification information of the wireless cell 91f.

"g0" in the "cell identification information (included)" field indicates the cell identification information of the LTE wireless cell 93, "g1" indicates the cell identification information of the wireless cell 93a, "g2" indicates the cell identification information of the wireless cell 93b, "g3" indicates the cell identification information of the wireless cell 93c, "g4" indicates the cell identification information of the wireless cell 93d, "g5" indicates the cell identification information of the wireless cell 93e, and "g6" indicates the cell identification information of the wireless cell 93f.

"h0" in the "cell identification information (included)" field indicates the cell identification information of the LTE wireless cell 95, "h1" indicates the cell identification information of the wireless cell 95a, "h2" indicates the cell identification information of the wireless cell 95b, "h3" indicates the cell identification information of the wireless cell 95c, "h4" indicates the cell identification information of the wireless cell 95d, "h5" indicates the cell identification information of the wireless cell 95e, and "h6" indicates the cell identification information of the wireless cell 95f.

By creasing the database in the lower part of FIG. 20A, the overlay information storage unit 63f can store the information that the base station with the base station identification information "#2" (the eNodeB 69 in this example) includes 35 wireless cells with the cell identification information "d0, d1, d2, d3, d4, d5, d6, e0, e1, e2, e3, e4, e5, e6, f0, f1, f2, f3, f4, f5, f6, g0, g1, g2, g3, g4, g5, g6, h0, h1, h2, h3, h4, h5, h6" (the LTE wireless cells 83, 85, 91, 93, and 95 and the wireless cells 83a to 83f, 85a to 85f, 91a to 91f, 93a to 93f, and 95a to 95f in this example).

As illustrated in FIG. 20B, the overlay information storage unit 63f stores the identification information of overlaid wireless cells in association with each other in a database. The database has the "overlaid cell" field. The "overlaid cell" indicates the wireless cells that are included in the overlay information received by the overlay information reception unit 63e and associated with each other as overlaid wireless cells. The overlay information storage unit 63f stores the cell identification information of overlaid wireless cells in the same row in the "overlaid cell" field. In the database illustrated in FIG. 20B, the wireless cells with the cell identification information "a1" and "b1" stored in the first row except the field row are overlaid with each other, the wireless cells with the cell identification information "a2" and "b2" stored in the second row are overlaid with each other, and the wireless cells with the cell identification information "a6" and "b6" stored in the fourth row are overlaid with each other.

In the database, the wireless cells with the cell identification information "c1" and "d1" stored in the fifth row except the field row are overlaid with each other, the wireless cells with the cell identification information "c2" and "d2" stored in the sixth row are overlaid with each other, and the wireless cells with the cell identification information "c6" and "d6" stored in the eighth row are overlaid with each other.

In the database, the wireless cells with the cell identification information "e1" and "f1" stored in the ninth row except the field row are overlaid with each other, the wireless cells with the cell identification information "e2" and "f2" stored in the tenth row are overlaid with each other, and the wireless cells with the cell identification information "e6" and "f6" stored in the twelfth row are overlaid with each other.

In the database, the wireless cells with the cell identification information "g1" and "h1" stored in the thirteenth row except the field row are overlaid with each other, the wireless cells with the cell identification information "g2" and "h2" stored in the fourteenth row are overlaid with each other, and the wireless cells with the cell identification information "g6" and "h6" stored in the sixteenth row are overlaid with each other. In the third, seventh, eleventh, and fifteenth rows in the database, " . . . " indicates that any cell identification information is stored.

In the example illustrated in FIG. 20B, the number of overlaid wireless cells is 2. In the case where three or more wireless cells are overlaid with each other, the cell identification information of three or more wireless cells are stored in the same row in the "overlaid cell" field.

The overlay information transmitted from each of the eNodeBs 67 and 69 includes the cell identification information of each wireless cell included in the eNodeB and the cell identification information of the wireless cell overlaid with the wireless cell with the former cell identification information, in association with the base station identification information of the eNodeB. The overlay information storage unit 63f extracts the base station identification information and the cell identification information from the identification information included in the overlay information, and creates the database illustrated in FIG. 20A and FIG. 20B.

Referring back to FIG. 19, the presumably located wireless cell derivation unit 63g in the MME 63 acquires the already located wireless cell and derives the wireless cell overlaid with the already located wireless cell as the presumably located wireless cell, based on the terminal identification information of the target communication terminal device included in the communication request received by the MME 63. In more detail, the presumably located wireless cell derivation unit 63g acquires the wireless cell with the cell identification information stored in the communication terminal device information storage unit 63h in association with the terminal identification information of the target communication terminal device, as the already located wireless cell. The presumably located wireless cell derivation unit 63g also derives, as the presumably located wireless cell, the wireless cell with the cell identification information associated with the cell identification information acquired from the communication terminal device information storage unit 63h, with reference to the database illustrated in FIG. 20B which is stored in the overlay information storage unit 63f. The presumably located wireless cell derivation unit 63g derives the already located wireless cell and the presumably located wireless cell and outputs the cell identification information of the derived already located wireless cell and presumably located wireless cell to the first call request transmission unit 63b, based on the instruction of the control unit 63a.

The first call request transmission unit 63b transmits the first call request which is a call request to only at least any of the already located wireless cell and the presumably located wireless cell, to the management node for managing the location registration area including the plural wireless cells including the already located wireless cell and the presumably located wireless cell.

The already located wireless cell mentioned here is the wireless cell in which the target communication terminal device that is a target of the communication request was located in the past predetermined period before the current time (the time of transmission of the first call request). For example, the wireless cells 73a and 75a are already located wireless cells in FIG. 18. The presumably located wireless cell is the wireless cell that is overlaid with the already located wireless cell and in which the target communication terminal device is presumed to exist, as mentioned above. For example, the wireless cells 79a and 91a are presumably located wireless cells in FIG. 19. The first call request includes the terminal identification information (e.g. user identifier, user ID, or MSISDN) of the target communication terminal device.

The first call request transmission unit 63b receives the cell identification information of each of the already located wireless cell and presumably located wireless cell from the presumably located wireless cell derivation unit 63g, and receives the terminal identification information included in the communication request from the control unit 63a. The first call request transmission unit 63b transmits the first call request including the received terminal identification information to each of the eNodeB including the presumably located wireless cell of the received cell identification information and the eNodeB including the already located wireless cell of the received cell identification information, based on the first call request transmission instruction from the control unit 63a.

The call response signal reception unit 63c receives a response signal to the first call request, from the management node. The call response signal reception unit 63c receives the response signal from the destination of the first call request. In this example, the call response signal reception unit 63c receives the response signal from any of the eNodeBs 67 and 69 to which the first call request has been transmitted. Having received the response signal, the call response signal reception unit 63c notifies the control unit 63a of the reception of the response signal.

The control unit 63a measures the standby time from when the first call request transmission unit 63b transmits the first call request signal to when the call response signal reception unit 63c receives the response signal. If the standby time from when the first call request transmission unit 63b transmits the first call request exceeds a predetermined period without the call response signal reception unit 63c receiving the response signal, the control unit 63a instructs the second call request transmission unit 63d to transmit the second call request.

The second call request transmission unit 63d transmits the second call request to the management node to which the first call request has been transmitted (at least one of the eNodeBs 67 and 69 in this example), based on the instruction of the control unit 63a.

The second call request is a call request to at least a wireless cell different from the already located wireless cell and the presumably located wireless cell from among the plural wireless cells. The second call request includes the same terminal identification information as that included in the first call request. The plurality of wireless cells are the wireless cells included in the location registration area to which the first call request is made.

In detail, the second call request transmission unit 63d transmits the second call request to the management node, in the case where the call response signal reception unit 63c has not received the response signal to the first call request within the predetermined period after the first call request transmission unit 63b transmits the first call request. The management node mentioned here is the management node for managing the location registration area to which the first call request is made (at least one of the eNodeBs 67 and 69 in this example).

The schematic configuration of the eNodeB 67 will be described next. As illustrated in FIG. 19, the eNodeB 67 includes a control unit 67a, a first call request reception unit 67b, an overlay information transmission unit 67c, a first call making unit 67d, a call response signal transmission unit 67e, a second call request reception unit 67f, a second call making unit 67g, and an overlay information storage unit 67h. Instead of separating the first call request reception unit 67b and the second call request reception unit 67f as illustrated in FIG. 19, one call request reception unit may serve as both the first call request reception unit 67b and the second call request reception unit 67f. Instead of separating the first call making unit 67d and the second call making unit 67g as illustrated in FIG. 19, one call making unit may serve as both the first call making unit 67d and the second call making unit 67g.

The control unit 67a, the first call request reception unit 67b, the overlay information transmission unit 67c, the first call making unit 67d, the call response signal transmission unit 67e, the second call request reception unit 67f, the second call making unit 67g, and the overlay information storage unit 67h are connected to a bus line 67i. The control unit 67a, the first call request reception unit 67b, the overlay information transmission unit 67c, the first call making unit 67d, the call response signal transmission unit 67e, the second call request reception unit 67f, the second call making unit 67g, and the overlay information storage unit 67h may be realized physically as separate devices, or may be realized each as a function of the eNodeB 67.

The control unit 67a integrally controls the eNodeB 67. The first call request reception unit 67b, the overlay information transmission unit 67c, the first call making unit 67d, the call response signal transmission unit 67e, the second call request reception unit 67f, the second call making unit 67g, and the overlay information storage unit 67h each perform a predetermined operation based on a control signal transmitted from the control unit 67a via the bus line 67i.

The overlay information storage unit 67h stores the overlay information of the wireless cells included in the location registration area managed by the eNodeB 67. The overlay information storage unit 67h stores the overlay information in a database as an example. The overlay information storage unit 67h stores the list of the cell identification numbers of the wireless cells included in the eNodeB 67, as in the database illustrated in FIG. 20A. The overlay information storage unit 67h also stores the cell identification numbers of the overlaid wireless cells in association with each other, as in the database illustrated in FIG. 20B.

The overlay information transmission unit 67c transmits the overlay information in the eNodeB 67 to its upper node, at least when connecting to the upper node. In this example, the upper node of the eNodeB 67 is the MME 63. When connecting to the MME 63 for the first time or after undergoing system changes or the like, the eNodeB 67 acquires the overlay information from the overlay information storage unit 67h and transmits it to the MME 63 via the overlay information transmission unit 67c.

The first call request reception unit 67b receives the first call request which is a call request to only at least any of the already located wireless cell and the presumably located wireless cell, from the upper node.

As mentioned above, the already located wireless cell is the wireless cell in which the target communication terminal device that is a target of the communication request existed in the past predetermined period before the current time (the time of transmission of the first call request from the first call request transmission unit 63b). The presumably located wireless cell is the wireless cell overlaid with the already located wireless cell. The first call request received by the first call request reception unit 67b includes the cell identification information of at least any of the already located wireless cell and the presumably located wireless cell, and the terminal identification information of the target communication terminal device.

The eNodeB 67 receives the first call request including the terminal identification information of the target communication terminal device and the cell identification information of at least any of the already located wireless cell and the presumably located wireless cell from the MME 63 via the first call request reception unit 67b. When the first call request reception unit 67b receives the first call request, the control unit 67a transmits the terminal identification information, already located wireless cell, and presumably located wireless cell included in the first call request to the first call making unit 67d, and instructs the first call making unit 67d to make the first call request.

The first call making unit 67d makes the first call request (e.g. paging request) to the already located wireless cell and presumably located wireless cell transmitted from the first call request reception unit 67b, based on the instruction of the control unit 67a.

The call response signal transmission unit 67e, upon receiving the response signal from the communication terminal device to the first call request made by the first call making unit 67d, transmits the response signal to the upper node (the MME 63 in the present embodiment).

The second call request reception unit 67f receives the second call request transmitted from the second call request transmission unit 63d in the MME 63. The second call request is a request transmitted from the MME 63 in the case where the call response signal reception unit 63c has not received the response signal to the first call request within the predetermined period from the transmission of the first call request by the first call request transmission unit 63b. In other words, the second call request is a request transmitted from the MME 63 in the case where the call response signal transmission unit 67e has not transmitted the response signal within the predetermined period from the reception of the first call request by the first call request reception unit 67b. The second call request received by the second call request reception unit 67f includes at least the cell identification information of a wireless cell different from the already located wireless cell and the presumably located wireless cell from among the plural wireless cells included in the location registration area called by the first call request. The second call request received by the second call request reception unit 67f also includes the same terminal identification information as that included in the first call request.

The second call making unit 67g makes the call to at least the wireless cell different from the already located wireless cell and the presumably located wireless cell, based on the second call request received by the second call request reception unit 67f. In the case where the second call request includes the cell identification information of the already located wireless cell and presumably located wireless cell, the second call making unit 67g makes the second call request to the wireless cells indicated by the cell identification information.

(Operation of Wireless Communication Network System 201 Including MME 63 and eNodeBs 67 and 69)

Figure 21:
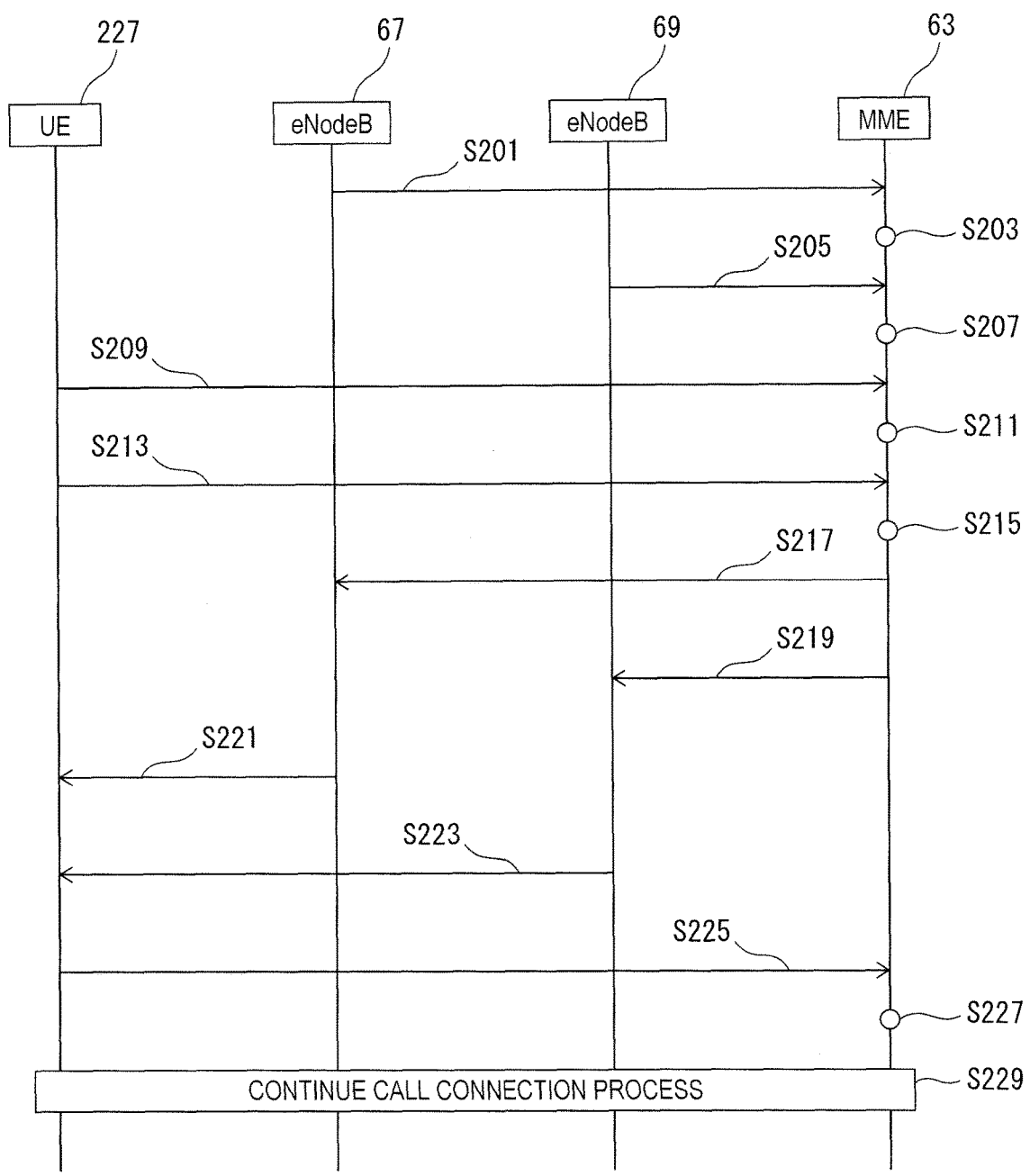
FIG. 21 is a sequence view illustrating an example of the operation of the wireless communication network system 201 in the third embodiment of the present invention.

The operations of the MME 63 as the exchange, eNodeBs 67 and 69 each as the wireless network device, and a wireless communication network system 201 including these devices in the present embodiment will be described by using FIG. 21 with reference to FIG. 18 to FIG. 20. FIG. 21 is a sequence view illustrating an example of the operation of the wireless communication network system 201 in the present embodiment.

As illustrated in FIG. 21, the eNodeB 67 transmits overlay information to the MME 63, when connecting to the MME 63 for the first time (step S201). For example, the eNodeB 67 transmits all information such as cell identification information and overlay information stored in the overlay information storage unit 67h, to the MME 63 via the overlay information transmission unit 67c.

The MME 63 receives the overlay information and the like transmitted from the eNodeB 67 by the overlay information reception unit 63e, and stores the information in the overlay information storage unit 63f (step S203). For example, the MME 63 extracts the base station identification information of the eNodeB 67, the cell identification information of each wireless cell included in the eNodeB 67, and the overlay information, from the information transmitted from the eNodeB 67. The MME 63 creates the database having the data configuration illustrated in FIG. 20A and FIG. 20B based on the extracted information, and stores it in the overlay information storage unit 63f.

Similarly, the eNodeB 69 transmits overlay information and the like to the MME 63, when connecting to the MME 63 for the first time (step S205). For example, the eNodeB 69 transmits all information such as cell identification information and overlay information stored in the overlay information storage unit (not illustrated), to the MME 63 via the overlay information transmission unit.

The MME 63 receives the overlay information and the like transmitted from the eNodeB 69 by the overlay information reception unit 63e, and stores the information in the overlay information storage unit 63f (step S207). For example, the MME 63 extracts the base station identification information of the eNodeB 69, the cell identification information of each wireless cell included in the eNodeB 69, and the overlay information, from the information transmitted from the eNodeB 69. The MME 63 creates the database having the data configuration illustrated in FIG. 20A and FIG. 20B based on the extracted information, and stores it in the overlay information storage unit 63f.

The wireless communication network system 201 carries out a location registration process each time the location registration area in which the UE 227 is located changes. For example, when the UE 227 recognizes a change of area information as a result of moving to the wireless cell 73a in the location registration area 71, the UE 227 makes a location registration request to the MME 63 via the eNodeB 67 (step S209). The location registration request includes the cell identification information of the wireless cell 73a in which the UE 227 is located.

The MME 63 stores the cell identification information included in the location registration request, in the communication terminal device information storage unit 63h in association with the terminal identification information of the UE 227 (step S211).

The UE 227 also transmits a connection establishment signal via the eNodeB 67, in order to establish a signaling connection with the MME 63 (step S213). The connection establishment signal includes the cell identification information of, for example, the wireless cell 75a in which the UE 227 is located as a result of moving subsequently.

The MME 63 stores the cell identification information included in the connection establishment signal, in the communication terminal device information storage unit 63h in association with the terminal identification information of the UE 227 (step S215).

Thus, upon receiving the location registration request signal or the connection establishment signal, the MME 63 stores the cell identification information of the UE 227 and the like included in such a signal, and also updates the stored information. In this way, for example, the presence history of each wireless cell in which the UE 227 is located is held in the communication terminal device information storage unit 63h in the MME 63.

For example, suppose a communication request to the UE 227 is made from an external device (not illustrated) connected to the wireless communication network system 201. In this case, the MME 63 derives the wireless cell that is a target of the first call request, based on the terminal identification information included in the communication request (step S215). For example, the control unit 63a in the MME 63 transmits the terminal identification information included in the communication request to the presumably located wireless cell derivation unit 63g, and instructs the presumably located wireless cell derivation unit 63g to derive the already located wireless cell and the presumably located wireless cell. The presumably located wireless cell derivation unit 63g acquires the cell identification information associated with the terminal identification information, from the communication terminal device information storage unit 63h. In this example, the presumably located wireless cell derivation unit 63g acquires the cell identification information of the wireless cells 73a and 75a, as the cell identification information associated with the terminal identification information. The presumably located wireless cell derivation unit 63g derives the cell identification information overlaid with the acquired cell identification information, with reference to the overlay information storage unit 63f. In this example, the presumably located wireless cell derivation unit 63g derives the cell identification information of the wireless cell 79a overlaid with the wireless cell 73a and the cell identification information of the wireless cell 91a overlaid with the wireless cell 75a. The presumably located wireless cell derivation unit 63g determines the wireless cell of the cell identification information acquired from the communication terminal device information storage unit 63h as the already located wireless cell, determines the wireless cell of the cell identification information derived from the overlay information storage unit 63f as the presumably located wireless cell, and transmits these cell identification information to the first call request transmission unit 63b.

The control unit 63a determines the eNodeB to which the first call request is to be transmitted, based on the cell identification information transmitted to the first call request transmission unit 63b. The control unit 63a extracts the eNodeB including the cell identification information transmitted to the first call request transmission unit 63b, with reference to the overlay information storage unit 63f. The control unit 63a extracts the eNodeB 67 including the wireless cell 73a and the eNodeB 69 including the wireless cell 91a, from the database illustrated in FIG. 20A which is stored in the overlay information storage unit 63f. The control unit 63a determines that the extracted eNodeBs 67 and 69 are each the eNodeB to which the first call request is to be made, and instructs the first call request transmission unit 63b to make the first call request to the eNodeBs 67 and 69.

The first call request transmission unit 63b accordingly transmits the first call request including the terminal identification information of the UE 227 that is a target of the communication request, the cell identification information of the wireless cells 73a and 75a as the received already located wireless cells, and the cell identification information of the wireless cells 79a and 91a as the received presumably located wireless cells, to the eNodeB 67 (step S217). The first call request transmission unit 63b also transmits the first call request including the same information as that transmitted to the eNodeB 67, to the eNodeB 69 (step S219). When the first call request transmission unit 63b transmits the first call request, the control unit 63a starts measuring the standby time until the reception of the response signal to the first call request.

The control unit 67a in the eNodeB 67, having received the first call request via the first call request reception unit 67b, extracts the cell identification information of the wireless cells 73a, 75a, 79a, and 91a from the received first call request. The control unit 67a determines whether or not each wireless cell of the extracted cell identification information is a wireless cell included in the eNodeB 67, with reference to the overlay information storage unit 67h. In this example, the control unit 67a determines that the wireless cells 73a, 75a, and 79a are wireless cells included in the eNodeB 67, and the wireless cell 91a is a wireless cell not included in the eNodeB 67.

The control unit 67a instructs the first call request reception unit 67b to transmit the cell identification information of the wireless cells 73a, 75a, and 79a determined as being included in the eNodeB 67 and the terminal identification information included in the first call request, to the first call making unit 67d. The first call making unit 67d makes the call request including the terminal identification information to the wireless cells 73a, 75a, and 79a of the received cell identification information, when receiving the first call request execution instruction from the control unit 67a (step S221).

The eNodeB 69, having received the first call request, operates in the same way as the eNodeB 67 that has received the first call request. The control unit in the eNodeB 69 determines that the wireless cell 91a is a wireless cell included in the eNodeB 69, and the wireless cells 73a, 75a, and 79a are wireless cells not included in the eNodeB 69.

The control unit in the eNodeB 69 instructs the first call request reception unit to transmit the cell identification information of the wireless cell 91a determined as being included in the eNodeB 69 and the terminal identification information included in the first call request, to the first call making unit. The first call making unit makes the call request including the terminal identification information to the presumably located wireless cell 91a of the received cell identification information, when receiving the first call request execution instruction from the control unit (step S223). Thus, the first call request does not necessarily include the cell identification information of the already located wireless cell and the presumably located wireless cell, and may include only the already located wireless cell or only the presumably located wireless cell.

For example, suppose the UE 227 is located in the wireless cell 91a to which the first call request is made, as illustrated in FIG. 18. The UE 227 transmits the response signal to the first call request, to the eNodeB 69. The response signal is transmitted to the MME 63 via the eNodeB 69 (step S225).

In the case where the MME 63 receives the response signal before the standby time reaches a timeout, the MME 63 accepts the response signal (step S227).

Having received the response signal to the first call request, the MME 63 starts and continues a call connection process by an already known method (step S229).

In the case where the MME 63 has not received the response signal to the first call request before the standby time reaches a timeout, the MME 63 makes the second call request to the eNodeBs 67 and 69 to which the first call request has been made. After this, the same process as step S17 in the first embodiment is carried out between the MME 63 and the eNodeB 67 and between the MME 63 and the eNodeB 69.

As described heretofore, the exchange, wireless network device, and wireless communication network system in the present embodiment can selectively make the call request to the wireless cell in which the communication terminal device is relatively likely to exist from among the plural wireless cells included in the location registration area. The exchange, wireless network device, and wireless communication network system in the present embodiment thus have the same advantageous effects as the exchange, wireless network control device, and wireless communication network system including these devices in the first embodiment.

In addition, the exchange, wireless network device, and wireless communication network system in the present embodiment can store overlay information between wireless networks in the overlay information storage unit included in the exchange, even in the case where overlaid wireless cells lie over more than one wireless network device, that is, in the case where overlaid wireless cells are managed by different wireless network devices. Hence, the present embodiment enables responding to a communication request to a communication terminal device that moves between location registration areas.

The present invention is not limited to the above-described embodiments, and variations are applicable.

In the first and second embodiments, the SGSN forming the 3G core network is used as an example of the exchange, and the RNC connected to the 3G core network is used as an example of the wireless network control device. However, the present invention is not limited to such.

For example, the MSC 6 as the exchange in the present invention may include the control unit 3a, the first call request transmission unit 3b, the call response signal reception unit 3c, the second call request transmission unit 3d, and the wireless cell information holding unit 3e illustrated in FIG. 2. While a shortage of wireless resources and an increase in system load are prevented with regard to packet communication in the first and second embodiments, the inclusion of the configuration such as the first call request transmission unit 3b in the MSC 6 prevents a shortage of wireless resources and an increase in system load with regard to circuit exchange, i.e. audio communication.

The first and second embodiments of the present invention are also applicable to, as the exchange, an MME forming an EPC which is a 3.9G core network such as EUTRAN (Evolved Universal Terrestrial Radio Access Network), as an example. The present invention is also applicable to, as the wireless network control device, a wireless base station (eNodeB) that is connected to an EPC network and performs wireless communication according to LTE and also connects a communication terminal device to the EPC network.

In other words, the same advantageous effects as the first embodiment are achieved even in the case where the MME includes the control unit 3a, the first call request transmission unit 3b, the call response signal reception unit 3c, the second call request transmission unit 3d, and the wireless cell information holding unit 3e illustrated in FIG. 2 and the eNB includes the control unit 7a, the first call request reception unit 7b, the presumably located wireless cell derivation unit 7c, the first call making unit 7d, the call response signal transmission unit 7e, the second call request reception unit 7f, the second call making unit 7g, and the wireless cell holding period determination table 7h illustrated in FIG. 4.

Instead of the configuration illustrated in FIG. 4, the eNodeB may include the control unit 37a, the first call request reception unit 37b, the presumably located wireless cell derivation unit 37c, the first call making unit 37d, the call response signal transmission unit 37e, the second call request reception unit 37f, the second call making unit 37g, the wireless cell relative positional relation storage unit 37h, and the bus line 37i illustrated in FIG. 11, or include the control unit 47a, the first call request reception unit 47b, the presumably located wireless cell derivation unit 47c, the first call making unit 47d, the call response signal transmission unit 47e, the second call request reception unit 47f, the second call making unit 47g, the wireless cell relative positional relation storage unit 47h, the bus line 47i, and the first call request transfer unit 47j. Such configurations have the same advantageous effects as the first and second embodiments.

The present invention is also applicable to an exchange having the same function as an SGSN or an MME, and a wireless network control device having the same function as an RNC or an eNB. For example, the present invention is applicable to a device having the same function as an SGSN, an MSC, or an MME, in a 4G (4th generation mobile communication system) core network or a future mobile communication system core network higher than 4G.

In the first and second embodiments, the exchange transmits the already located wireless cell to the wireless network control device. However, the present invention is not limited to such. For example, the wireless network control device may include the wireless cell information holding unit, and determine the already located wireless cell using the wireless cell information holding unit and also derive the presumably located wireless cell using the wireless cell holding period determination table, based on the call request transmitted from the exchange and including the identification information of the target communication terminal device. With such a configuration, the wireless network control device can make the call request to the wireless cell selected from the plural wireless cells included in the location registration area, even in the case where the exchange makes the same call request (paging request) in a prior art technology.

For example, the wireless network control device may select whether or not to make the first call request. In a region (e.g. urban area) where the wireless cell in which the communication terminal device is located changes frequently, it is expected that the wireless network control device is less likely to receive the response signal to the first call request and more likely to make the second call request.

In a region (e.g. rural area) where the wireless cell in which the communication terminal device is located does not change frequently, on the other hand, it is expected that the wireless network control device is more likely to receive the response signal to the first call request and less likely to make the second call request.

Accordingly, the wireless network control device may select whether or not to make the first call request, based on whether or not the response signal to the first call request is likely to be received. This reduces the call request amount as a whole, with it being possible to prevent a shortage of wireless resources and an increase in system load.

The present invention may be embodied as a computer program. For example, it is possible to realize the function of each unit of the SGSN 3, the RNCs 7, 37, and 47, the MME 63, and the eNodeBs 67 and 69 as relay devices in the above-described embodiments, as a communication program. Thus, some or all of the present invention may be incorporated into hardware or software (including firmware, resident software, microcode, state machine, a gate array, etc.). Furthermore, the present invention may be a computer program product on a computer-usable or computer-readable storage medium, with computer-usable or computer-readable program code being incorporated in the medium. In the context of this description, the computer-usable or computer-readable medium is any medium that enables recording, storage, communication, transmission, or conveyance of a program used by or together with an instruction execution system, apparatus, or device.

The scope of the present invention is not limited to the illustrated and described exemplary embodiments, and includes all embodiments that produce advantageous effects equivalent to those intended by the present invention. The scope of the present invention is not limited to the combinations of features of the invention defined by the claims, and may include all desirable combinations of specific features out of all features disclosed herein.

REFERENCE SIGNS LIST 1, 2, 201 wireless communication network system
3 SGSN (exchange)
3a, 7a, 37a, 63a, 67a control unit
3b, 63b first call request transmission unit
3c, 63c call response signal reception unit
3d, 63d second call request transmission unit
3e wireless cell information holding unit
3f, 7i, 37i, 47i, 63i, 67i bus line
4 GGSN
5 HLR
6 MSC
7, 37, 47, 49 RNC (wireless network control device)
7b, 37b, 47b, 67b first call request reception unit
7c, 37c, 47c, 63g presumably located wireless cell derivation unit
7d, 37d, 47d, 67d first call making unit
7e, 37e, 47e, 67e call response signal transmission unit
7f, 37f, 47f, 67f second call request reception unit
7g, 37g, 47g, 67g second call making unit
7h wireless cell holding period determination table
8 VLR
9 to 15, 33, 35, 39, 43 to 55 BTS
10 GMSC
17, 25, 31, 41 position registration area
19a to 19i, 21a to 21i, 23a to 23i, 73a to 73f, 75a to 75f, 79a to 79f, 83a to 83f, 85a to 85f, 91a to 91f, 93a to 93f, 95a to 95f wireless cell
27, 277 communication terminal device 37h, 47h wireless cell relative positional relation storage unit
62 S-GW
63 MME
63e overlay information reception unit
63f, 67f overlay information storage unit
63h communication terminal device information storage unit
64 P-GW
66 HSS
67, 69 eNodeB
67c overlay information transmission unit
68 PCRF
70 3GPP AAA server

The invention claimed is:

1. A Serving General Packet Radio Service Support Node (SGSN) or Mobility Management Entity (MME), comprising:
a first call request transmission unit, including electronic components respectively programmed and thereby configured to transmit a first call request, which is a call request to only an already located wireless cell and which includes terminal identification information of a target communication terminal device that is a target of a communication request, to a management node for managing a location registration area including a plurality of wireless cells having the already located wireless cell, the already located wireless cell being a wireless cell in which the target communication terminal device was located in a past predetermined period before a current time;
a call response signal reception unit, including electronic components respectively programmed and thereby configured to receive a response signal to the first call request from the management node; and
a second call request transmission unit, including electronic components respectively programmed and thereby configured to transmit to the management node a second call request, which is the call request to at least a wireless cell different from the already located wireless cell from among the plurality of wireless cells and which includes the terminal identification information, in a case where the call response signal reception unit has not received the response signal for a predetermined period after the first call request transmission unit transmits the first call request.

2. The SGSN or MME according to claim 1, further comprising a presumably located wireless cell derivation unit, including electronic components respectively programmed and thereby configured to derive a presumably located wireless cell in which the target communication terminal device is presumably located based on the already located wireless cell.

3. The SGSN or MME according to claim 2, further comprising a wireless cell relative positional relation storage unit, including electronic components respectively programmed and thereby configured to store a relative positional relation between the plurality of wireless cells included in the location registration area,
wherein the presumably located wireless cell derivation unit is configured to derive, as the presumably located wireless cell, at least any one of a wireless cell adjacent to the already located wireless cell, a wireless cell within a predetermined distance from the already located wireless cell, or a wireless cell overlaid with the already located wireless cell, based on the relative positional relation stored in the wireless cell relative positional relation storage unit.

4. A Serving General Packet Radio Service Support Node (SGSN) or Mobility Management Entity (MME), comprising:
an overlay information reception unit, including electronic components respectively programmed and thereby configured to receive overlay information transmitted from a management node for managing a location registration area including a plurality of wireless cells when the management node is connected, the overlay information being related to overlaying of the plurality of wireless cells;
an overlay information storage unit, including electronic components respectively programmed and thereby configured to store the overlay information;
a first call request transmission unit, including electronic components respectively programmed and thereby configured to transmit a first call request, which is a call request to at least any one of an already located wireless cell or a presumably located wireless cell and which includes terminal identification information of a target communication terminal device that is a target of a communication request, to the management node including the already located wireless cell, the already located wireless cell being a wireless cell in which the target communication terminal device was located in a past predetermined period before a current time, and the presumably located wireless cell being a wireless cell that is overlaid with the already located wireless cell, the target communication terminal device being presumably located therein, and being derived from the overlay information storage unit;
a call response signal reception unit, including electronic components respectively programmed and thereby configured to receive a response signal to the first call request from the management node; and
a second call request transmission unit, including electronic components respectively programmed and thereby configured to transmit to the management node a second call request, which is the call request to at least a wireless cell different from the already located wireless cell and the presumably located wireless cell from among the plurality of wireless cells and which includes the terminal identification information, in a case where the call response signal reception unit has not received the response signal for a predetermined period after the first call request transmission unit transmits the first call request.

5. A wireless Radio Network Controller (RNC), comprising:
a first call request reception unit, including electronic components respectively programmed and thereby configured to receive from an upper node a first call request, which is a call request to only an already located wireless cell and which includes terminal identification information of a target communication terminal device that is a target of a communication request, the already located wireless cell being a wireless cell in which the target communication terminal device was located in a past predetermined period before a current time;
a presumably located wireless cell derivation unit, including electronic components respectively programmed and thereby configured to derive a presumably located wireless cell in which the target communication terminal device is presumably located based on the already located wireless cell that is a target of the first call request received by the first call request reception unit;

a first call making unit, including electronic components respectively programmed and thereby configured to make a call to the already located wireless cell and the presumably located wireless cell;

a call response signal transmission unit, including electronic components respectively programmed and thereby configured to transmit a response signal to the call to the upper node;

a second call request reception unit, including electronic components respectively programmed and thereby configured to receive from the upper node a second call request which is the call request to at least a wireless cell different from the already located wireless cell from among a plurality of wireless cells included in a location registration area having the already located wireless cell and which includes the terminal identification information, in a case where the call response signal transmission unit has not transmitted the response signal for a predetermined period after the first call request reception unit receives the first call request; and a second call making unit, including electronic components respectively programmed and thereby configured to make the call to the different wireless cell based on the second call request received by the second call request reception unit.

6. The wireless RNC according to claim 5, further comprising a wireless cell relative positional relation storage unit, including electronic components respectively programmed and thereby configured to store a relative positional relation between the plurality of wireless cells included in the location registration area, wherein the presumably located wireless cell derivation unit derives, as the presumably located wireless cell, at least any one of a wireless cell adjacent to the already located wireless cell, a wireless cell within a predetermined distance from the already located wireless cell, or a wireless cell overlaid with the already located wireless cell, based on the relative positional relation stored in the wireless cell relative positional relation storage unit.

7. An eNodeB wireless base station, comprising:

an overlay information transmission unit, including electronic components respectively programmed and thereby configured to transmit overlay information to an upper node when the upper node is connected, the overlay information being related to overlaying of wireless cells included in the eNodeB wireless base station;

a first call request reception unit, including electronic components respectively programmed and thereby configured to receive from the upper node a first call request, which is a call request to at least any one of an already located wireless cell or a presumably located wireless cell and which includes terminal identification information of a target communication terminal device that is a target of a communication request, the already located wireless cell being a wireless cell in which the target communication terminal device was located in a past predetermined period before a current time, and the presumably located wireless cell being a wireless cell that is overlaid with the already located wireless cell and the target communication terminal device being presumably located therein;

a first call making unit, including electronic components respectively programmed and thereby configured to make a call to the already located wireless cell and the presumably located wireless cell included in the first call request received by the first call request reception unit;

a call response signal transmission unit, including electronic components respectively programmed and thereby configured to transmit a response signal to the call to the upper node;

a second call request reception unit, including electronic components respectively programmed and thereby configured to receive from the upper node a second call request, which is the call request to at least a wireless cell different from the already located wireless cell and the presumably located wireless cell from among a plurality of wireless cells included in a location registration area having the already located wireless cell and which includes the terminal identification information, in a case where the call response signal transmission unit has not transmitted the response signal for a predetermined period after the first call request reception unit receives the first call request; and a second call making unit, including electronic components respectively programmed and thereby configured to make the call to the different wireless cell based on the second call request received by the second call request reception unit.

8. A wireless communication network system, comprising:

a wireless network control device that is a Radio Network Controller (RNC); and an exchange that is a Serving GPRS Support Node (SGSN) or a Mobility Management Entity (MME), the exchange configured to communicate with a communication terminal device via the wireless network control device, wherein the exchange comprises:

a first call request transmission unit, including electronic components respectively programmed and thereby configured to transmit a first call request, which is a call request to only an already located wireless cell and which includes terminal identification information of a target communication terminal device that is a target of a communication request, to the wireless network control device for managing a location registration area including a plurality of wireless cells having the already located wireless cell, the already located wireless cell being a wireless cell in which the target communication terminal device was located in a past predetermined period before a current time;

a call response signal reception unit, including electronic components respectively programmed and thereby configured to receive a response signal to the first call request from the wireless network control device; and a second call request transmission unit, including electronic components respectively programmed and thereby configured to transmit to the wireless network control device a second call request, which is the call request to at least a wireless cell different from the already located wireless cell from among the plurality of wireless cells and which includes the terminal identification information, in a case where the call response signal reception unit has not received the response signal for a predetermined period after the first call request transmission unit transmits the first call request, and wherein the wireless network control device comprises:
a first call request reception unit, including electronic components respectively programmed and thereby configured to receive the first call request from the exchange;
a presumably located wireless cell derivation unit, including electronic components respectively programmed and thereby configured to receive a presumably located wireless cell in which the target communication terminal device is presumably located based on the already located wireless cell that is a target of the first call request received by the first call request reception unit;
a first call making unit, including electronic components respectively programmed and thereby configured to make a call to the already located wireless cell and the presumably located wireless cell;
a call response signal transmission unit, including electronic components respectively programmed and thereby configured to transmit a response signal to the call, to the exchange;
a second call request reception unit, including electronic components respectively programmed and thereby configured to receive the second call request from the exchange, in a case where the call response signal transmission unit has not transmitted the response signal for a predetermined period after the first call request reception unit receives the first call request; and
a second call making unit, including electronic components respectively programmed and thereby configured to make the call to the different wireless cell based on the second call request received by the second call request reception unit.

9. A wireless communication network system, comprising:
a wireless network control device that is a Radio Network Controller (RNC); and
an exchange that is a Serving GPRS Support Node (SGSN) or a Mobility Management Entity (MME), the exchange configured to communicate with a communication terminal device via the wireless network control device,
wherein the exchange comprises:
a presumably located wireless cell derivation unit, including electronic components respectively programmed and thereby configured to derive a presumably located wireless cell in which a target communication terminal device that is a target of a communication request is presumably located, based on an already located wireless cell which is a wireless cell in which the target communication terminal device was located in a past predetermined period before a current time;
a first call request transmission unit, including electronic components respectively programmed and thereby configured to transmit a first call request, which is a call request to only the already located wireless cell and the presumably located wireless cell derived by the presumably located wireless cell derivation unit and which includes terminal identification information of the target communication terminal device, to the wireless network control device for managing a location registration area including a plurality of wireless cells having the already located wireless cell;
a call response signal reception unit, including electronic components respectively programmed and thereby configured to receive a response signal to the first call request from the wireless network control device; and
a second call request transmission unit, including electronic components respectively programmed and thereby configured to transmit to a management node a second call request, which is the call request to at least a wireless cell different from the already located wireless cell from among the plurality of wireless cells and which includes the terminal identification information, in a case where the call response signal reception unit has not received the response signal for a predetermined period after the first call request transmission unit transmits the first call request, and
wherein the wireless network control device comprises:
a first call request reception unit, including electronic components respectively programmed and thereby configured to receive the first call request from the exchange;
a first call making unit, including electronic components respectively programmed and thereby configured to make a call to the already located wireless cell and the presumably located wireless cell included in the first call request received by the first call request reception unit;
a call response signal transmission unit, including electronic components respectively programmed and thereby configured to transmit a response signal to the call, to the exchange;
a second call request reception unit, including electronic components respectively programmed and thereby configured to receive the second call request from the exchange, in a case where the call response signal transmission unit has not transmitted the response signal for the predetermined period after the first call request reception unit receives the first call request; and
a second call making unit, including electronic components respectively programmed and thereby configured to make the call to the different wireless cell based on the second call request received by the second call request reception unit.

10. A wireless communication network system, comprising:
a wireless network device that is an eNodeB wireless base station; and
an exchange that is a Serving GPRS Support Node (SGSN) or a Mobility Management Entity (MME), the exchange configured to communicate with a communication terminal device via the wireless network device,
wherein the exchange comprises:
an overlay information reception unit, including electronic components respectively programmed and thereby configured to receive overlay information transmitted from the wireless network device for managing a location registration area including a plurality of wireless cells when the wireless network device is connected, the overlay information being related to overlaying of the plurality of wireless cells;
an overlay information storage unit, including electronic components respectively programmed and thereby configured to store the overlay information;
a first call request transmission unit, including electronic components respectively programmed and thereby configured to transmit a first call request, which is a call request to at least any of an already located wireless cell and a presumably located wireless cell and which includes terminal identification information of a target communication terminal device that is a target of a communication request, to the wireless network device including the already located wireless cell, the already located wireless cell being a wireless cell in which the target communication terminal device was located in a past predetermined period before a current time, and the presumably located wireless cell being a wireless cell that is overlaid with the already located wireless cell, the target communication terminal device being presumably located therein, and being derived from the overlay information storage unit;

a call response signal reception unit, including electronic components respectively programmed and thereby configured to receive a response signal to the first call request from the wireless network device; and a second call request transmission unit, including electronic components respectively programmed and thereby configured to transmit to the wireless network device a second call request, which is the call request to at least a wireless cell different from the already located wireless cell from among the plurality of wireless cells and which includes the terminal identification information, in a case where the call response signal reception unit has not received the response signal for a predetermined period after the first call request transmission unit transmits the first call request, and wherein the wireless network device comprises:

an overlay information transmission unit, including electronic components respectively programmed and thereby configured to transmit the overlay information of the wireless cells included in the wireless network device to the exchange, when the exchange is connected;

a first call request reception unit, including electronic components respectively programmed and thereby configured to receive the first call request from the exchange;

a first call making unit, including electronic components respectively programmed and thereby configured to make a call to the already located wireless cell and the presumably located wireless cell included in the first call request received by the first call request reception unit;

a call response signal transmission unit, including electronic components respectively programmed and thereby configured to transmit a response signal to the call, to the exchange;

a second call request reception unit, including electronic components respectively programmed and thereby configured to receive the second call request from the exchange, in a case where the call response signal transmission unit has not transmitted the response signal for the predetermined period after the first call request reception unit receives the first call request; and a second call making unit, including electronic components respectively programmed and thereby configured to make the call to the different wireless cell based on the second call request received by the second call request reception unit.

* * * * *